United States Patent [19]

Bahl et al.

[11] 4,291,406

[45] Sep. 22, 1981

[54] ERROR CORRECTION ON BURST CHANNELS BY SEQUENTIAL DECODING

[75] Inventors: Lalit R. Bahl, Amawalk; John Cocke, Bedford; Clifton D. Cullum, Jr., Putnam Valley, all of N.Y.; Joachim Hagenauer, Seefeld, Fed. Rep. of Germany

[73] Assignee: International Business Machines Corporation, Armonk, N.Y.

[21] Appl. No.: 64,223

[22] Filed: Aug. 6, 1979

[51] Int. Cl.³ .............................................. G06F 11/10
[52] U.S. Cl. ......................................... 371/44; 371/45
[58] Field of Search .................................... 371/44, 45

[56] References Cited

U.S. PATENT DOCUMENTS

| | | | |
|---|---|---|---|
| 3,508,197 | 4/1970 | Tong | 371/44 |
| 3,571,795 | 3/1971 | Tong | 371/44 |
| 3,585,586 | 6/1971 | Harmon | 371/45 |
| 3,588,819 | 6/1971 | Tong | 371/44 |
| 3,593,282 | 7/1971 | Tong | 371/44 |
| 3,891,959 | 6/1975 | Tsuji et al. | 371/45 |

OTHER PUBLICATIONS

Forney, Jr. et al., A High-Speed Sequential Decoder: Prototype Design and Text, IEEE Transactions on Comm. Tech., vol. COM19, No. 5, Oct. 1971, pp. 821-835.

Lin, An Introduction to Error-Correcting Codes, Prentice-Hall, Inc., 1970, pp. 295-307.

Wiggert, Error-Control Coding and Applications, Artech House, Inc., 1978, pp. 151-169.

Primary Examiner—Charles E. Atkinson
Attorney, Agent, or Firm—Philip Young

[57] ABSTRACT

A sequential decoder for error correction on burst and random noise channels using convolutionally encoded data. The decoder interacts with a deinterleaver which time demultiplexes data from a data channel from its time multiplexed form into a predetermined transformed order. The decoder includes a memory for storing a table of likelihood values which are derived from known error statistics about the data channel such as the probabilities of random errors and burst errors, burst error severity and burst duration. The decoder removes an encoded subblock of data from the deinterleaver and enters it into a replica of the convolutional encoder which calculates a syndrome bit from a combination of the presently received subblock together with a given number of previous subblocks. The syndrome bit indicates if the current assumption of the path through the convolutional tree is correct. Where there is no error in the channel, then the received sequence is a code word and the syndrome bit indicates that the correct path in the convolution tree is taken. For each received bit, and indicator bit is calculated which is a function of the difference between the current path and the received sequence. The sequential decoder employs the syndrome bit together with burst indicator bits to calculate a table address in a table of likelihood values and error pattern values. The likelihood value is used to update a total likelihood of error value and the error pattern value is used to change the received subblock of data.

13 Claims, 47 Drawing Figures

WRITE IN BY ROWS

READ OUT BY COLUMNS

FIG. 5
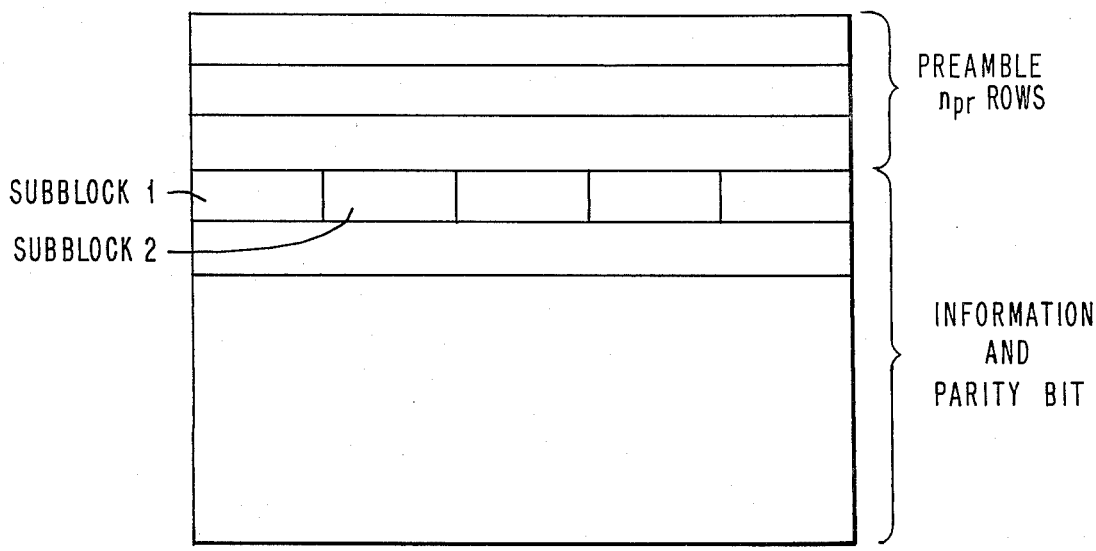
FIG. 7  DECODER CONTROL
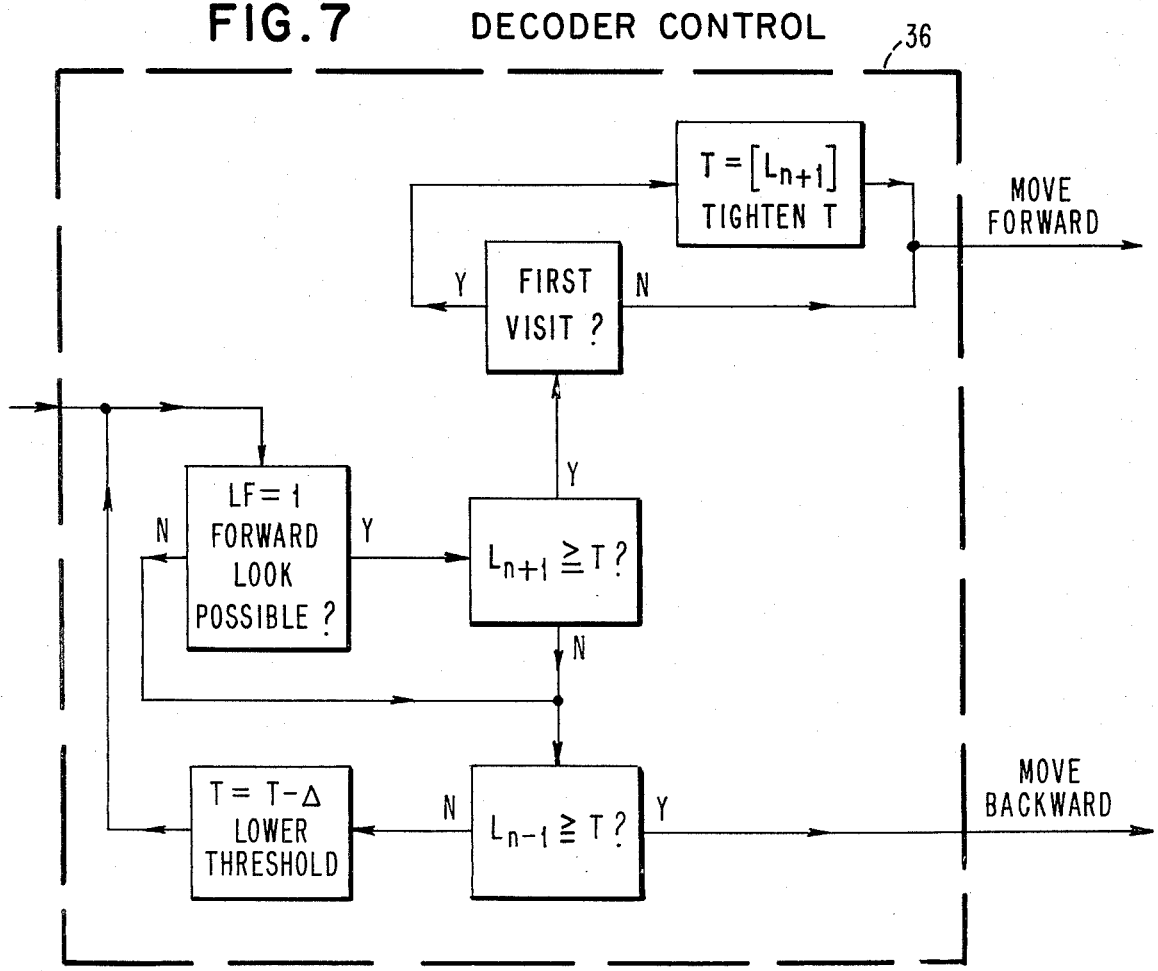

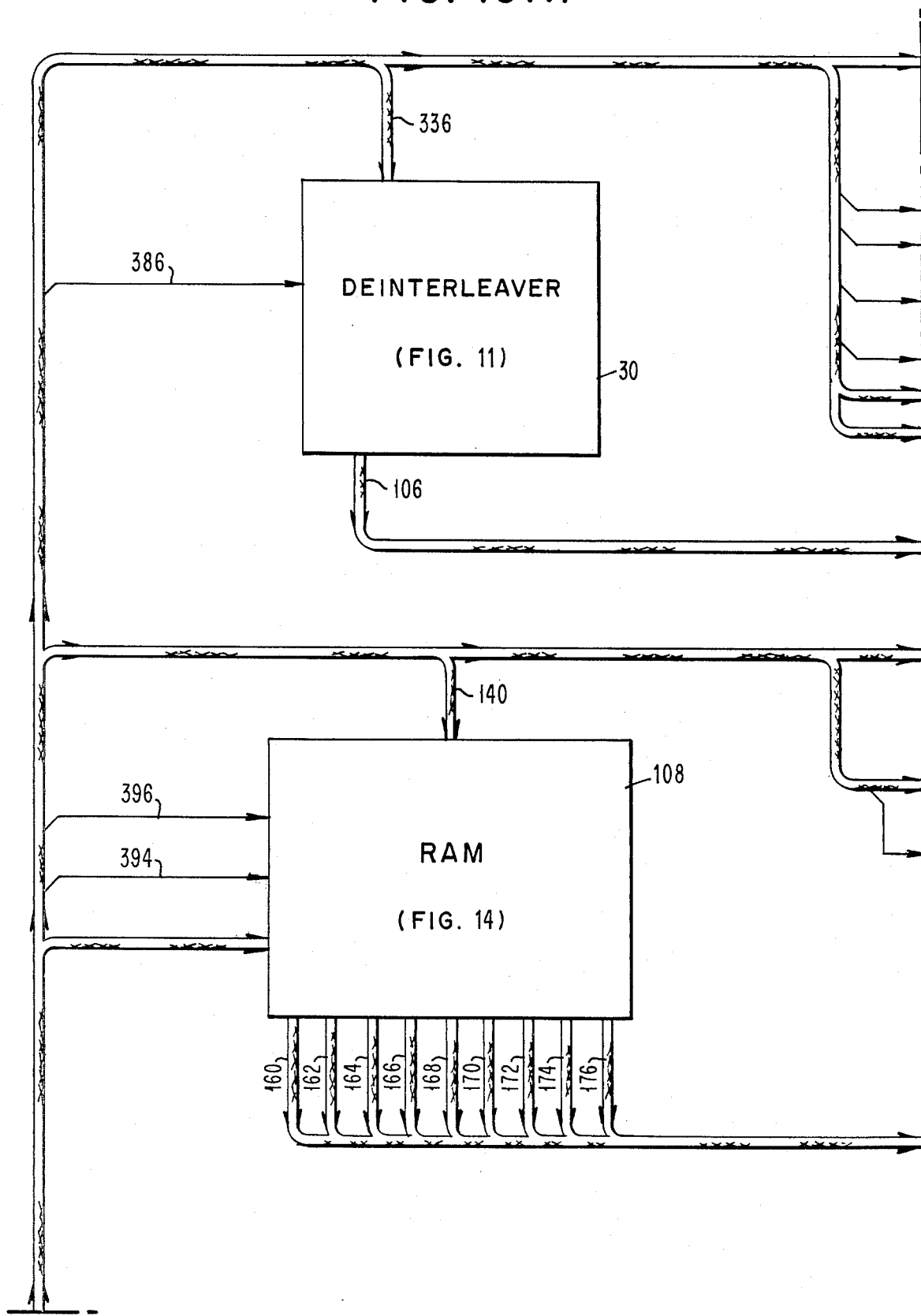
FIG. 10A1

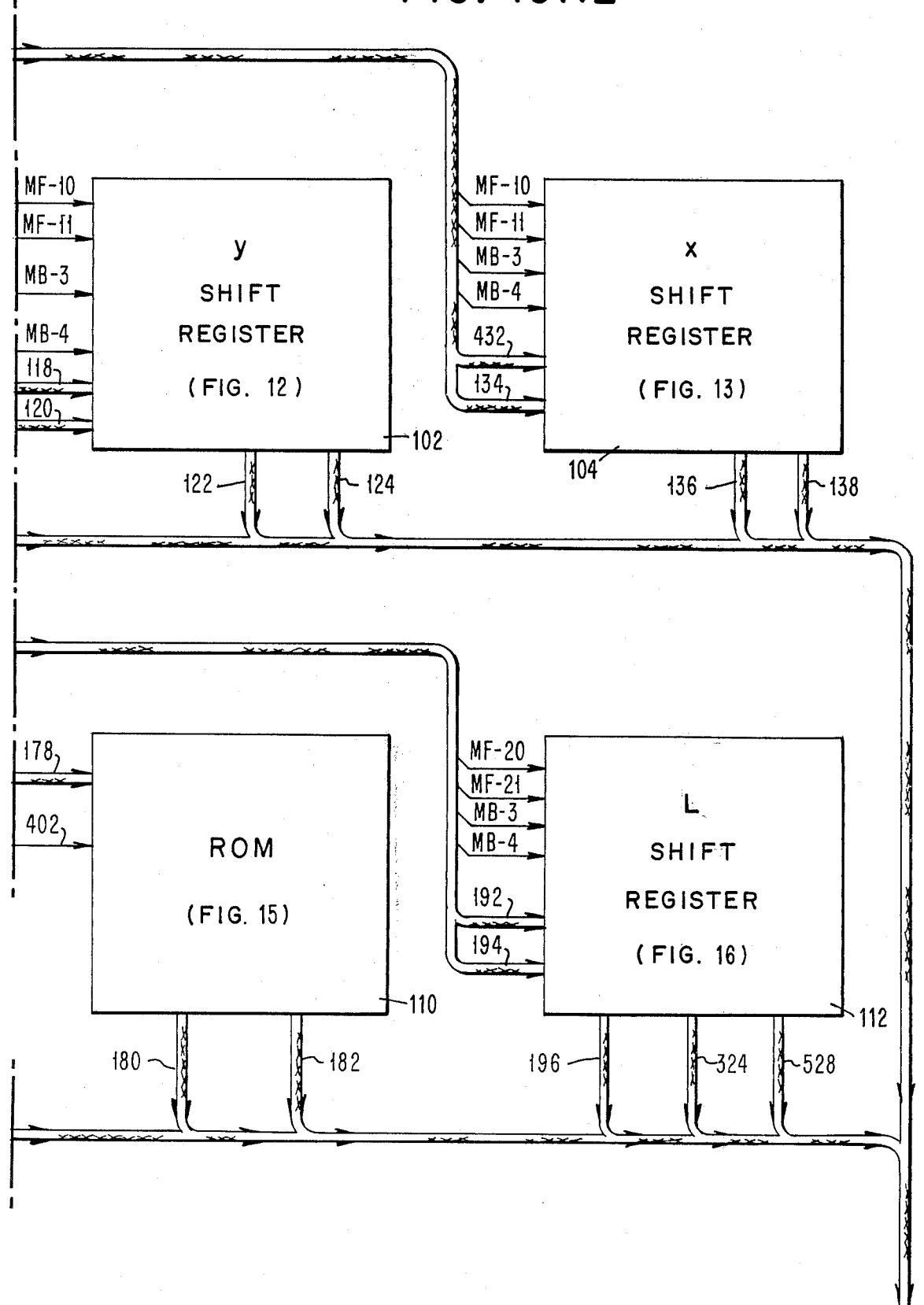
FIG. 10A2

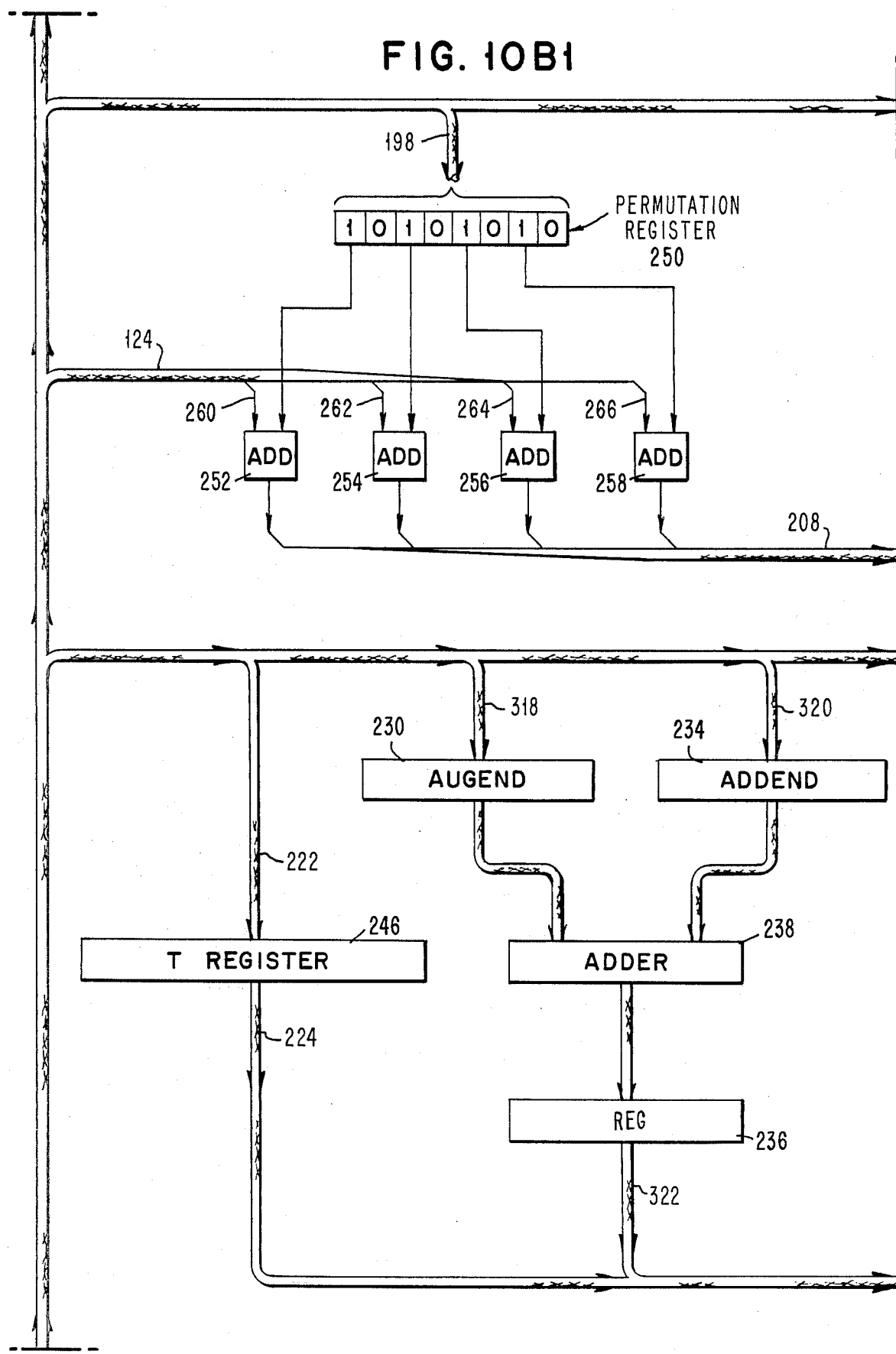

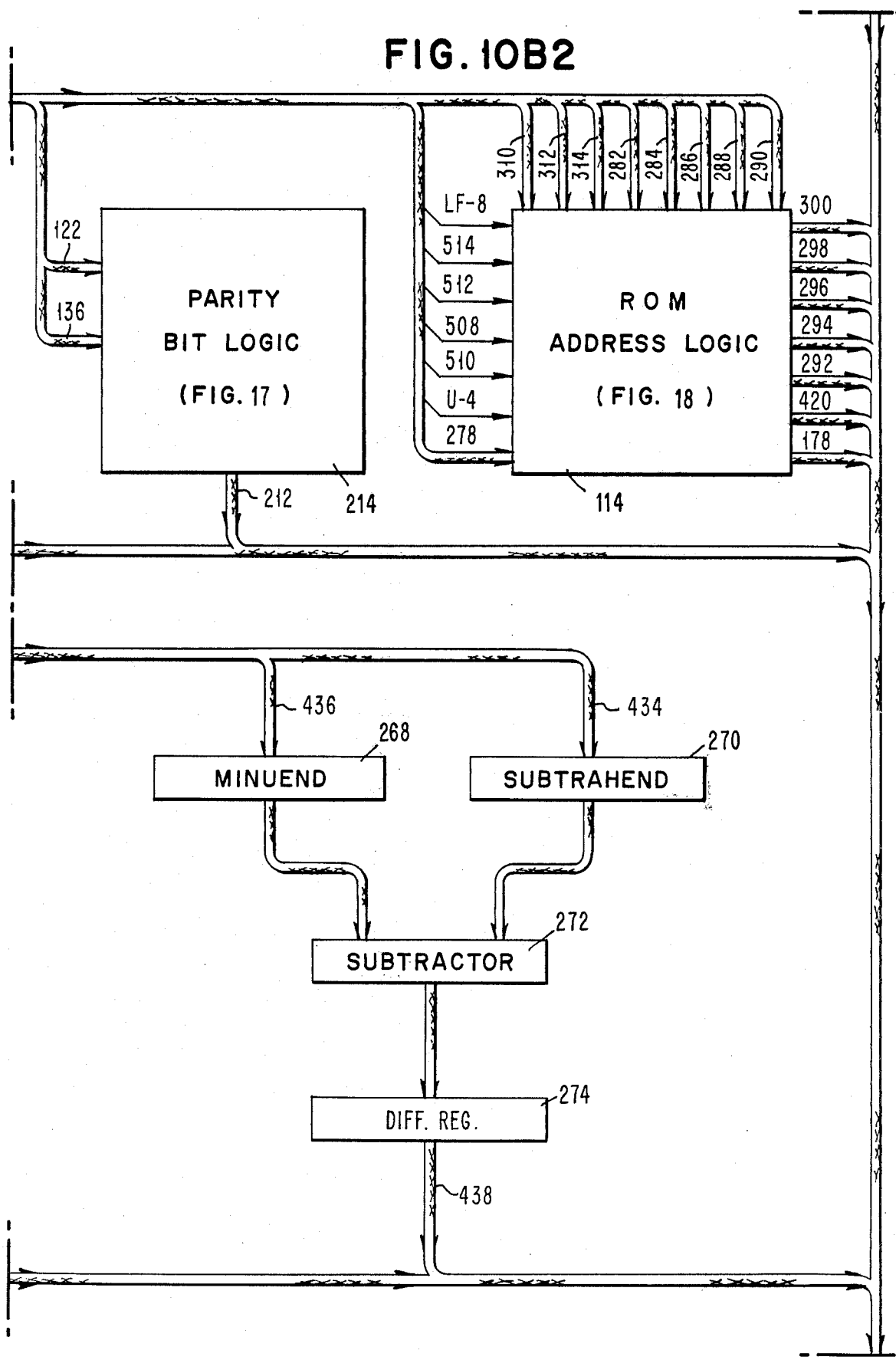
FIG. 10B2

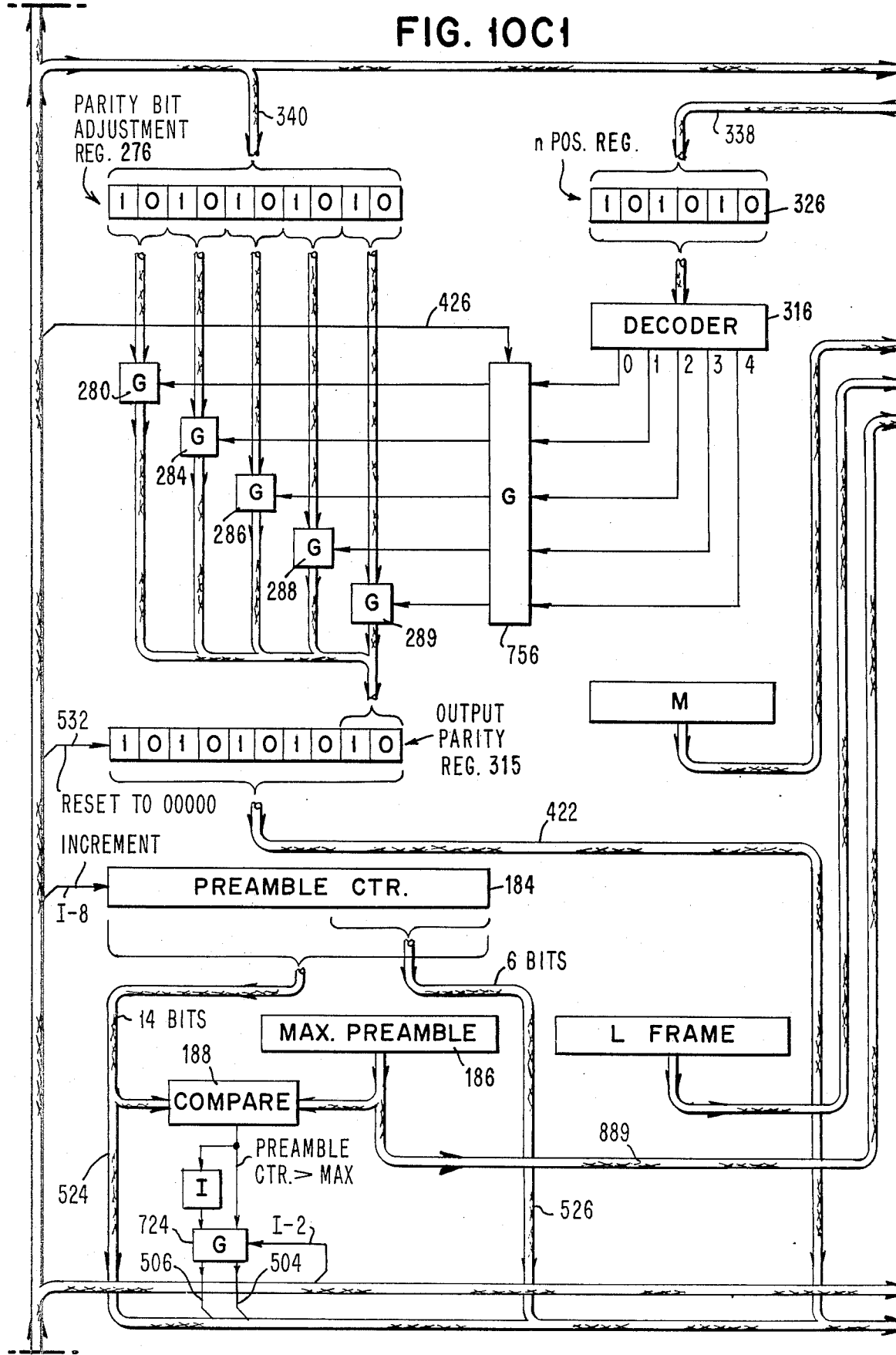
FIG. 10C1

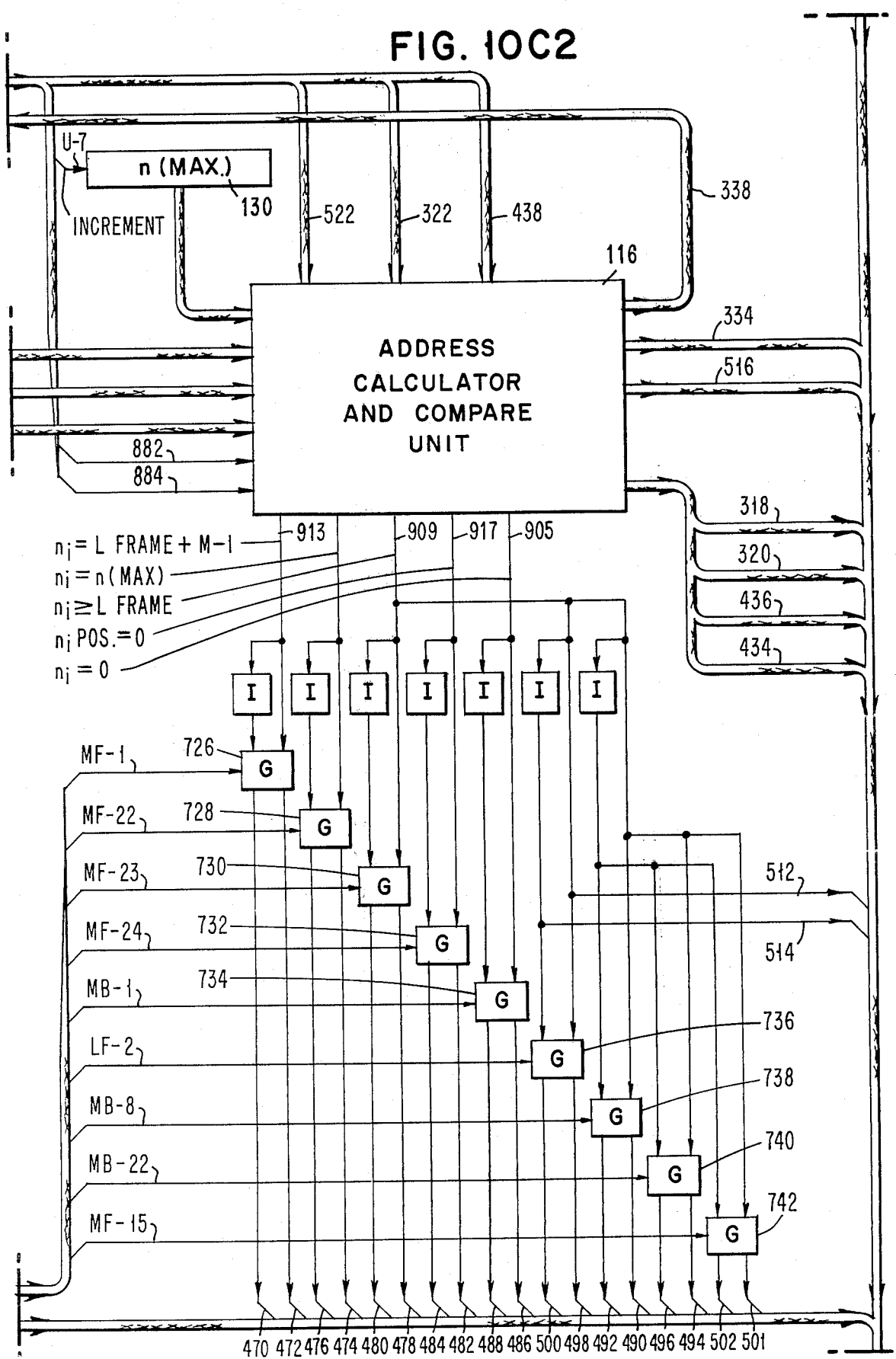

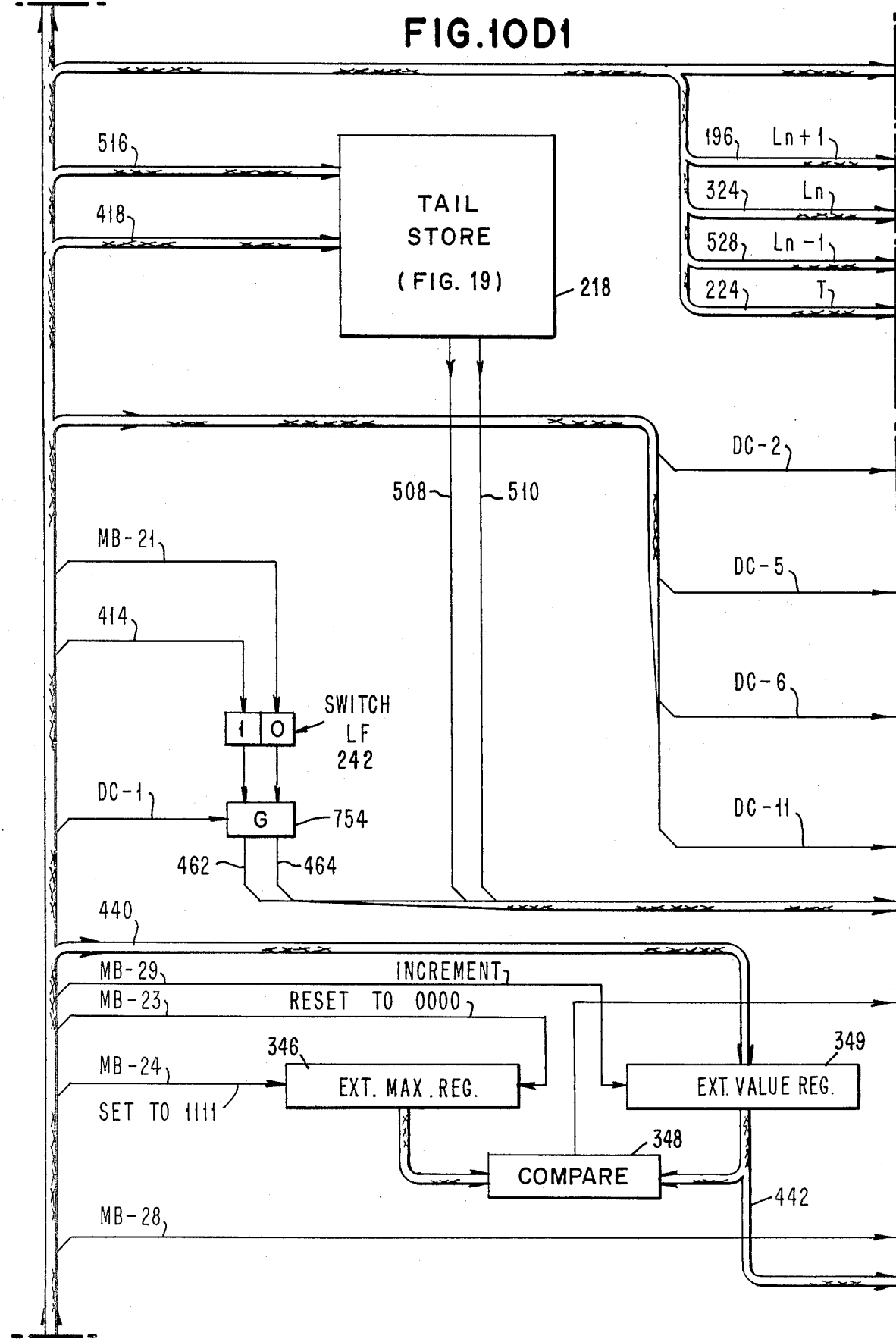

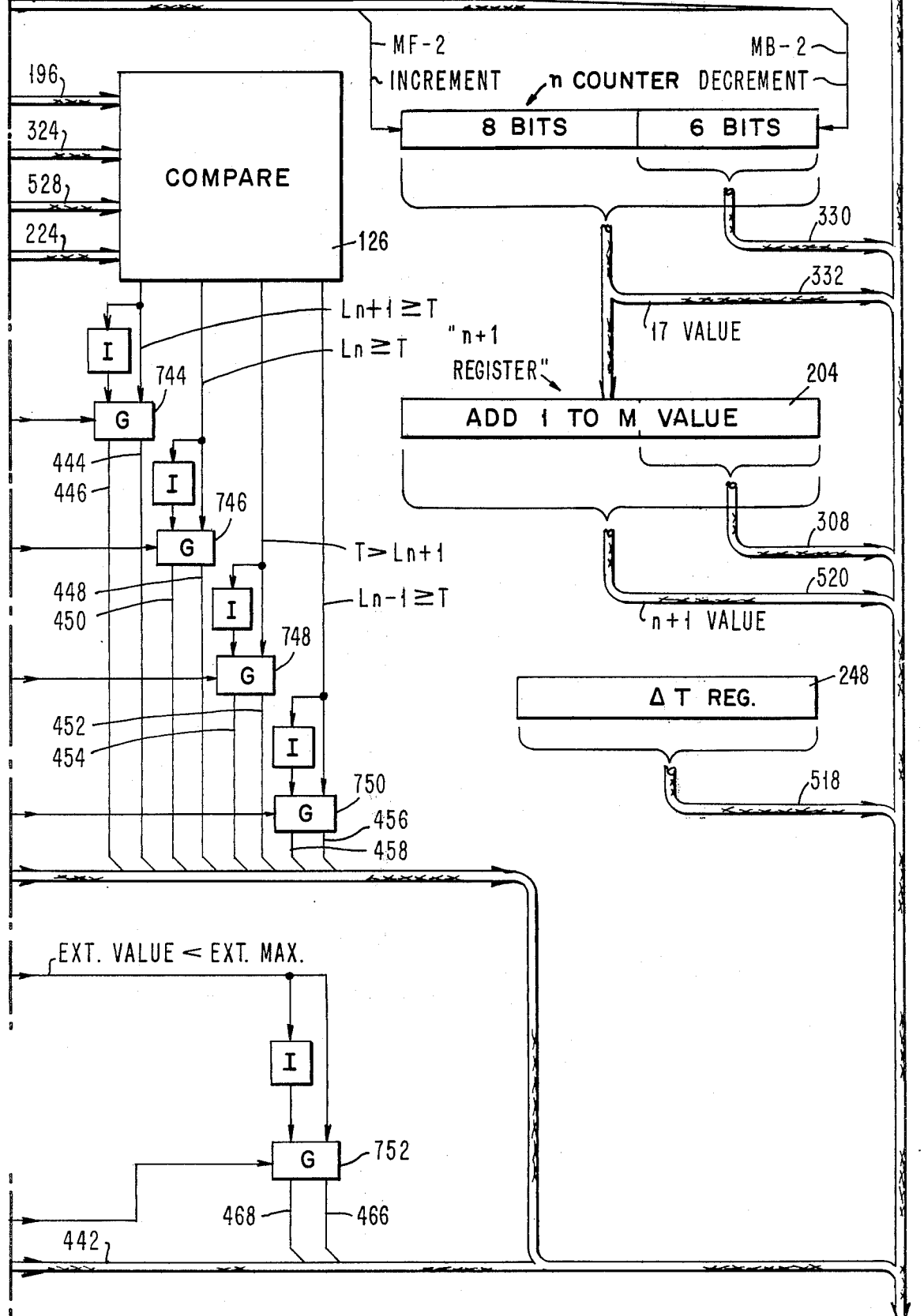

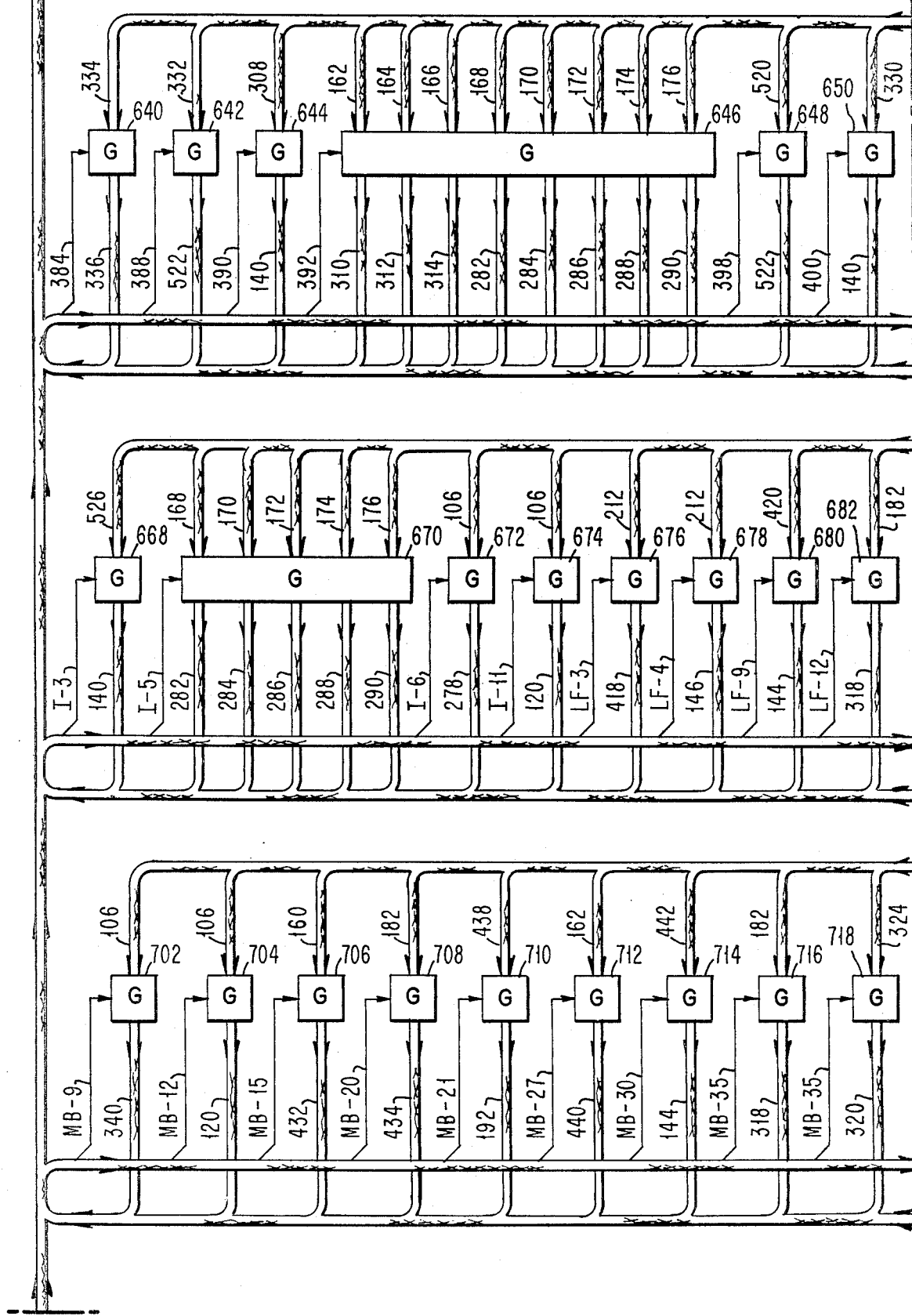

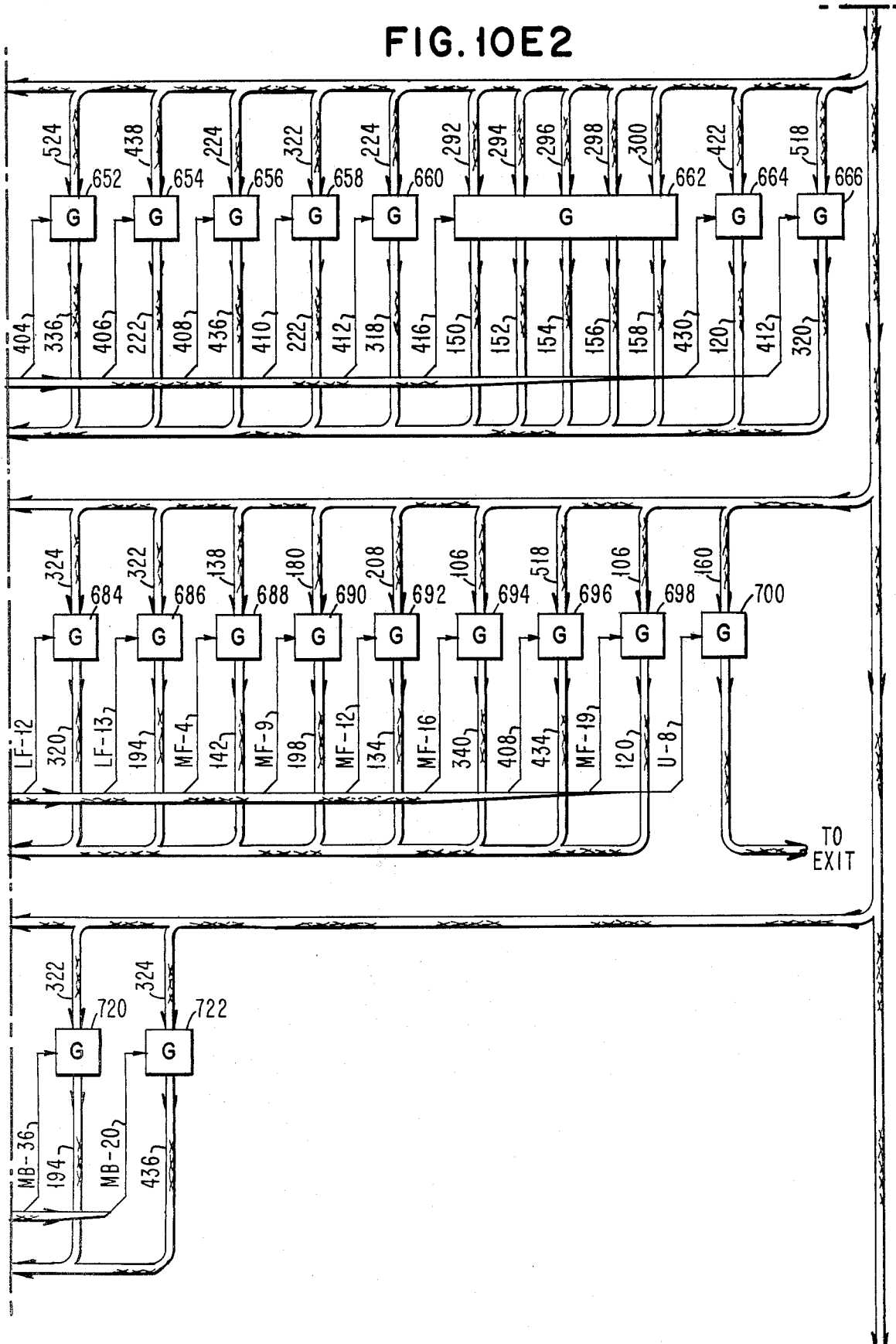
FIG.10E2

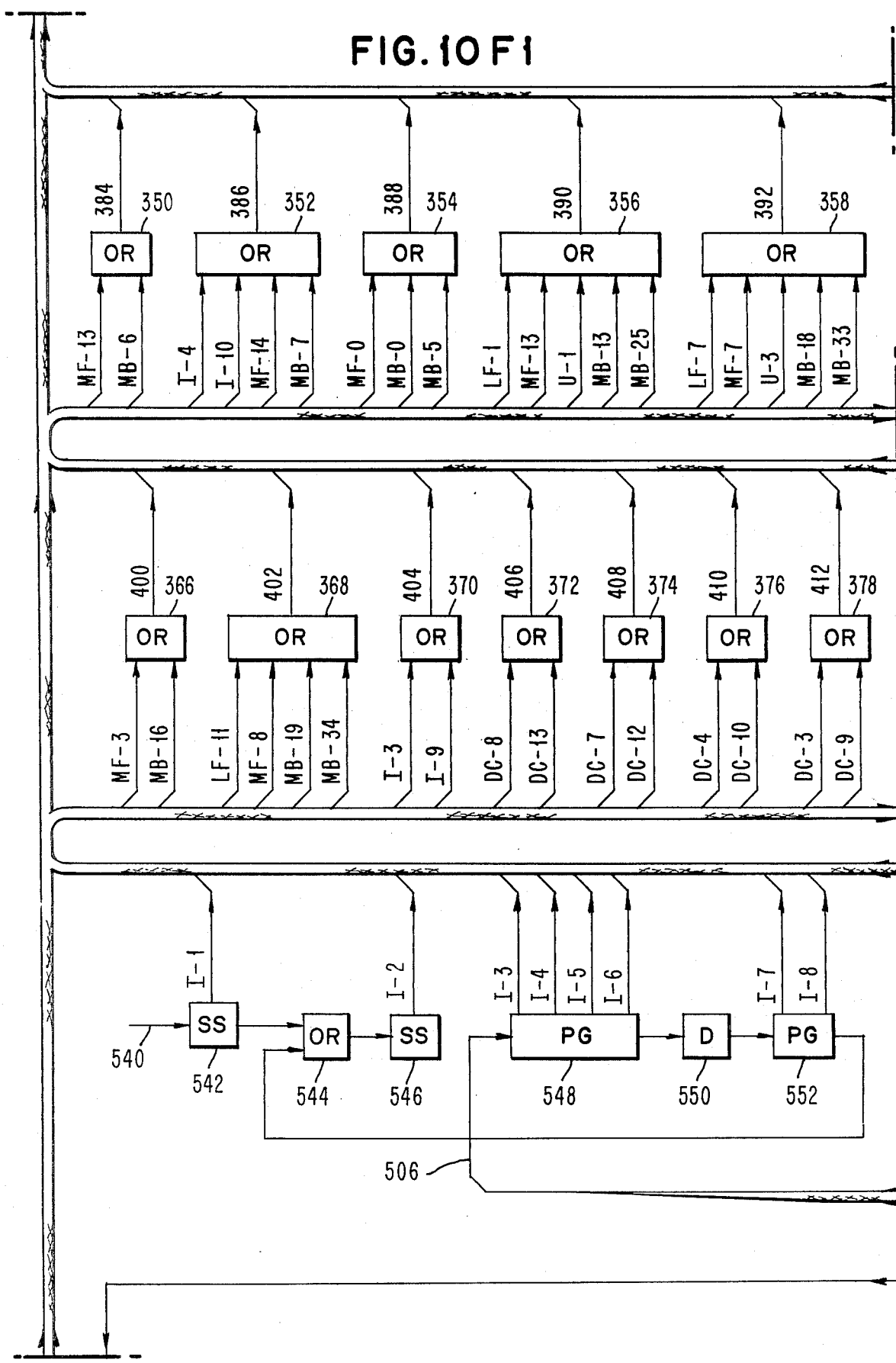

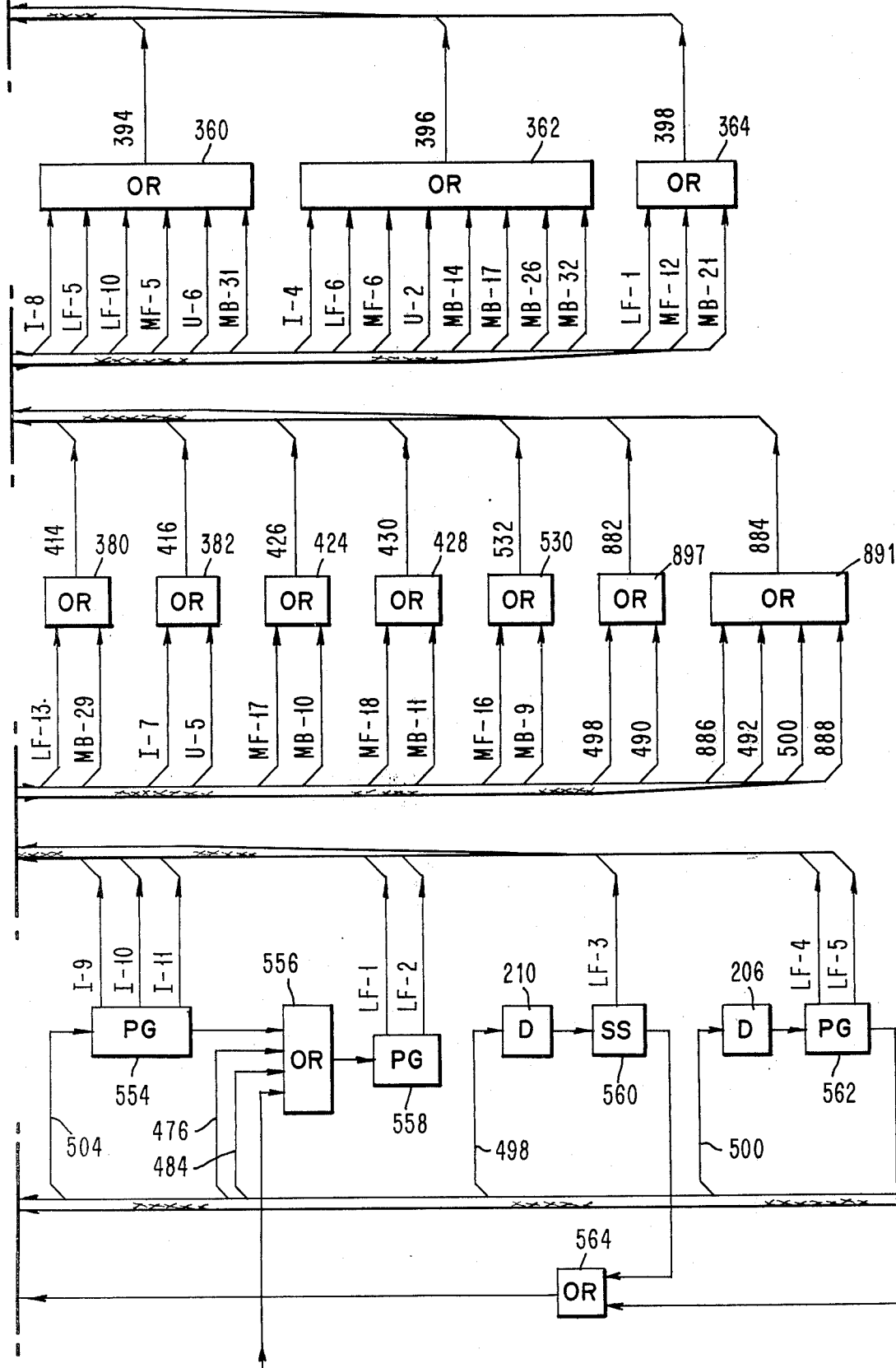
FIG.10 F2

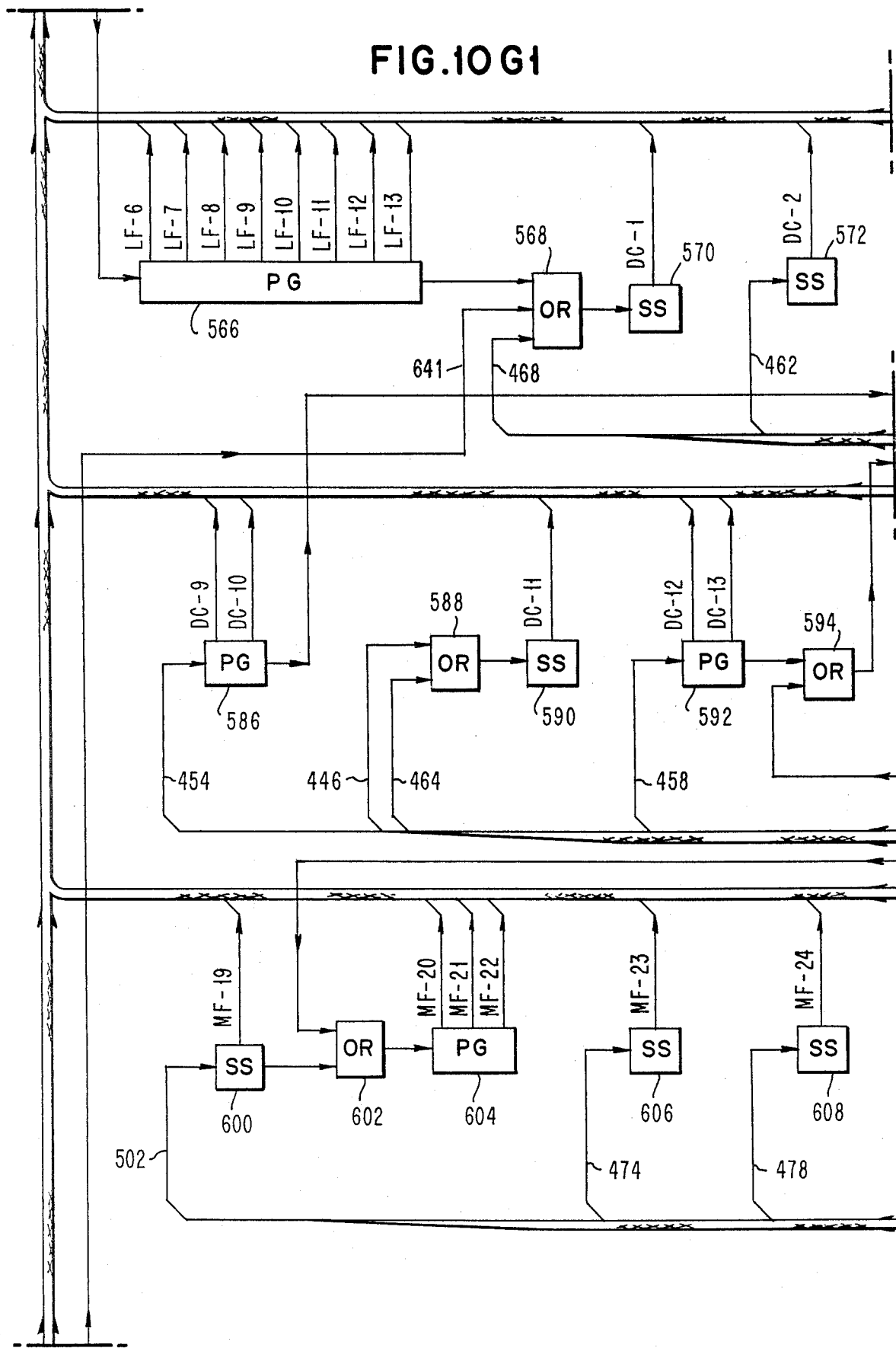
FIG. 10 G1

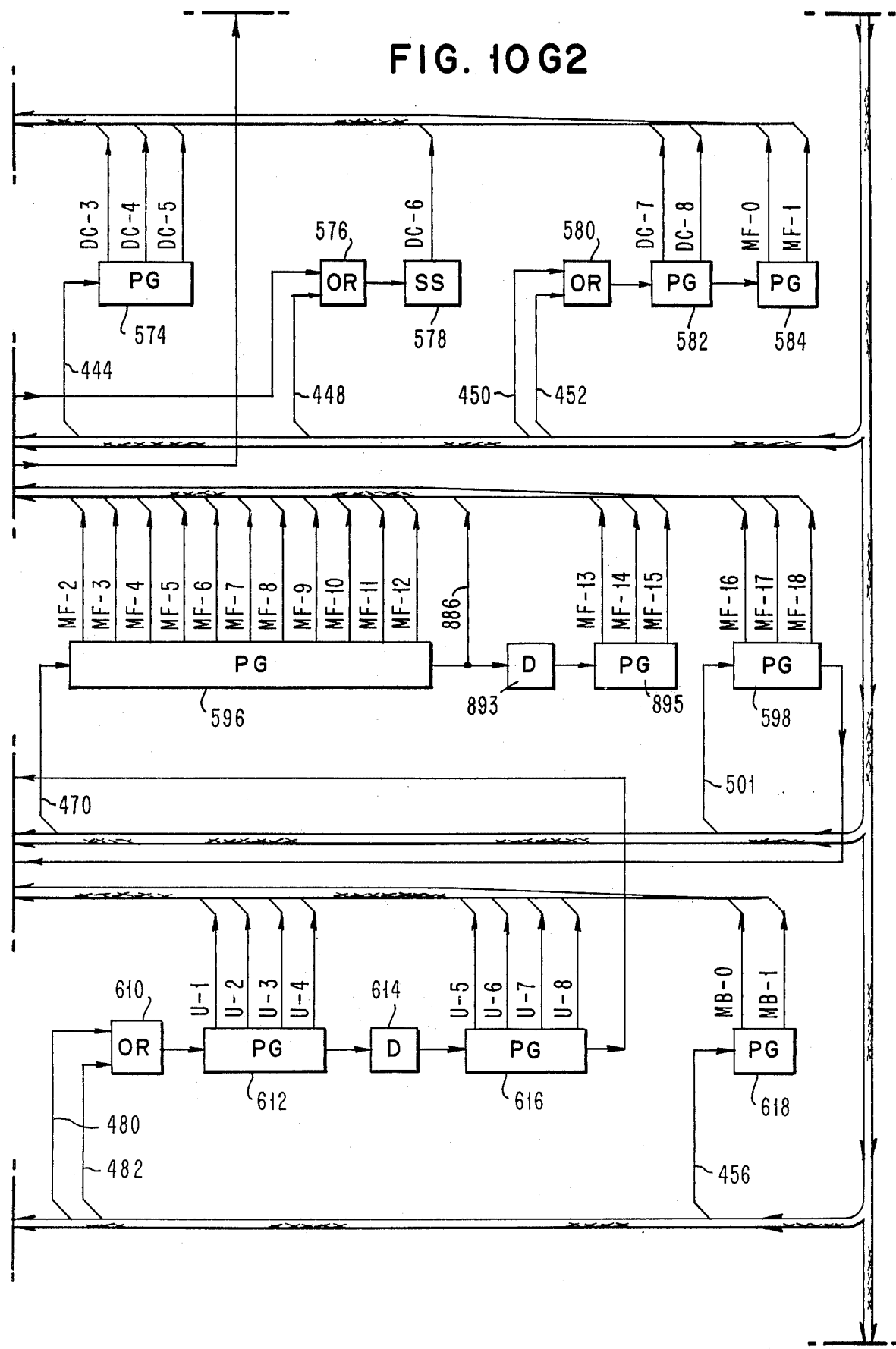
FIG. 10G2

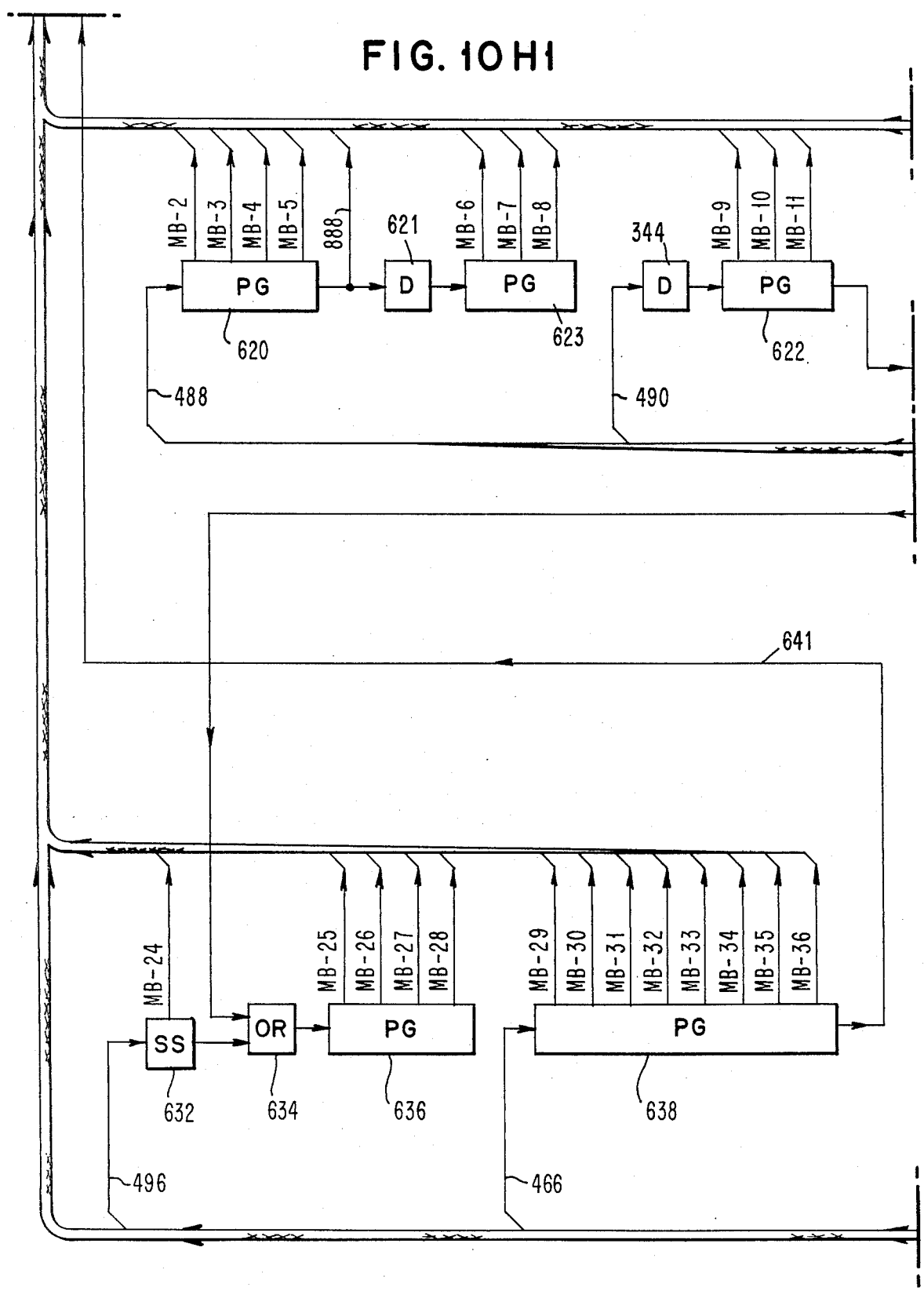
FIG. 10H1

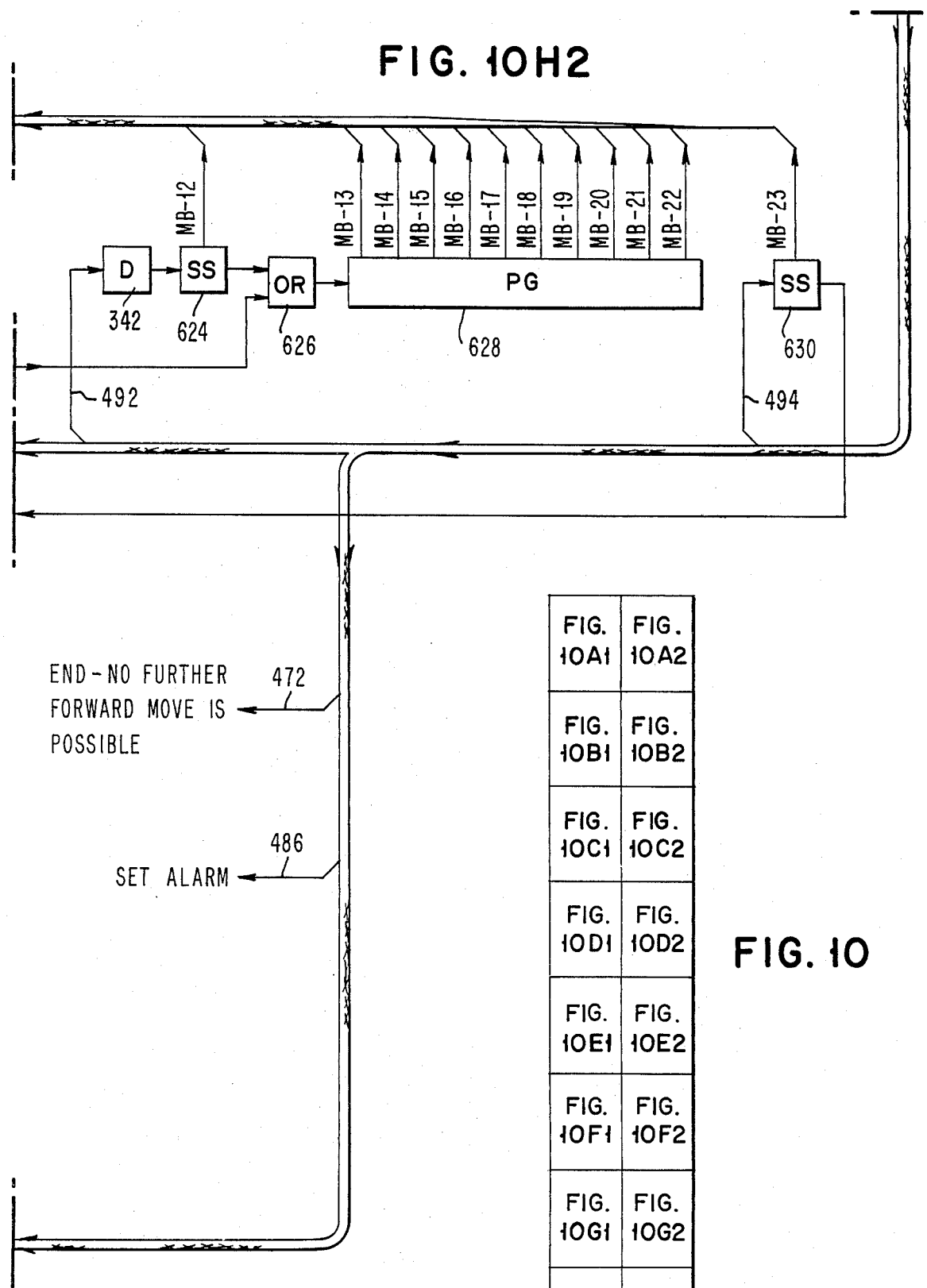

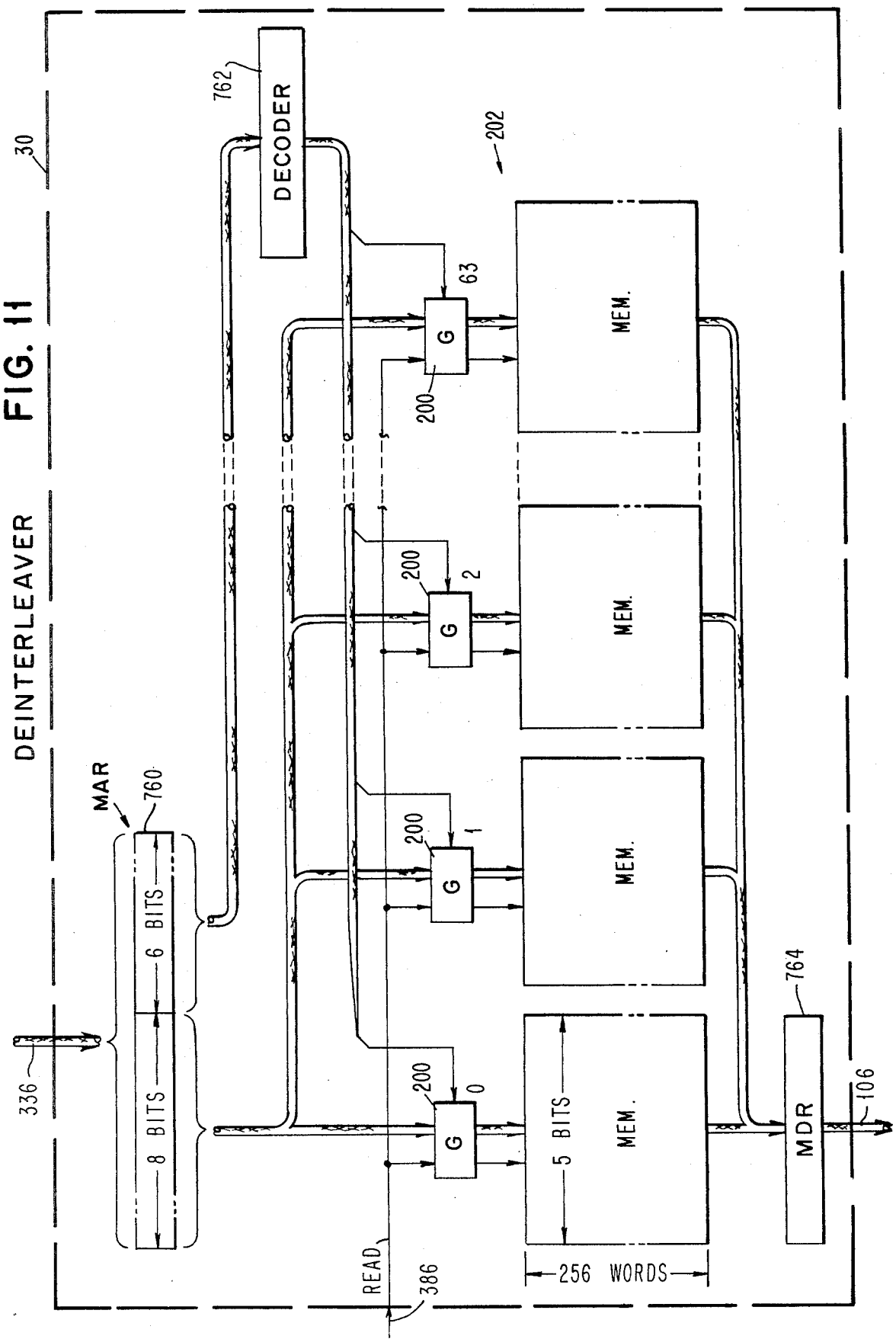

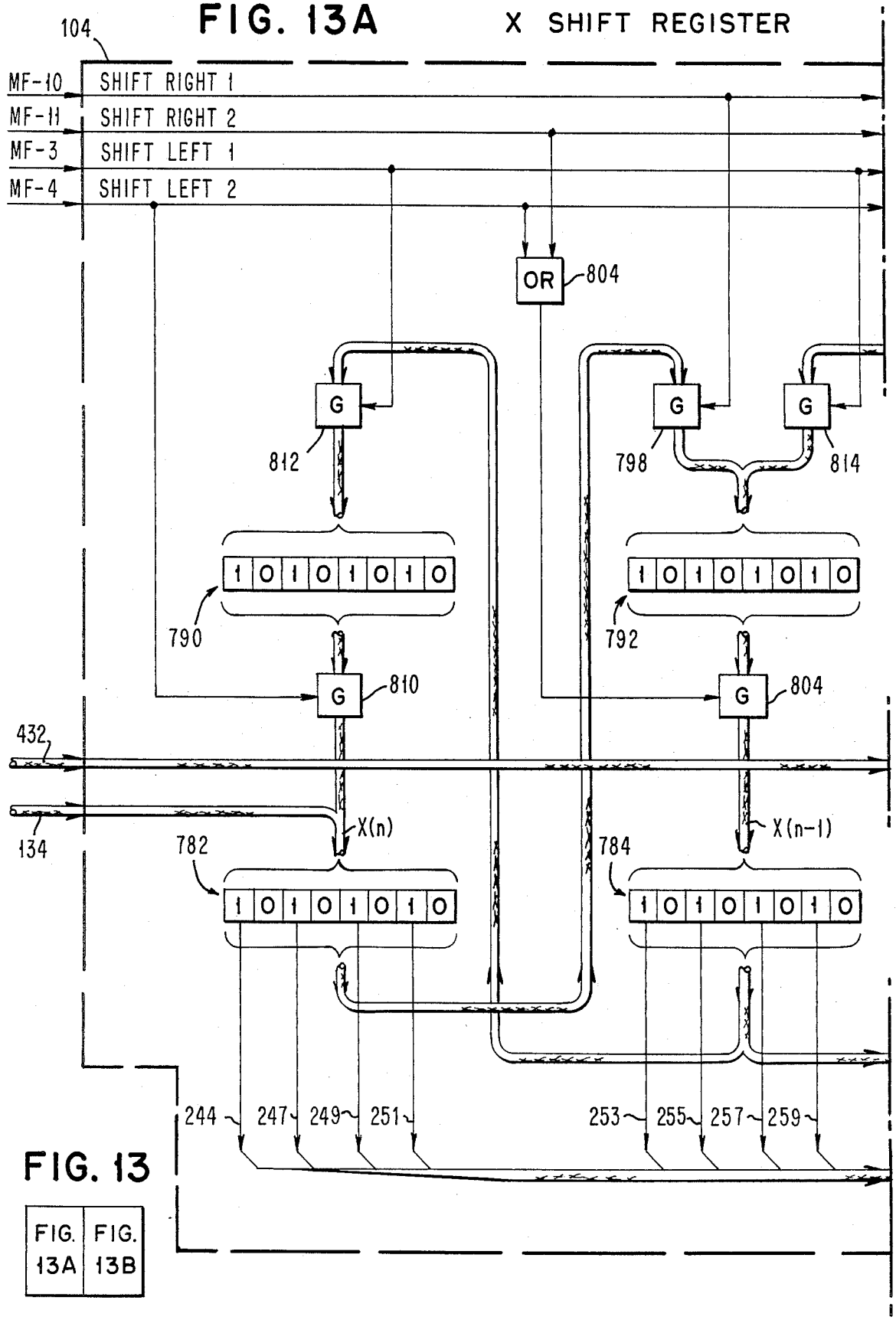

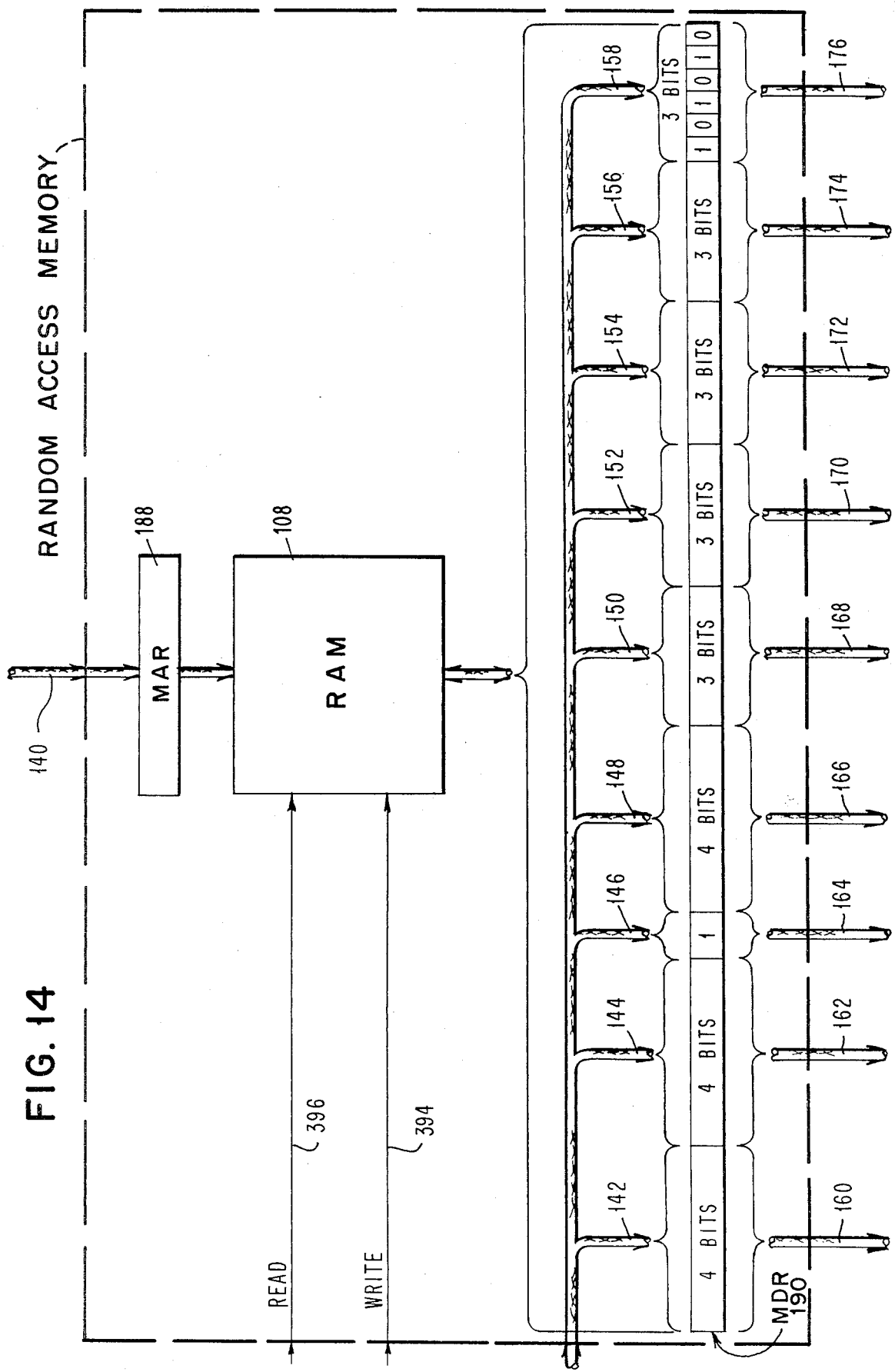

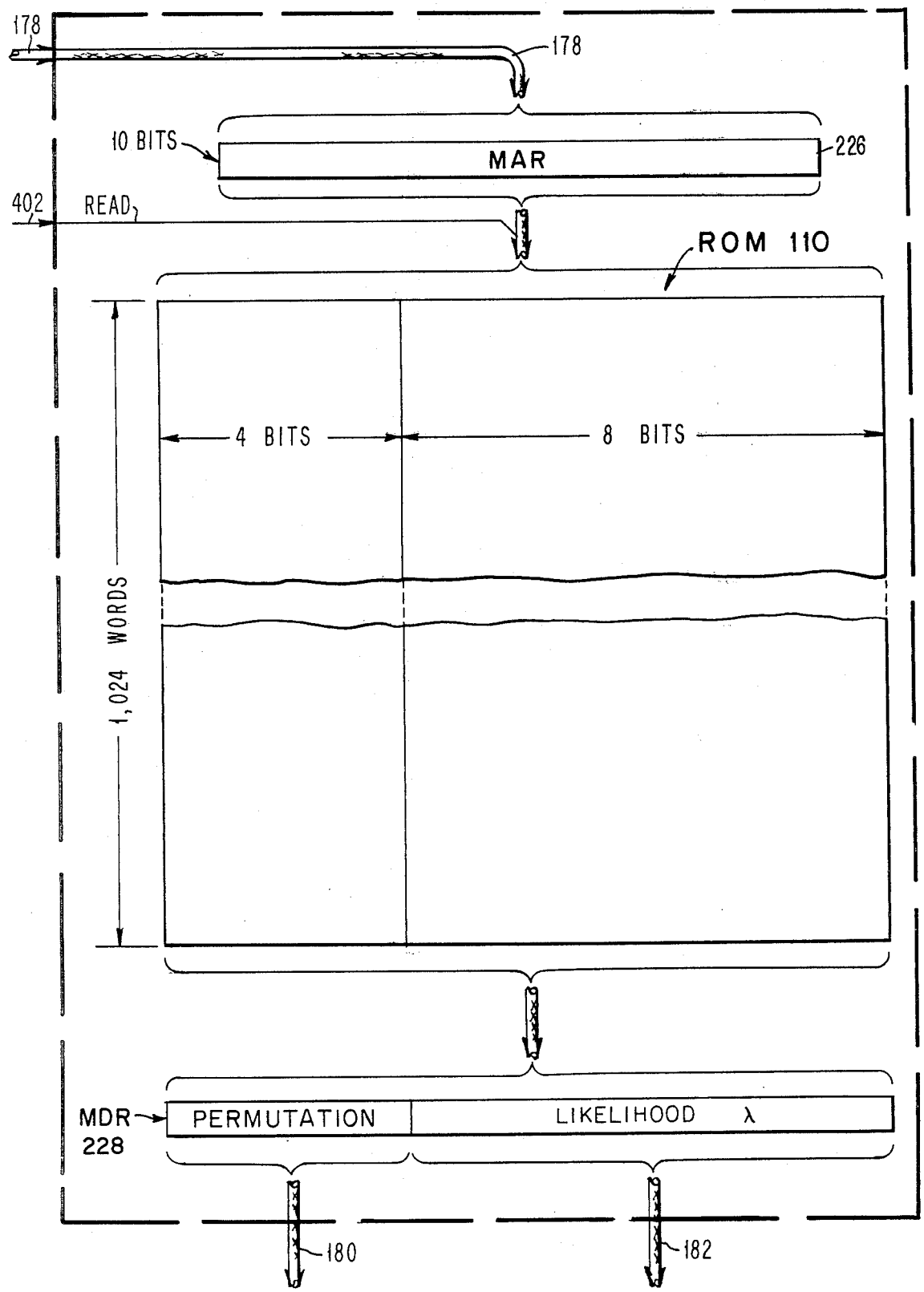
FIG. 15  READ ONLY MEMORY

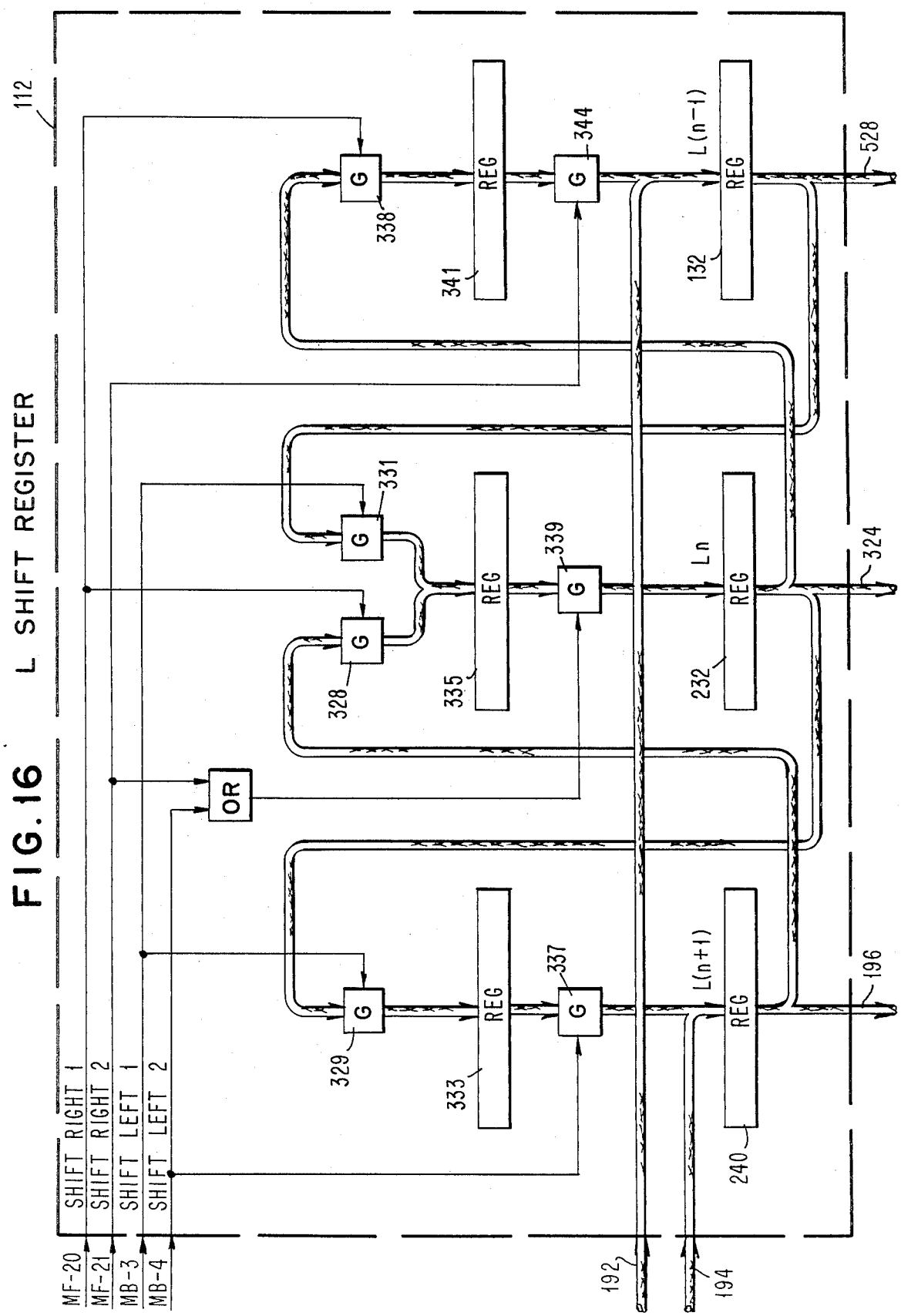
FIG.16 L SHIFT REGISTER

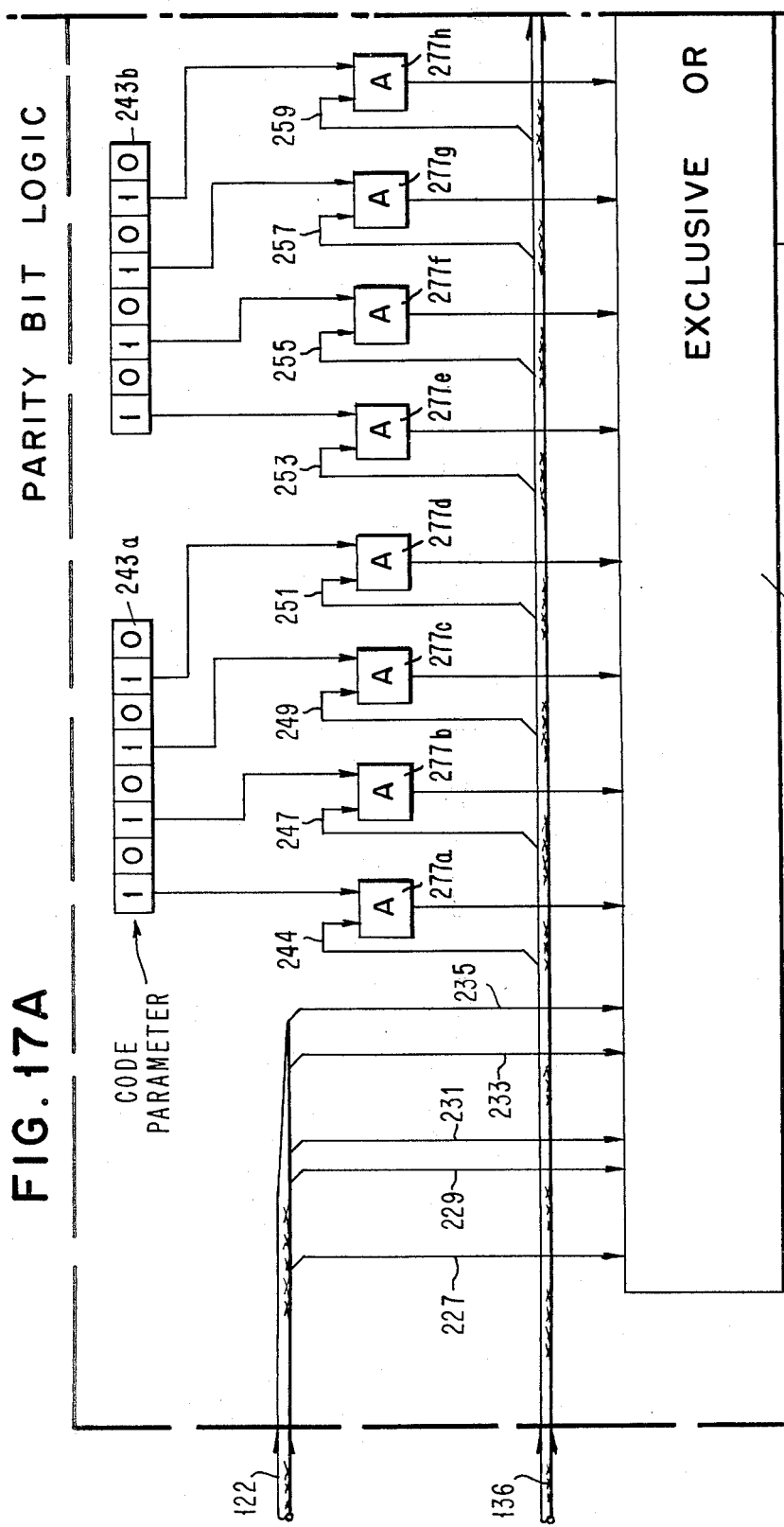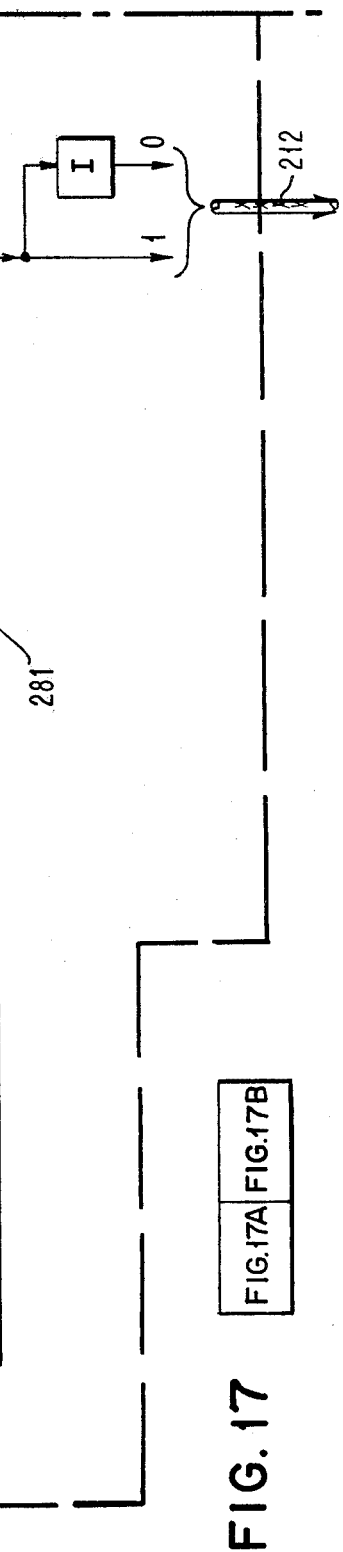
FIG. 17A
FIG. 17

ROM ADDR. LOGIC

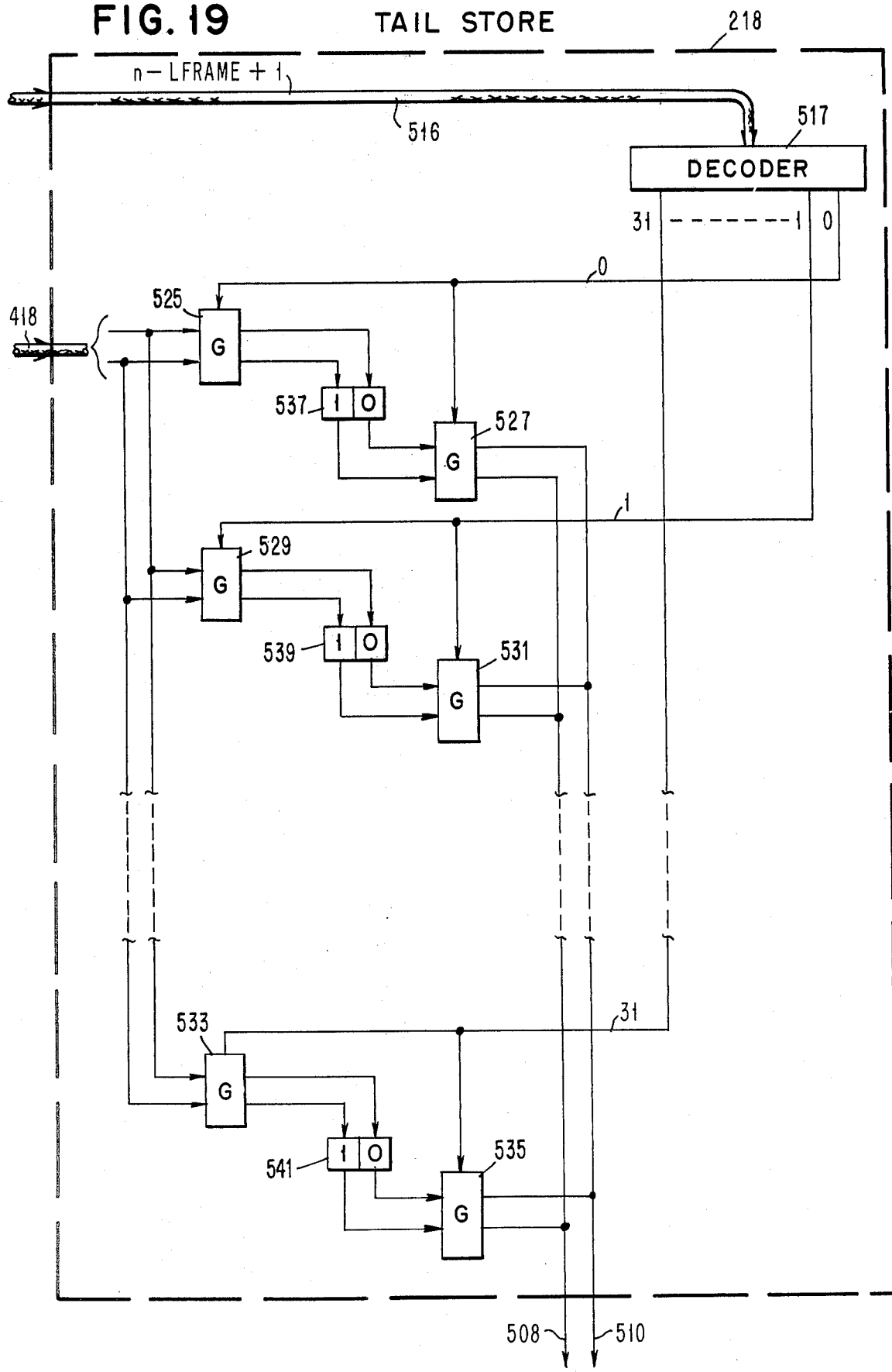
FIG. 19 TAIL STORE

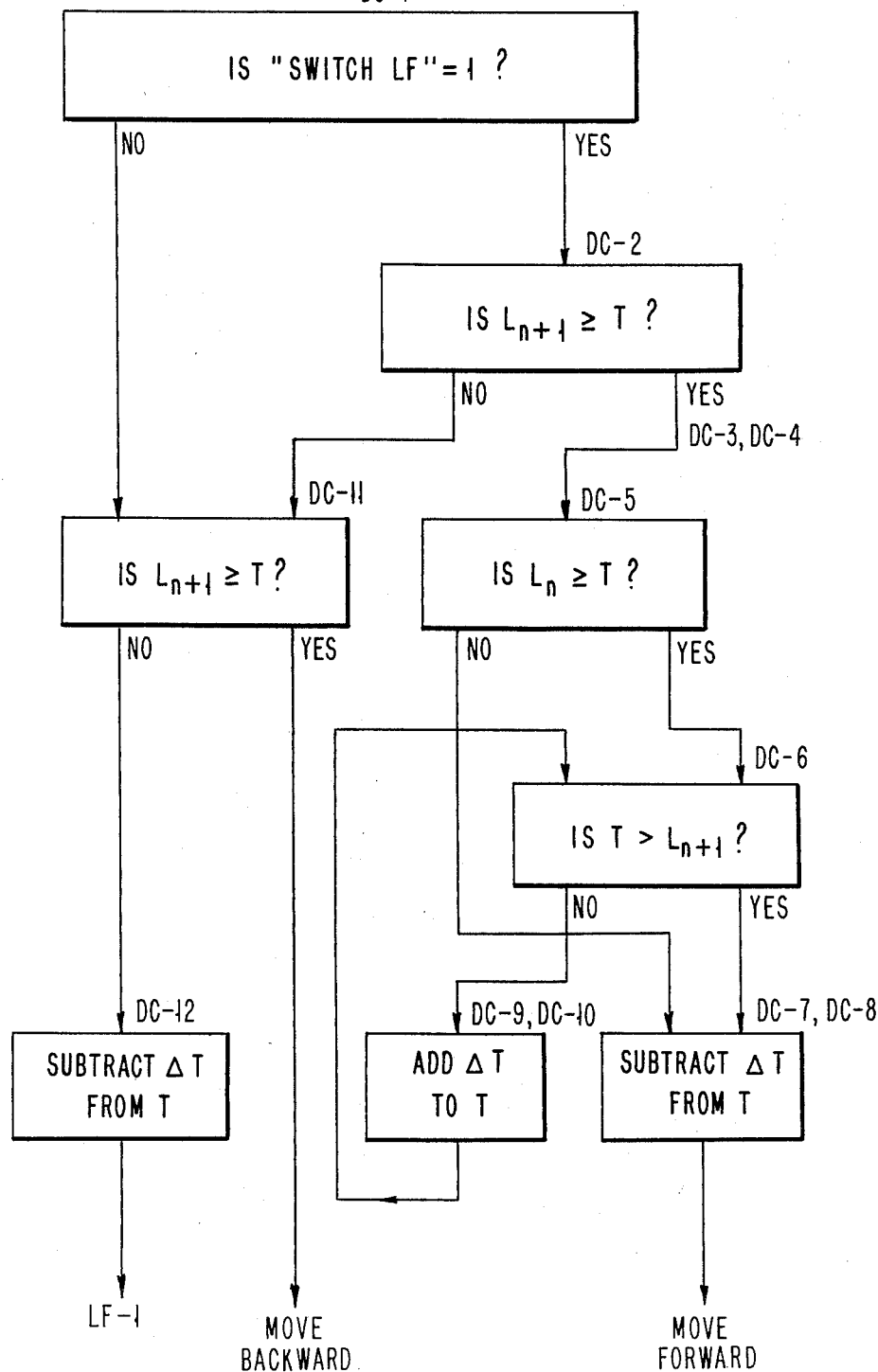
FIG. 20 DECODER CONTROL MICROPROGRAM

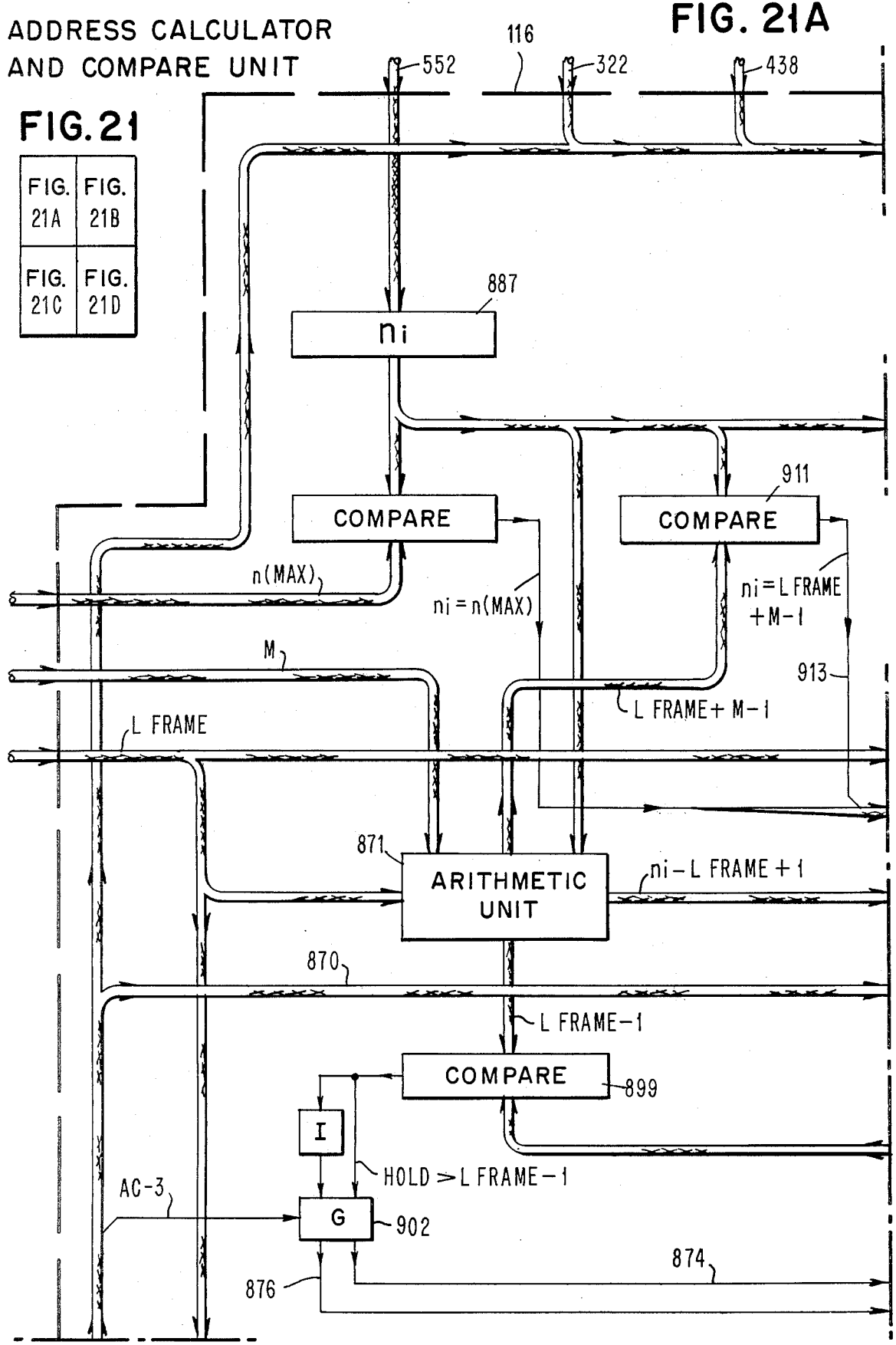

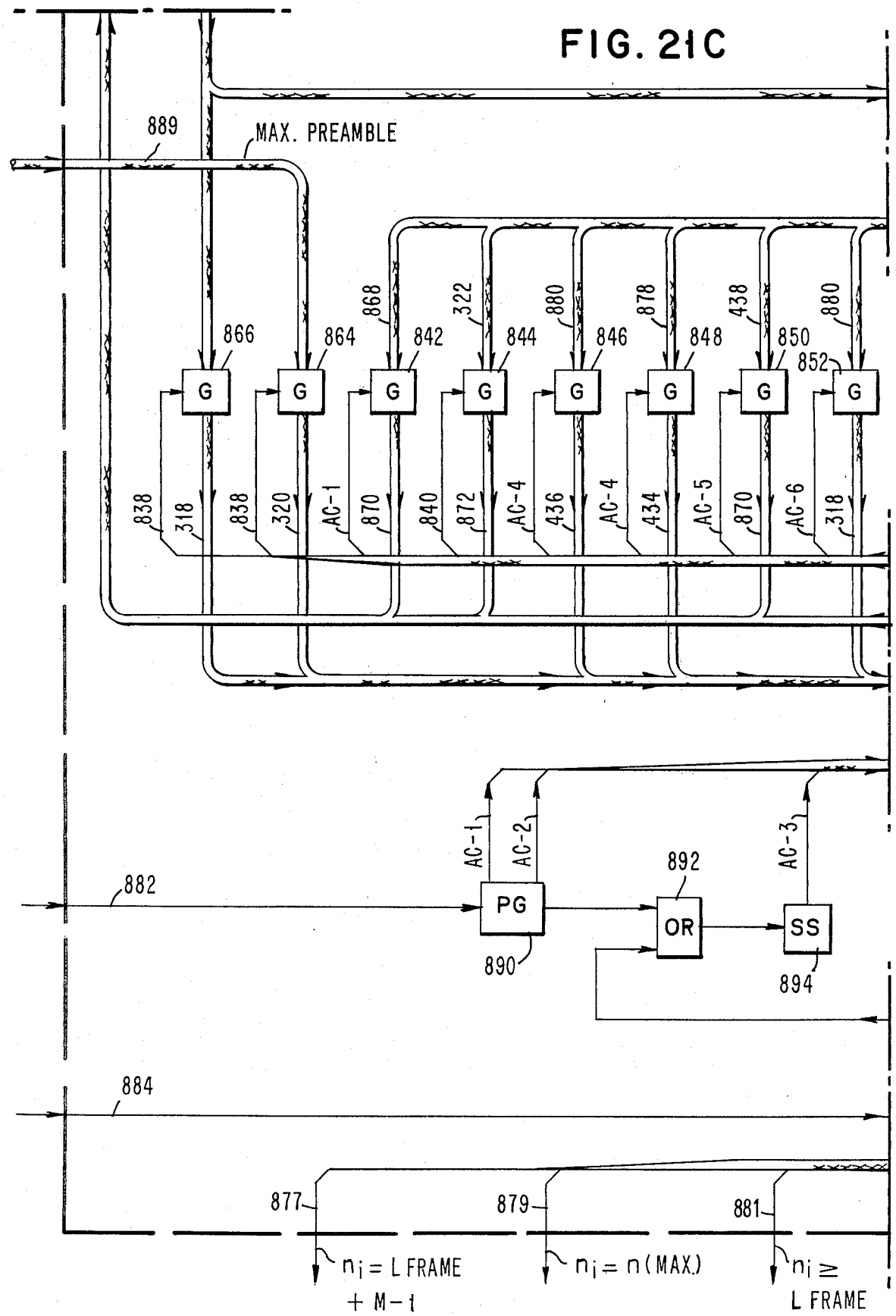

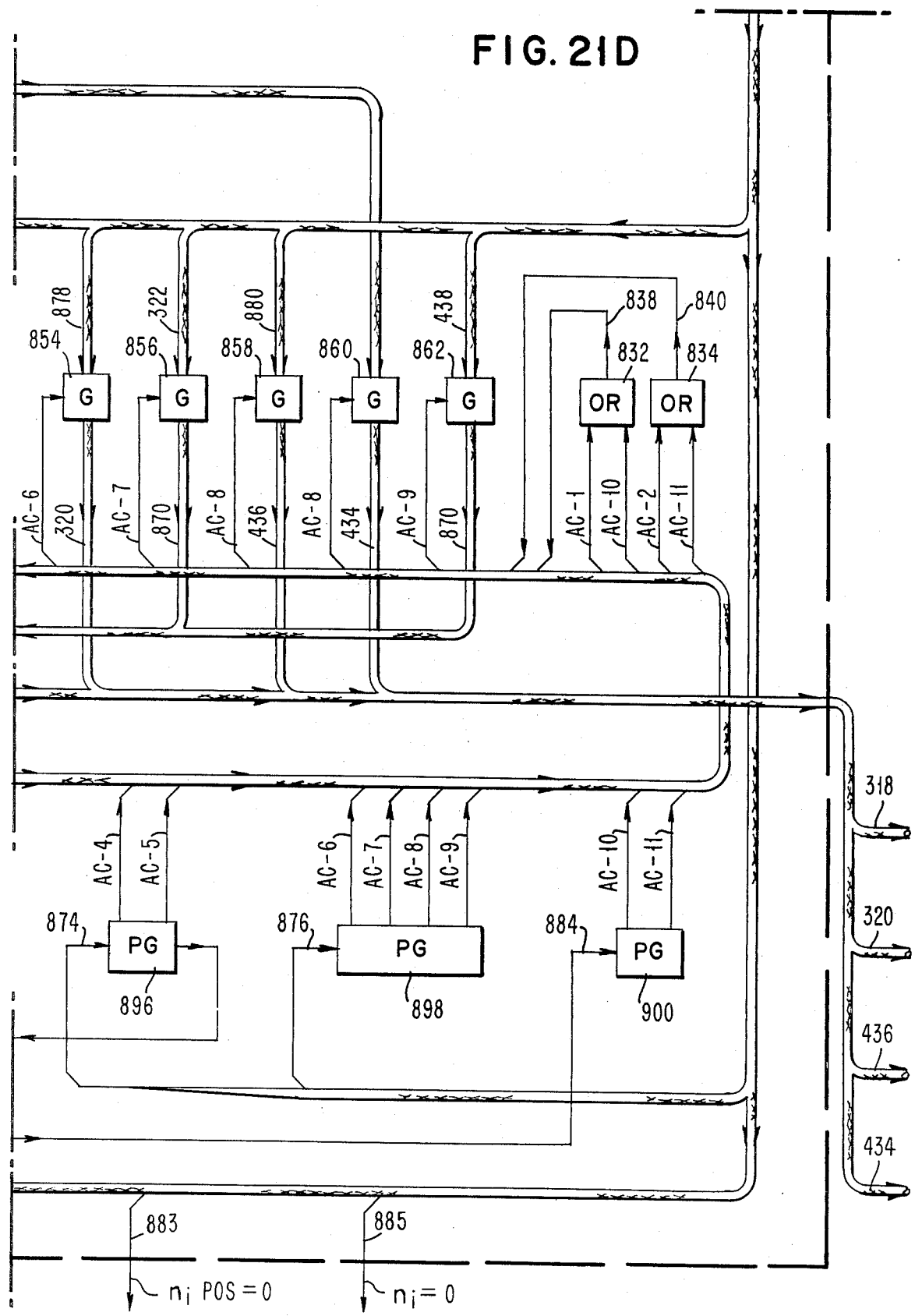

ERROR CORRECTION ON BURST CHANNELS BY SEQUENTIAL DECODING

BACKGROUND ART

Sequential decoding of convolutionally encoded data is a well known error correction scheme which has been used very successfully on channels with random noise. In U.S. Pat. No. 3,457,562 to Robert M. Fano, there is disclosed an error correcting sequential decoder wherein a sequential decoding receiver contains an encoder identical to that used in the transmitter whose signals it is attempting to decode. The information bits and parity bits which are detected by the receiver are compared with the information bits and parity bits generated within the receiver. The Hamming distance is computed for each generated information bit. The distance has subtracted from it a magnitude which will cause the difference to be a positive quantity where the information and parity bits correspond and a negative quantity where noise disturbs the received signal. A running sum of these positive and negative quantities is compared with a threshold which increases in stepwise fashion. Where the running sum drops below the threshold, the detection process ceases to go forward and reverses to re-examine previously assumed information bits until a sequence of information bits which results in the running sum once again assuming an increasingly positive value is obtained. Decoded information bits are available as an output where a predetermined bit distance exists between the available bit and the information bit which is then being examined.

As described in such patent, the essence of sequential encoding is the replacement of the "jumping" constraint of block encoding by a "sliding" constraint. In an (n,k) block code, a block of k information bits is caused to provide (n-k) parity bits which depend only on these k information bits. The k information bits and the corresponding (n-k) parity bits are transmitted as a block of n bits and are decoded independently of other similarly obtained blocks of n bits. By contrast, in sequential coding the parity bits are interspersed between successive information bits. The codewords in a convolutional code can be arranged in the form of a tree structure and the encoder selects a path through the tree governed by the information bits.

The sequential decoding operation may be regarded as the process of determining the path in the tree followed by the encoder. As the decoder proceeds to reconstruct a path through a tree based upon a received sequence, it compares the probability of the path that it is currently exploring against a threshold determined by the current noise level that the decoder expects. If the comparison is favorable (the path looks "sufficiently probable"), the decoder continues forward in the tree. If the comparison is unfavorable then either the decoder is on the wrong path because of an atypical noise event that occurred some time previously or the decoder is on the correct path and an atypical noise event is now occurring.

At this point the decoder makes the assumption that the path is incorrect. The decoder reverses itself and searches back in the attempt to find a more probable path. The distance it is allowed to go back in this search depends upon the particular decoding algorithm. For the moment assume that the decoder searches back until it either finds a "sufficiently probable" path or it retreats some fixed number $d_0$ nodes back without finding a good path. The former case implies that the first path was indeed incorrect as hypothesized and that the new path is more likely correct. The decoder thereupon proceeds forward. The latter case implies that the first path may still be correct and only appears improbable because of atypical noise behavior. The decoder relaxes its criterion of "sufficiently probable" and proceeds as before with a new threshold based upon the current assumption of the noise level.

While sequential decoding of convolutionally encoded data provides an effective error correction scheme for channels with random noise, sequential decoding cannot be used directly on burst noise channels, because bursts of errors cause a sequential decoder to do an enormous amount of searching, which results in the decoder not being able to decode in a reasonable amount of time.

One common method of transforming bursty channels into nonbursty channels is by the process of interleaving. A simple explanation of interleaving is as follows: let N be an integer such that $N=p.q$. Then a block of N digits $x_1, x_2, \ldots, x_N$, which is produced by the encoder and is to be transmitted, is input to a p-by-q rectangular array and the array is filled row by row. Once the array is full, the digits are transmitted column by column, so that the order of the digits going over the channel is $x_1, x_{q+1}, x_{2q+1}, x_{(p-1)q+1}, x_2, x_{q+2}$, etc. At the receiving end, a similar p-by-q matrix is filled up column by column and then read out row by row so that the original order of the encoder output digits is restored. It is now obvious that a burst in the channel will affect digits $x_i, x_{i+q}, x_{i+2q}$, etc. which are removed from each other by multiples of q positions. Thus, by this method a bursty channel can be made to look like a nonbursty channel.

The usual procedure is to use interleaving and then decode as if the channel were a nonbursty random noise channel. The degree of interleaving, q, is chosen to be much longer than the average length of a burst, so that errors in adjacent digits are now completely uncorrelated.

In U.S. Pat. No. 3,508,197 to Shih Y. Tong, there are disclosed single character error and burst-error correcting systems utilizing convolutional codes to correct any number of bit errors in a single character of I-bit length. The correction is accomplished at a receiving terminal by generating from a received sequence of characters an error pattern word which identifies the erroneous bits of the character in error and a locator word which identifies which of the received characters contains the erroneous bits. Upon detection of an erroneous character, the error pattern word is added to the erroneous character to obtain the corrected version thereof. The patentee proposes that by interleaving of characters the system can be used for burst-error correction.

In this patent to Tong, an algebraic type of decoding scheme, as opposed to sequential decoding, which is a probabilistic scheme, is employed for error correction. The interleaved burst channel is treated as a random noise channel. Treating an interleaved burst channel as a random noise channel results in a loss of capacity of the channel. It is of course possible to use this interleaving scheme with a sequential decoder as is done in G. D. Forney, Jr. and C. K. Bower, "A High-Speed Sequential Decoder: Prototype Design and Text", IEEE Transactions on Communication Technology, Vol. COM19, No. 5, Oct. 1971, pp.821-835. However, the loss in capacity results in a lower rate of information transmission.

Therefore, it is an object of the present invention to provide a sequential decoder for error correcting on burst noise channels of convolutionally encoded data whereby a minimum loss of capacity results from the interleaving of the burst channel.

It is another object to exploit the higher capacity of burst channels in a probabilistic error correcting decoder utilizing convolutional codes.

It is an object of the invention to provide a method of deriving information from previously decoded data, and using this information in decoding later data.

BRIEF SUMMARY OF THE INVENTION

A sequential decoder for error correction on burst and random noise channels uses convolutionally encoded data. The decoder interacts with a deinterleaver which time demultiplexes data from a data channel from its time multiplexed form into a predetermined transformed order. The decoder includes a memory for storing a table of likelihood values which are derived from known error statistics about the data channel, such as the probabilities of random errors and burst errors, burst error severity and burst duration. The decoder removes an encoded subblock of data from the deinterleaver and enters it into a replica of the convolutional encoder which calculates a syndrome bit from a combination of the presently received subblock together with a given number of previous subblocks stored in the convolutional encoder. The syndrome bit indicates if the current assumption of the path through the convolutional tree is correct. Where there is no error in the channel, then the received sequence is a code word and the syndrome bit indicates that the correct path in the convolutional code tree is taken.

A burst tracking and indicating device utilizes error predictability information derived about bursts as each row of the data from the deinterleaving buffer is decoded and thereby detects the occurrence of a burst error. This device generates burst indicator bits which indicate whether a burst error is likely to have occurred. The sequential decoder employs the syndrome bit together with the burst indicator bits to calculate an address in the table of error likelihood and error pattern values. The table contains likelihood values and error pattern values. The likelihood value is used to update a total likelihood value in the decoder control. The error pattern value that has been determined from the table is used to change the received subblock of data.

The newly derived total likelihood value is compared with a threshhold value to determine whether the decoder control should proceed forward or backwards on the subblock of data in the encoder replica. In this fashion, the likelihood of the nodes in the search tree are computed and used to guide the search. In operation, it can be generally stated that the decoder constantly examines the burst indicators to obtain the optimum updated likelihood values from the likelihood table.

BRIEF DESCRIPTION OF THE DRAWINGS

FIG. 5 shows one general arrangement of information bits in the deinterleaver.

FIGS. 6 and 7 show the decoder control and its search operation for determining forward or backward movements on the received subblock of data.

FIG. 10 comprises an organizational drawing for FIGS. 10A1–10H2.

FIGS. 10A1 and 10A2 through 10H1 and 10H2 arranged with FIGS. 10A1 and 10A2 at the top and FIGS. 10H1 and 10H2 at the bottom comprise a detailed circuit diagram of the sequential decoder, illustrative of the present invention.

FIG. 11 is a detailed drawing of the deinterleaver.

FIG. 14 is a detailed drawing of the random access memory.

FIG. 15 is a detailed drawing of the read only memory.

FIG. 16 is a detailed drawing of the L shift register.

FIG. 19 is a detailed drawing of the tail store.

FIG. 20 is a flowchart showing how the "decoder control" works.

DISCLOSURE OF THE INVENTION

Figure 1:
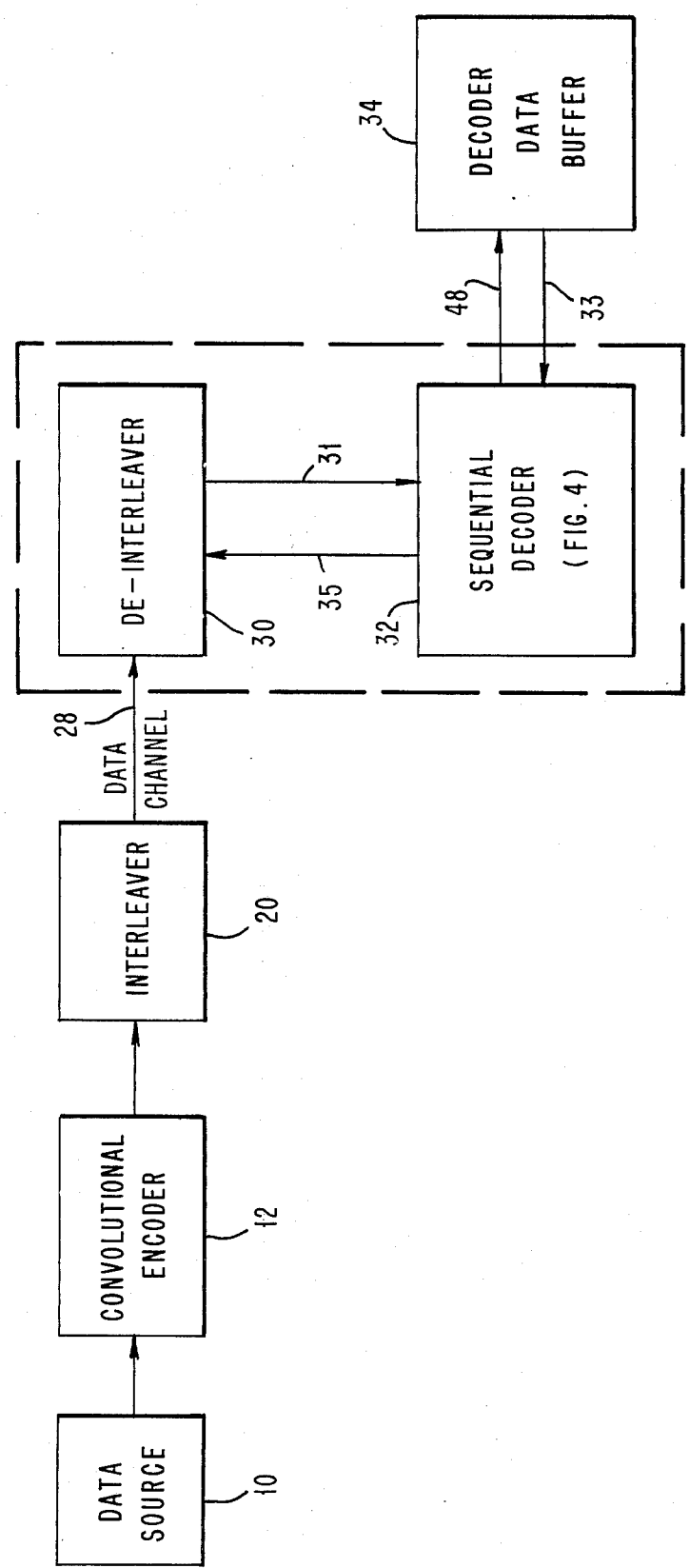
FIG. 1 is an overall block diagram of a system for error correction on a noisy data transmission line or data storage channel.

FIG. 1 is an overall block diagram of a system for error correction on a noisy data transmission means or data storage channel. A data source 10 generates data that is to be transmitted or stored. A convolutional encoder 12 takes the information bits and generates parity check bits which are added for error correction purposes to produce the encoded data.

Figure 2:
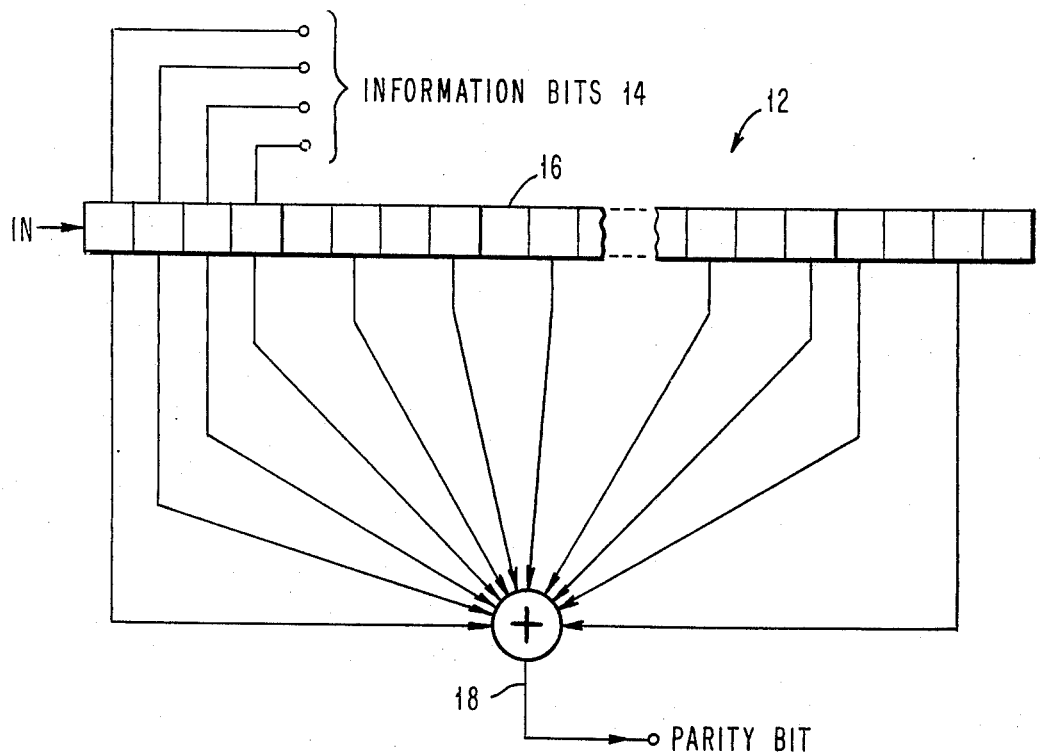
FIG. 2 shows a conventional rate 4/5 systematic convolutional encoder.

FIG. 2 shows an example of a typical rate 4/5 systematic convolutional encoder. Four information bits 14 are shifted into a shift register 16 and one parity bit 18 is generated which is the exclusive OR (modulo-2 sum) of some of the information bits in the shift register 16. These five bits on lines 14 and 18 constitute one subblock of data that is fed serially into an interleaver 20 shown in FIG. 1. The interleaver 20 rearranges the order of the bits output by the encoder 12 from its received order into a predetermined transformed order.

Figure 3:
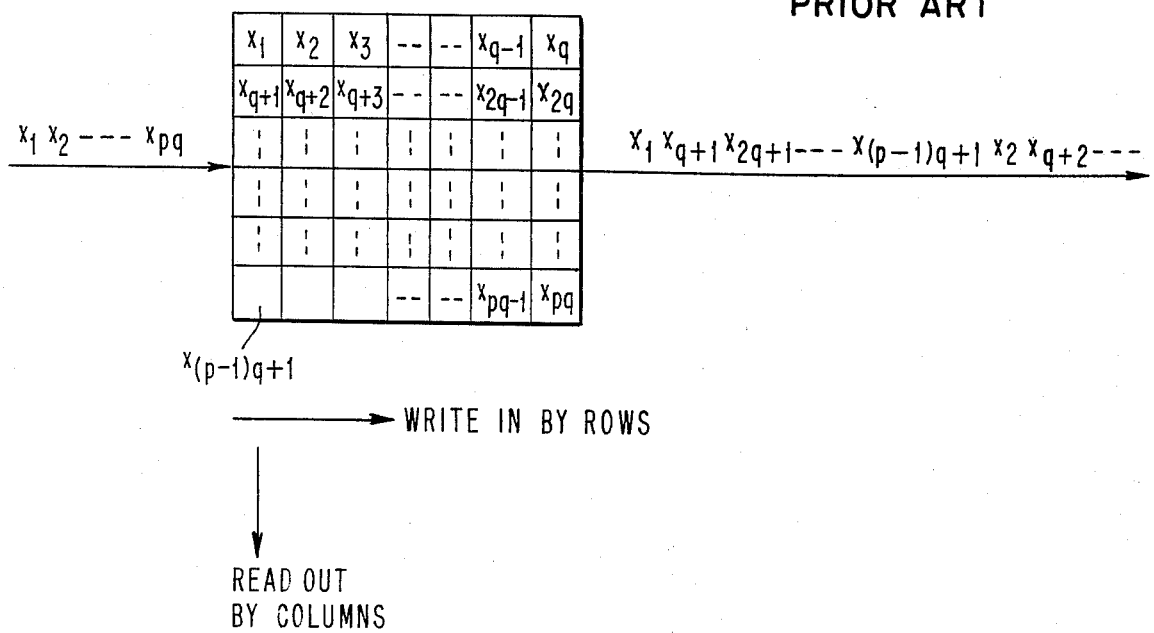
FIG. 3 shows a conventional interleaver that can be employed with the system of the present invention.

FIG. 3 shows the operation of one conventional interleaver that can be employed with the system. It consists of a two dimensional array 22 of bits of size p (rows)×q (columns). Data is written into the array 22, row by row, and read out, column by column. An input stream $x_1x_2x_3 \ldots x_{pq}$ on line 24 is transformed into the stream $x_1x_{q+1}x_{2q+1} \ldots x_{(p-1)q+1}x_2x_{q+2}$ on line 26.

Referring again to FIG. 1, the time-interleaved data is transmitted on a data channel 28. A deinterleaver 30 performs the inverse operation of the interleaver 20. Deinterleaver 30 also consists of a (p×q) array of bits similar to that of the interleaver 20, but data from the channel 28 is written into it column by column and read out by a decoder 32 in row-by-row fashion.

The purpose of the interleaver 20 and deinterleaver 30 combination is to separate errors that may be caused by a burst on the data channel 28. A burst will affect bits in the same column, but since decoding is performed row by row, the consecutive errors over the channel will be separated from each other by multiples of q bits. Optionally, the first few rows of the array of the interleaver 20 may contain a fixed sequence, e.g., all zeros, called the preamble. The preamble is used by the decoder 32 to obtain information about the data channel. The decoder 32 uses redundancy introduced by the encoder 12 to correct errors that may have occurred during data transmission or storage. Details of the decoder 32 are shown and described with reference to FIG. 4 as well as other figures. The decoded data is finally stored in a decoded data buffer 34.

Figure 4:
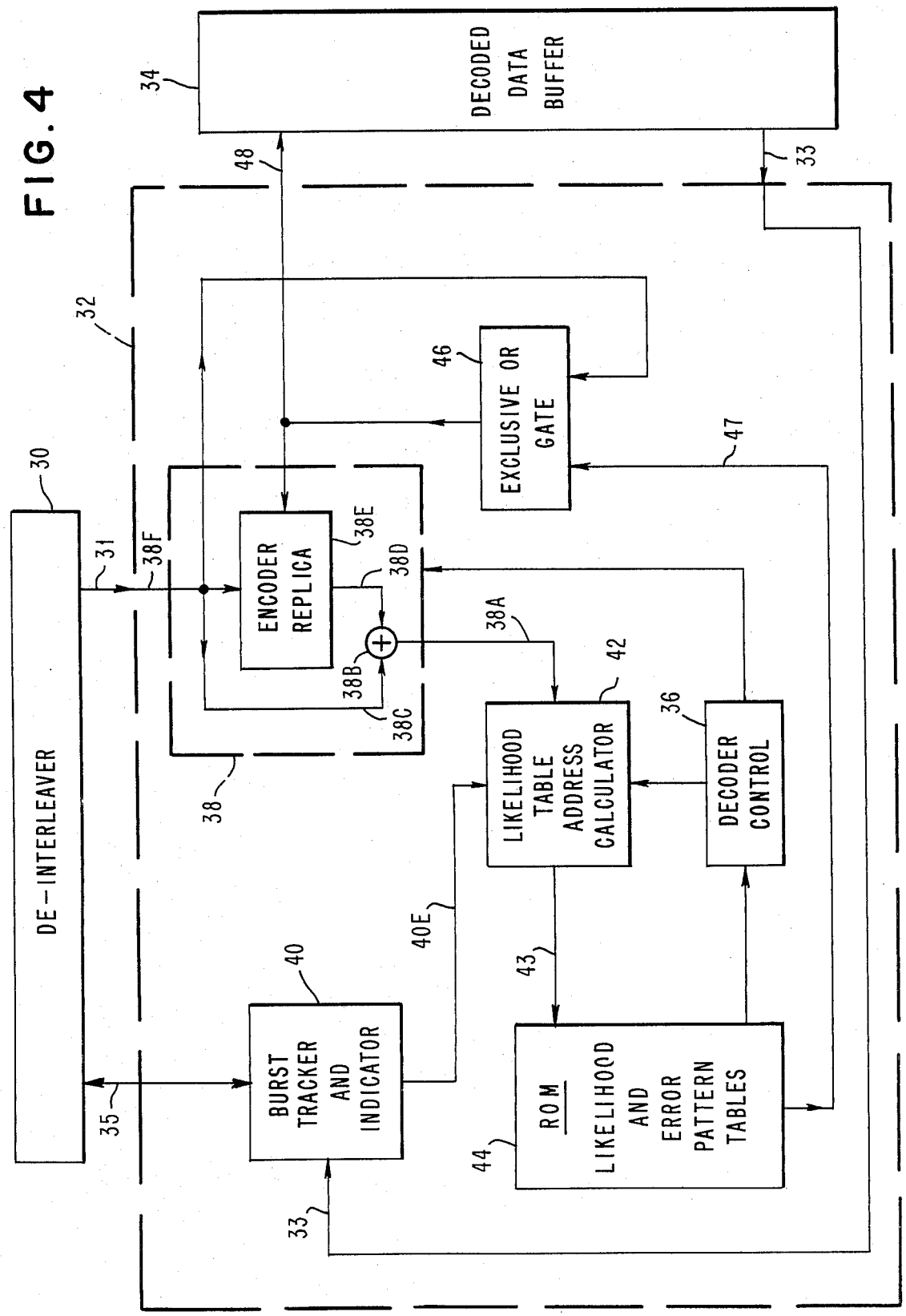
FIG. 4 is a detailed block diagram of the sequential decoder, illustrative of the present invention.

FIG. 4 shows a detailed block diagram of the decoder 32. The decoder accesses data from the deinterleaver, one subblock at a time via line 31. The first few rows $n_{pr}$ of the deinterleaver 30 may contain a preamble so that the first subblock of data to be decoded may be in row $n_{pr}+1$. See, for example, FIG. 5 which shows one general arrangement of information bits in the deinterleaver.

Figure 6:
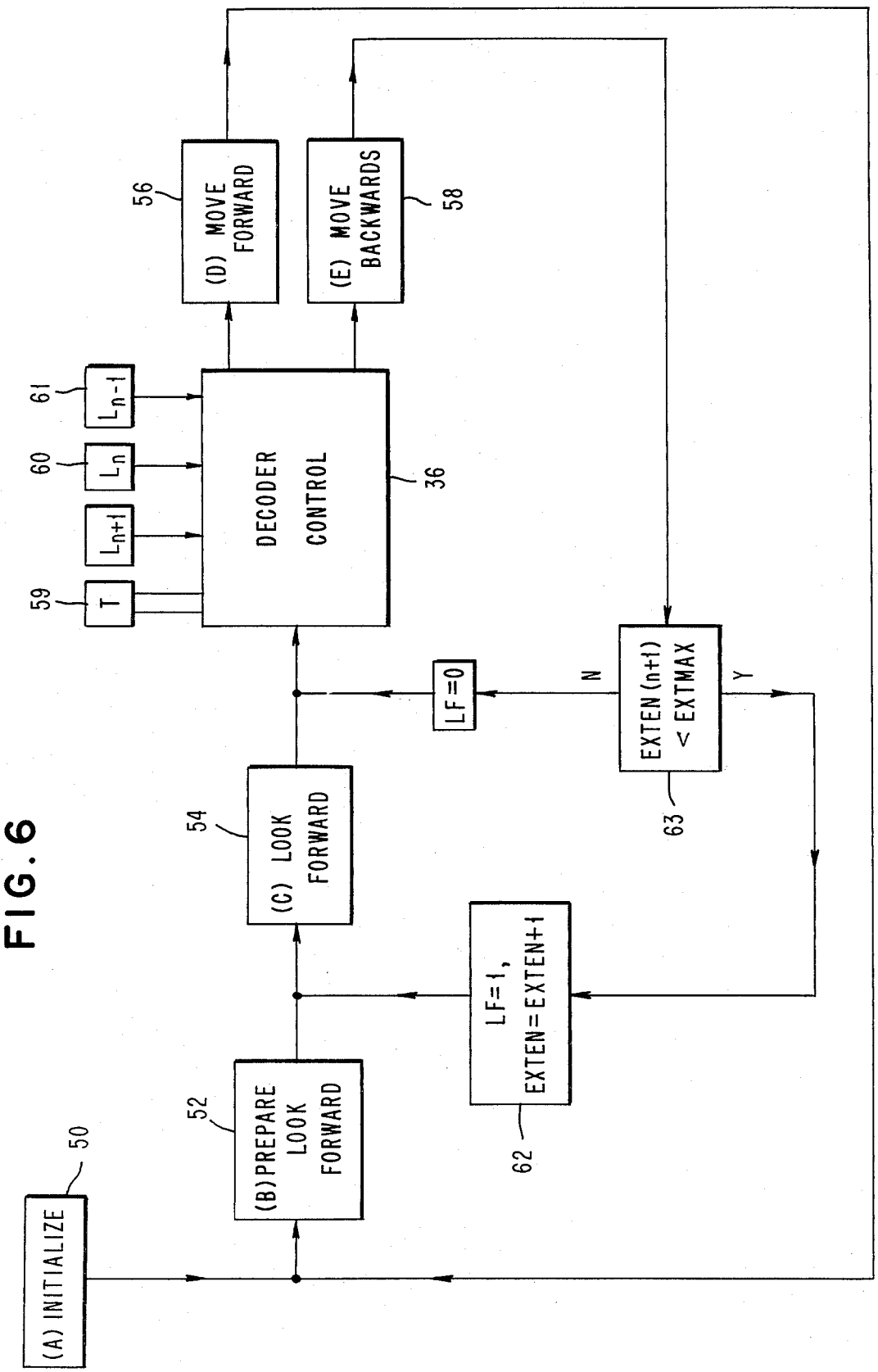

The main parts of the decoder are a decoder control 36, a syndrome generator 38, a burst tracker and indicator 40, a likelihood table address calculator 42, and likelihood and error pattern tables 44. One main feature of the present invention is the interaction of the decoder 32 with the deinterleaver 30 and the channel 28. The known channel statistics, burst and random bit error probabilities and burst severity and burst length statistics, are used to create the likelihood and error pattern tables 44 which are precalculated and prestored in a ROM memory. The decoder control 36 contains the logic which controls the decoder search operation. Its main function is to determine whether to make a forward or backward move, based on a comparison of the current likelihoods and the current threshold. Decoder control 36 also computes the current likelihood value using data from the likelihood and error pattern tables 44 and readjusts thresholds during decoding. Details of the decoder search strategy are shown in FIGS. 6 and 7.

The syndrome generator 38 computes on line 38A the syndrome bit, which is the exclusive OR at 38B of the received parity bit on line 38C and the parity bit generated on line 38D by a replica of the encoder, referred to as an encoder replica 38E. On a forward move, a shift register in the encoder replica 38E is shifted forward and a new subblock of received information bits from the deinterleaver 30 are fed into the shift register via line 38F. Both the line 38F for received information bits and the line 38C for received parity bits are shown as part of the line 31 from the deinterleaver 30.

A burst tracker and indicator 40 compares previously decoded bits, stored in the decoded data buffer 34, with corresponding received bits in deinterleaver 30. The connecting lines are shown in both FIGS. 1 and 4 by numerals 33 and 35. This comparison generates on line 40E an indicator which indicates the reliability of a bit which is in the current subblock, e.g., it can indicate whether the bit is likely to be within a burst error. An indicator is generated for each bit in the current subblock.

Figure 8:
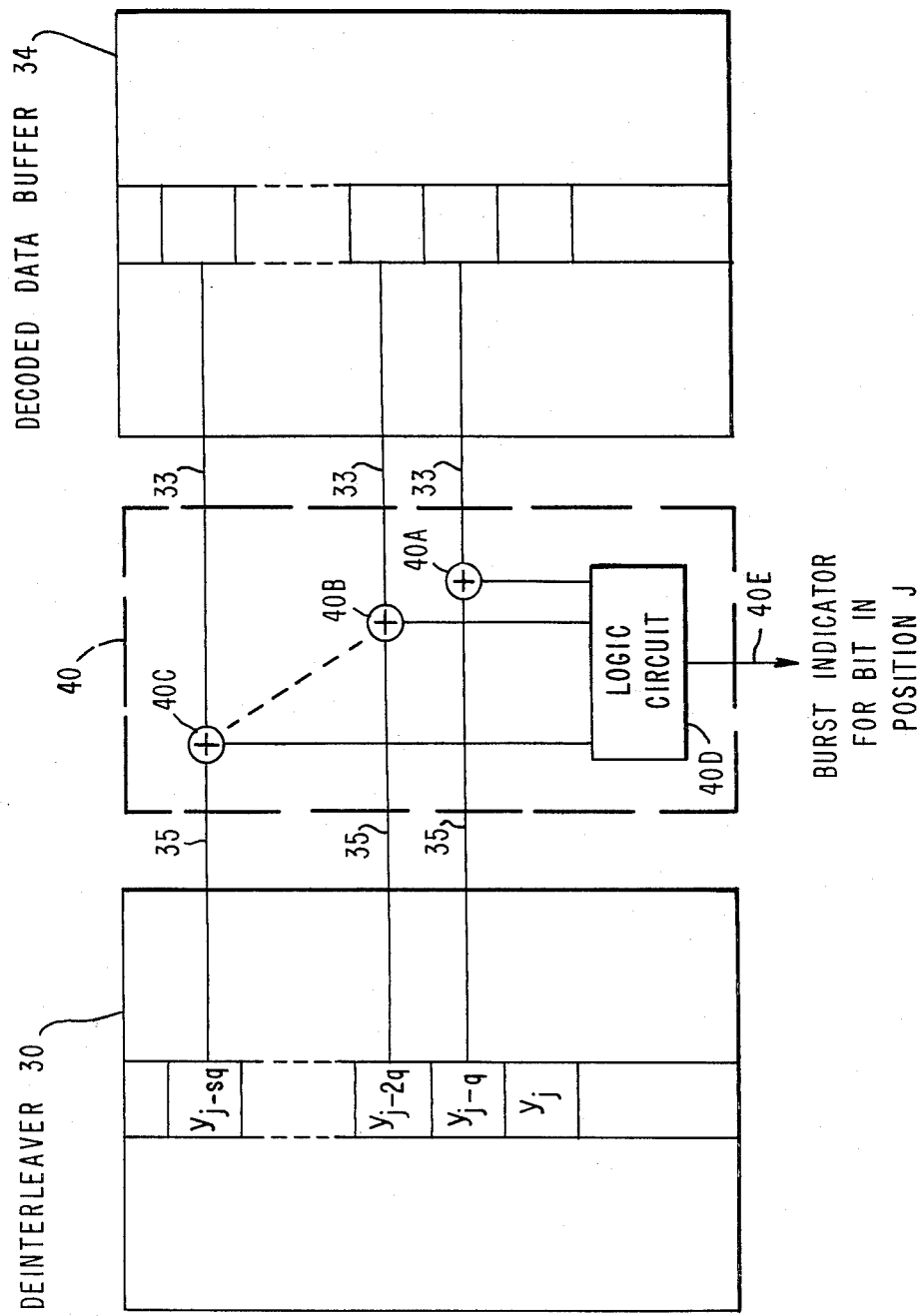
FIG. 8 shows the burst tracker and indicator and its interconnections with both the deinterleaver and the decoded data buffer.

A simple example of how such an indicator may be generated is shown in FIG. 8. To generate an indicator for the bit in position j, received bits in positions j-q, j-2q, ... j-sq are compared by performing exclusive OR operations at 40A, 40B and 40C, respectively, with the corresponding bits in the decoded data buffer 34. The results of the comparison are input to a logical circuit 40D whose output 40E is the burst indicator described above. For example, the logical circuit 40D may simply OR all the input bits. Then, an output of "0" means that no errors have been detected by the decoder in the s bits directly preceding bit j. Consequently, bit j is not likely to be part of a burst error. However, if the output of the logic circuit 40D or the OR gate is "1", bit j is more likely to be part of a burst error. In essence, the indicator 40 provides on its output 40E some measure of the reliability of bit j, and this information is utilized by the decoder in making its decisions and guiding its search. While FIG. 8 serves as only a simple example, it is to be understood that more complicated burst indication techniques may be utilized. The employment of such burst indicators to adjust the likelihood values leads to the improved performance of the system. In the example provided above, the burst indicator 40 can take on only two values, "0" or "1", but in a more general indicator scheme the indicator 40 could provide numerical values over a large range. The indicator values are used to compute the likelihood value for the current subblock.

The value of the likelihood to be used depends on the syndrome bit provided on line 38A from the syndrome generator 38, the values of the indicators on line 40E for the bits in the current subblock, and the extension number EXTEN derived in the decoder control 36, as will be explained with reference to FIG. 6. The likelihood can either be computed or obtained by table lookup. If the range of indicator values is small, e.g., 0, 1, as in the example, it is more efficient to obtain the likelihood by table lookup. The table address calculator 42 uses the current syndrome bit and burst indicator values for each of the bits in the current subblock to calculate the address of the likelihood table to be used for the current subblock. The likelihood values have been pre-computed from knowledge of the channel error statistics, such as probability of random errors, probability of burst errors, average burst length, burst severity, etc. The calculated address is provided on line 43 to the likelihood and error pattern tables 44.

The likelihood and error pattern tables 44 contain likelihood values and error patterns for each combination of syndrome bit and indicator bits. For each such combination, the likelihoods and error patterns are stored in order of decreasing likelihood. This allows the more likely error patterns to be investigated first. For each combination, the order may be different. The Table I below shows an example of two likelihood tables, for a rate 4/5 code and a particular choice of channel parameters. Both are for the case when the syndrome bit is 0. In the first case, the indicator bits are all 0's; in the second case, the indicator bits are 00011.

TABLE I

EXAMPLE OF TWO LIKELIHOOD TABLES FOR A RATE 4/5 CODE

| Extension No. | SYNDROME BIT 0 INDICATORS 0 0 0 0 0 | | SYNDROME BIT 0 INDICATORS 0 0 0 1 1 | |
|---|---|---|---|---|
| | Error | Likelihood | Error | Likelihood |
| 1 | 0 0 0 0 0 | 4.0 | 0 0 0 0 0 | 2.06 |
| 2 | 1 1 0 0 0 | −22.57 | 0 0 0 1 1 | 1.95 |
| 3 | 1 0 1 0 0 | −22.57 | 1 0 0 1 0 | −11.28 |
| 4 | 1 0 0 1 0 | −22.57 | 0 1 0 1 0 | −11.28 |
| 5 | 1 0 0 0 1 | −22.57 | 0 0 1 1 0 | −11.28 |
| 6 | 0 1 1 0 0 | −22.57 | 1 0 0 0 1 | −11.28 |
| 7 | 0 1 0 1 0 | −22.57 | 0 1 0 0 1 | −11.28 |
| 8 | 0 1 0 0 1 | −22.57 | 0 0 1 0 1 | −11.28 |
| 9 | 0 0 1 1 0 | −22.57 | 1 1 0 0 0 | −24.51 |
| 10 | 0 0 1 0 1 | −22.57 | 1 0 1 0 0 | −24.51 |
| 11 | 0 0 0 1 1 | −22.57 | 0 1 1 0 0 | −24.51 |
| 12 | 1 1 1 1 0 | −49.14 | 1 1 0 1 1 | −24.63 |
| 13 | 1 1 1 0 1 | −49.14 | 1 0 1 1 1 | −24.63 |
| 14 | 1 1 0 1 1 | −49.14 | 0 1 1 1 1 | −24.63 |
| 15 | 1 0 1 1 1 | −49.14 | 1 1 1 1 0 | −37.85 |
| 16 | 0 1 1 1 1 | −49.14 | 1 1 1 0 1 | −37.85 |

The decoder data buffer 34 stores decoded data, which is derived from the received data and the error pattern obtained by the decoder 32 from the likelihood and error pattern tables 44. The received data on line 31 from the deinterleaver 30 is applied to an exclusive OR gate 46 together with the error pattern outputted on line 47 from the likelihood and error pattern tables 44. The output of gate 46 is applied on line 48 to the decoded data buffer 34.

FIGS. 6 and 7 show the search method employed by the decoder control 36 shown in FIG. 4. As mentioned previously, the value of the likelihood to be used depends on the syndrome bit provided on line 38A from the syndrome generator 38, the values of the indicators on line 40E for bits in the current subblock, and the extension number EXTEN derived in the decoder control 36. The decoder control 36 contains the logic which controls the decoder search operation and makes the determination of whether to make a forward or backward move based on the comparison of the current likelihoods and the current threshold. The steps of the decoder control operation are shown in FIG. 6 as steps A through E and indicated, respectively, by the blocks 50, 52, 54, 56 and 58. The first step A is the initialization step shown by block 50 wherein the preamble is evaluated, the burst indicator is set, and all shift registers are set to zero. Also, the shift register T, indicated by 59 is set with T=0, the shift register $L_n$ indicated by 60, is set with $L_n=0$, and the shift register 61 is set with $L_{n-1}$=minus ∞, and the counter value n is set=0.

In the step B indicated by block 52, a prepare look forward operation is carried out whereby the received subblock n+1 is read into the encoder replica shift register 34 shown in FIG. 4, the syndrome bit is determined, the indicator bits are determined and the extension number EXTEN is set=1 and the look forward LF is set=1.

In the look forward step C, the table address for subblock n+1 is computed from the syndrome bit value and the indicator bit values. The increment in likelihood $\lambda_{n+1}$ is taken from position EXTEN in the table. The corresponding error pattern is also obtained from the table. The following calculation is made $L_{n+1}=L_n+\lambda_{n+1}$. The decoder control 36 uses the values $L_{n-1}$, $L_n$ and $L_{n+1}$ to decide whether to move forwards or backwards. The logic used in making this decision is shown in FIG. 7.

Block 56 shows the move forward step wherein all registers are shifted one step to the right such that all $L_{n+1} \rightarrow L_n \rightarrow L_{n-1}$, and the counter number n is set to n+1.

Figure 9:
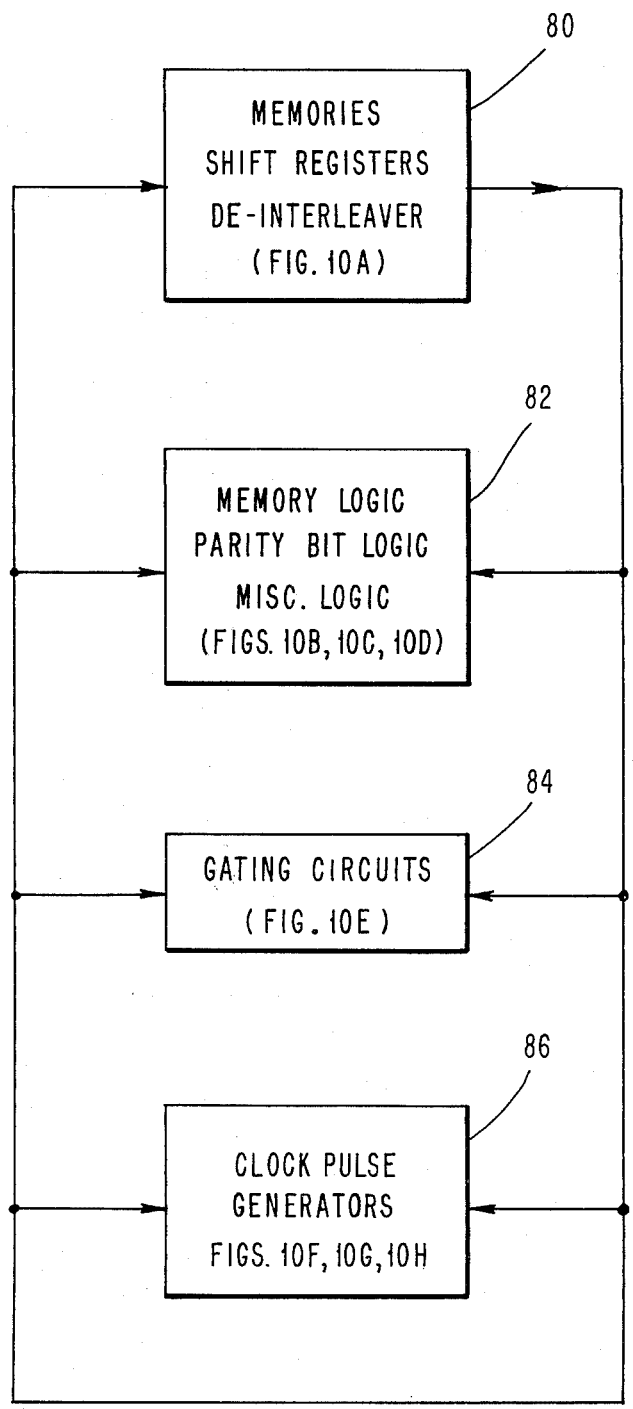
FIG. 9 shows the layout of the FIGS. 10A1 and 10A2 through 10H1 and 10H2 of the sequential decoder and the circuits generally shown in each such FIG.

In the move backward step indicated by block 58, all registers are shifted one step to the left such that $L_{n+1} \leftarrow L_n \leftarrow L_{n-1}$. In the move backward step the table address is obtained for subblock n−1 and $\lambda_{n-1}$ is taken from the table and $L_{n-1}$ is calculated as $L_{n-1}=L_n-\lambda_{n-1}$. FIG. 9 is a circuit layout of the sequential decoder shown in detail in FIGS. 10A through 10H. Four circuit blocks are shown, the first block 80 comprising the circuits of FIG. 10A which includes the memories, shift registers and the deinterleaver. The second block 82 comprises the circuits of FIGS. 10B, C and D and includes the memory logic, parity bit logic and miscellaneous logic. The third block 84 comprises the gating circuits shown in detail in FIG. 10E. The fourth block 86 comprises the clock pulse generators shown in detail in FIGS. 10F, G and H. The circuits shown in the blocks 80, 82, 84 and 86 are connected to each other and operate together in the manner to be described below with respect to FIGS. 10-21.

The FIGS. 10A1 and 10A2 through 10H1 and 10H2 are arranged with FIG. 10A1 at the top left, FIG. 10A2 at the top right, FIG. 10H1 at the bottom left and FIG. 10H2 at the bottom right. The interconnection of the wiring diagrams for these figures is shown in FIG. 10H2. It is to be understood that in later references to these figures, the suffixes "1" and "2" will be omitted, it being assumed that both of the left and right sheets are included. For example, any reference to FIG. 10A automatically includes both of the left and right sheets designated as FIGS. 10A1 and 10A2.

Figure 12:
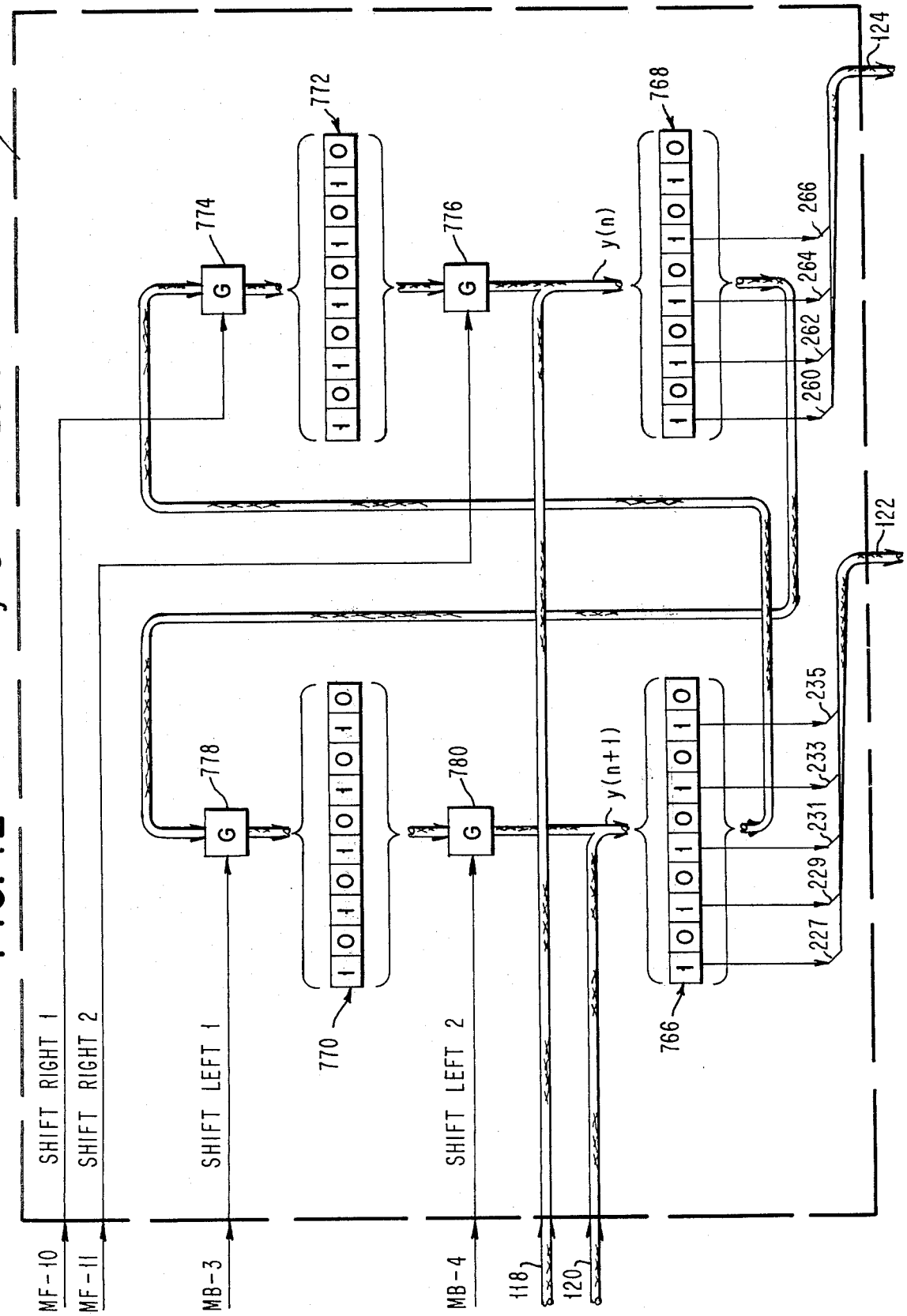
FIG. 12 is a detailed drawing of the y shift register.

FIG. 10A shows on the top a y shift register 102 and an x shift register 104. These two registers together with the parity bit logic of FIGS. 17A and B constitute the encoder replica 38E shown in FIG. 4. Information about burst tracking indications is stored in the ROM 110 (further shown in FIG. 15). These are actually the likelihood and error pattern tables 44, shown in FIG. 4, which are precalculated and stored only once in the read only memory 110. An L shift register 112 (further shown in FIG. 16) contains the three likelihood values which are used in the decoder control 36 to determine the action of the decoder, whether to move forward or backward or whether to change the threshold. In FIG. 10B, the ROM address logic 114 (shown in detail in FIGS. 18A and B) is used to calculate the address of the ROM table and it uses the data from the encoder replica 38E shown in FIG. 4 and to be further described, and it uses also the information from the burst tracking and burst indication unit which is stored in the RAM 108. FIG. 10B on the bottom describes the adder, which is used to add the likelihood values and to update the likelihood values which come out of the ROM 110 address and are used in the decoder control. FIG. 10C shows many of the calculations for the deinterleaver address which is used to get a particular subblock out of the deinterleaver 30, and it also counts the actual number of the subblock and whether the subblock is in the preamble or in the postamble. An address calculator and compare unit 116 is shown. FIG. 10D provides the decoder control with the actual values. For example, a compare unit 126 compares the three likelihood values with the threshold and provides values to the decoder control in order to determine the action of the decoder. In FIG. 10E, there is shown the timing gates and the timing pulses. FIGS. 10F, 10G and 10H show the operation of the gating and clock pulse generators for the system. FIG. 11 is the deinterleaver 30 with a memory data register (MDR) 764 and the read gating circuits constituting two parts. Two parts of the deinterleaver address constitute the number of the row and the number of the column in the deinterleaver. FIG. 12 together with FIG. 13 comprise the y shift register 102 and the x shift register 104 of the encoder. FIG. 14 shows the random access memory where all the information about the path and the burst indicators is stored. In FIG. 16 are three registers which contain the three values of the likelihood and are used in the decoder control. FIG. 17 contains the parity bit logic used together with the y shift register (FIG. 12) and x shift register (FIG. 13) to get the syndrome bit, and FIG. 18 serves to update the burst indicators and uses the information from the error pattern and from the previous burst indicators which are stored in the RAM memory to update the burst indicators and get new burst indicators. FIG. 19 is the tail store, in a particular store which stores the syndrome bit in the tail. It is only used when the decoder reaches the end of the deinterleaver. FIG. 20 describes the decoder control logic.

DEINTERLEAVER

The deinterleaver 30 is shown on FIG. 11 as comprising 64 memory boxes 202. The labelled 0 is at the left and the box labelled 63 is at the right. Each box can contain 256 words of five bits each. The deinterleaver is loaded with the data from the recording channel by conventional means. This may take the form of some general purpose computer program which accomplishes this loading which will be described as follows. When the deinterleaver is loaded, it is loaded column by column, starting with the left-hand box and finishing with the right-hand box. Conventional deinterleaver memory loading controls not shown on FIG. 11 can be employed for this loading operation. One way to accomplish this loading would be to regard each column as a memory word of 256 bits and provide some kind of a memory data register which could be loaded and then transferred to the memory at the proper column, starting with the left-hand column and proceeding through all the way to the extreme right-hand column. This embodiment only uses the read feature of the deinterleaver. A 14-bit address is necessary, this being divided up into two sections, one of 8 bits and one of 6 bits. With a memory address of 14 0's, the top row in the left-hand box would be addressed. With a memory address of 13 left-hand 0's and a single right-hand 1, the top row in the second box or number 1 box would be selected, and so on. A memory address of 6 right-hand 1's and 8 high order 0's would address the top row in the extreme right-hand box. To accomplish this, the decoder 752 is used which decodes the low order 6 bits of the address in the address register 760. The output of this decoder then selects one of the 64 possible memory boxes which are numbered 0 through 63. Gates 200 are provided to the memory boxes 202. The high order 8 bits are then directed to the proper box and pick out the row of 5 bits which is placed in the memory data register 764. It will be noted that the decoder 762 not only selects the box to which the high order 8 bits of the memory address are directed but also directs the reading pulse which comes in on wire 386 to the proper box.

The amount of data which is placed in the deinterleaver 30 is known as a frame, and the letter "L" is used to indicate the length of the frame. The frame thus contains L subblocks, each subblock of which is four information bits plus one parity bit, and the first subblock has an address in the deinterleaver of zero. The last subblock thus has an address equal to $L_{frame}-1$. The length of the postamble is the same number of bits as the length of the x shift register 104. In this embodiment, therefore, M would be equal to 32. This postamble is also referred to as the "tail". The decoder knows it is in the tail if $n_i$ is greater than $L_{frame}-1$. When working in the tail, it is necessary to know the position in the subblock that is addressed in the interleaver because the only thing recorded for each subblock in the tail is the parity check bit, to be described below. In other words, instead of recording five bits and a parity bit, only the parity bit is recorded. The reason for this is that, in the tail, the first four bits are all zeros and thus it is unnecessary to transmit four zeros and also undesirable to transmit four zeros because there might be errors in the transmission. Even if the four zeros were transmitted, it would be necessary to reset the four positions in the subblock to zero before the decoding were started.

y SHIFT REGISTER

This shift register 102 is shown in FIG. 12 in detail and comprises a two stage shift register and can shift either to the right or left. Information is held in the registers 766 and 768. The registers 770 and 772 are intermediate registers which are used only on the shifting operation. If it is desired to shift the information in register 766 to register 768, a pulse is first applied to the "shift right 1" which extends to gate 774. This permits information from register 766 to be gated to register 772. After this is done, a pulse is applied to the "shift right 2" line which extends to gate 776. This causes the information held temporarily in register 772 to be shifted downwardly to register 768.

To shift information from register 768 to register 766, a pulse is applied to the "shift left 1" line which extends to gate 778. This permits the information in register 768 to be entered into register 770. After this is done, a pulse is applied to the "shift left 2" line which extends to gate 780. This causes the information in register 770 to be shifted downwardly to register 766. On FIG. 12, it will be noted that information is available from register 768 on cable 124 and from register 766 on cable 122. Register 766 can be loaded by information coming in over cable 120 and register 768 can be loaded by information coming in over cable 118.

It is noted that the y shift register can be extended to contain more than two values. It would serve as a buffer, reducing the number of deinterleaver accesses.

x SHIFT REGISTER

Figure 13B:
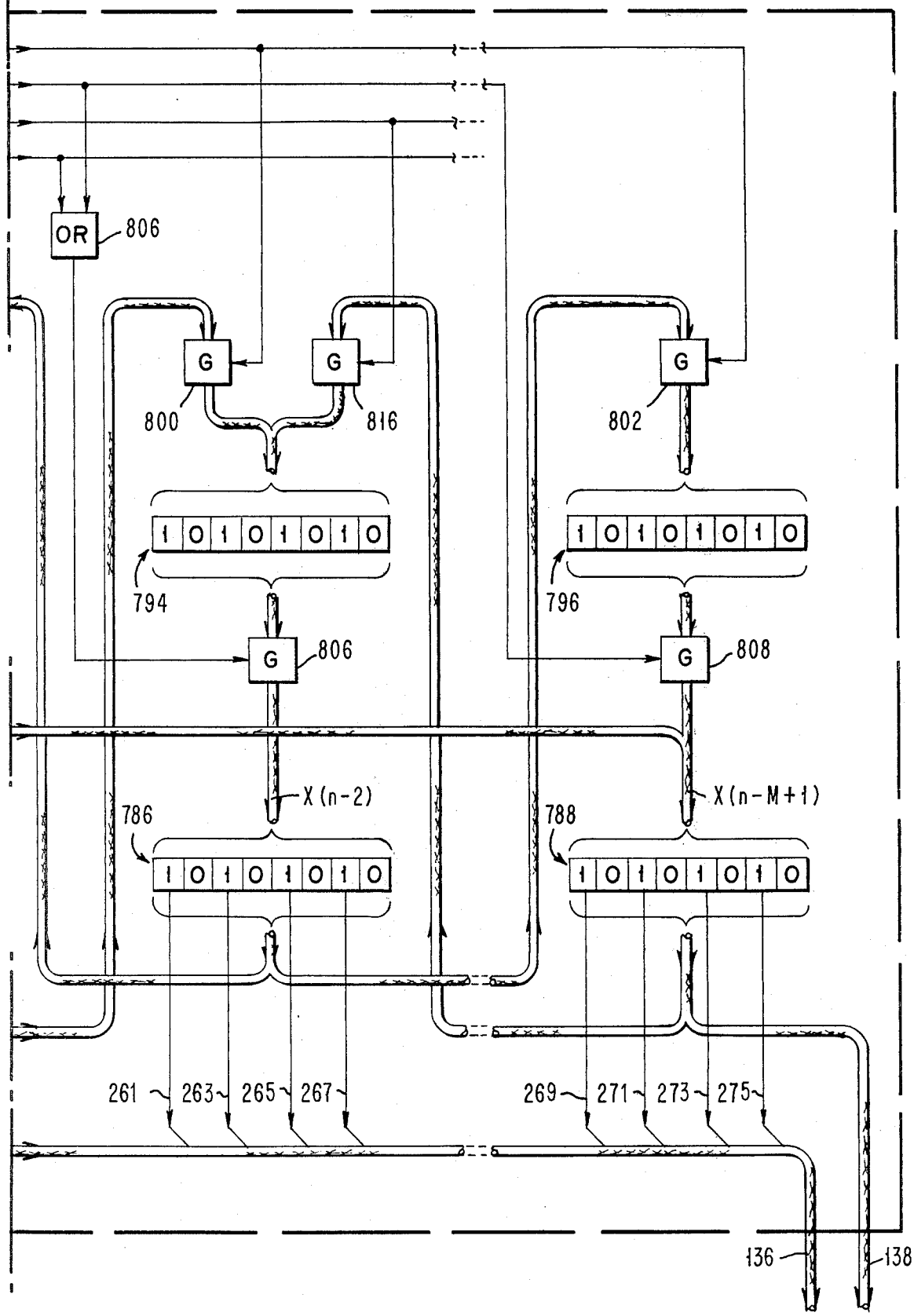
FIG. 13 comprises an organizational drawing for FIGS. 13A and B.
FIGS. 13A and B comprise a detailed drawing of the x shift register.

This shift register 104 has 32 positions in the embodiment shown on FIG. 13. FIG. 13 shows the three left-hand positions and the most extreme right-hand position. In other words, registers 782, 784 and 786 are the three left-hand positions and register 788 is the extreme right-hand position. Data is fed from these registers on lines 244, 247, 249, 251, 253, 255, 257, 259, 261, 263, 265, 267, 269, 271, 273 and 275 on cable 136 to a series of AND gates 277a through p in the parity bit logic 214 of FIG. 17. Registers 790, 792, 794 and 796 are intermediate position registers used only on a shift operation. A shift right operation can be described as follows. A pulse is applied to the "shift right 1" line which causes gates 798, 800, and 802 to be enabled. It will be understood that between gates 800 and 802 there are many similar gates. Information in register 782 will thus be gated into register 794. Information in register 786 will be gated to the next position to the right which is not shown on FIG. 13. Information coming from the next to the rightmost register will extend through gate 802 and go into register 796. When this has been accomplished, a pulse is applied to the "shift right 2" line which extends through OR circuit 804 to enable gate 804. The same pulse extends through OR circuit 806 to enable gate 806. Similar gates in the broken away portion will be enabled by the same pulse, and finally the pulse will be applied to gate 808. Thus, on the diagram, FIG. 13, information in register 792 will be gated to register 786 and information in register 796 will be gated into register 788. To cause a left shift, a pulse is first applied to the "shift left 1" line which enables gates 812, 814, 816 and similar gates in the broken away portion on the diagram, FIG. 13. Thus, information in register 788 will be gated to an intermediate register, not shown, immediately to the left on FIG. 13. Information from the register immediately to the right of register 786 will be gated through gate 816 to register 794. Information in register 786 will be gated through gate 814 to register 792 and information in register 784 will be gated through gate 812 to register 790. After this is done, a pulse is applied to the "shift left 2" line which enables gates 810, 804 and 806, plus similar gates in the broken away portion not shown. Information in register 790 will thus be gated down into register 782, information in register 792 will be gated into register 784 and information in register 794 will be gated downwardly into register 786.

Information from all 32 registers is available on cable 136 and the contents of the rightmost register, register 788, are also available on cable 138. Register 782 can be loaded by information coming in over cable 134 and register 788 can be loaded by information coming in over cable 432.

RANDOM ACCESS MEMORY

The random access memory is shown in detail on FIG. 14, the memory itself being indicated by numeral 108. Six bits are used to address via a memory address register (MAR) 188 the memory 108 which means that there can be 64 memory words. The memory word is divided into nine fields. The leftmost field which consists of four bits is called the "path tail x" field. This field in the memory data register 190 on FIG. 14 is loaded by the cable 142 and information can be extracted from that field by means of cable 160. The next field to the right, which also is four bits, is known as the "extension number" field. This field can be loaded by cable 144 and information can be extracted from it by means of cable 162. The next field to the right is a one bit field which contains the syndrome bit. This field can be loaded by cable 146 and information can be obtained from it by cable 164. The next field to the right is a four bit field which contains the error pattern of the line above which is needed for updating. This field can be loaded by cable 148 and unloaded by cable 166. The five right-hand fields are of three bits each and are used to store the burst indicators.

In operation, to read the random access memory 108, it it first necessary to load the memory address register 188 and then apply a pulse to the read line 396. The desired memory word will then appear in the memory data register 190. To write the memory 108, the memory data register 190 must first be loaded with the desired information, the desired address must be in the memory address register 188, and a pulse must be applied to the write line 394.

READ ONLY MEMORY

The read only memory is shown in detail on FIG. 15 and indicated by numeral 110. Memory 110 contains 1024 words. Each word is divided into two fields. The left-hand four bits are called the "permutation" field and the right-hand eight bits are called the "likelihood" field. In operation, the address is loaded into the memory address register 226 on FIG. 15 and a pulse is applied to the read line 402. The desired word then appears in the memory data register 228 and the permutation number can be gated out over cable 180 and the "likelihood" value can be gated out over cable 182. As will be explained in more detail later in connection with the read only memory address logic and updating logic unit 114 (FIG. 18), the address for the read only memory 110 is obtained by first accessing the random access memory 108 and then performing logic on the information obtained from the random access memory in order to develop an address for the read only memory 110.

L SHIFT REGISTER

This shift register 112, shown in detail on FIG. 16, is a three stage shift register which can shift either to the right or to the left and its operation is identical with either of the y shift registers or the x shift registers. It is believed that no further explanation is necessary at this time, but a description is provided below in connection with the various microprograms.

SYNDROME BIT LOGIC

Figure 17B:
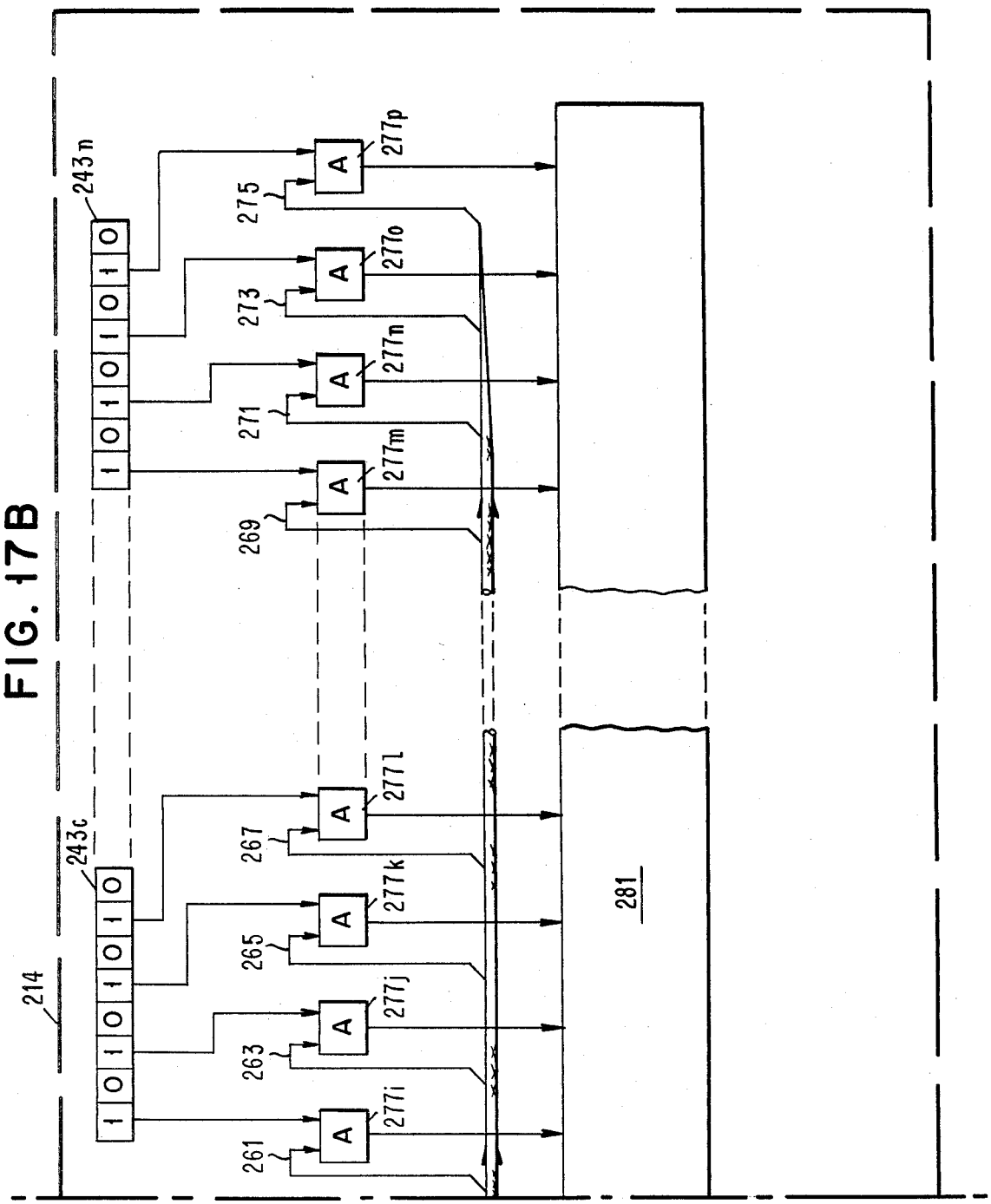
FIG. 17 comprises an organizational drawing for FIGS. 17A and B.
FIGS. 17A and B comprise a detailed drawing of the parity bit logic.

FIG. 17, comprising FIGS. 17A and 17B, shows how the syndrome bit is generated. At the top of FIG. 17, there are 32 code parameter registers 243$a$–$n$ of four bits each. These are initially loaded by the parameters of the convolutional code used for encoding. These code parameter registers 243$a$–$n$ are ANDed in gates 277$a$–$p$ bit by bit with the x shift registers which are also of four bits each and it will be remembered that there are also 32 of the x shift registers coming off the odd-numbered lines 247–275 and line 244. The values from the x shift registers come in over cable 136 at the left of FIG. 17 and it will be noted that the first AND circuit is supplied by wire 244 which is the lefthand bit of the leftmost x shift register and the leftmost bit of the first code parameter register on FIG. 17. Only the three leftmost code parameter registers 243$a$, $b$ and $c$ and the extreme rightmost code parameter register 243$n$ are shown on FIG. 17. The outputs of all of these AND circuits are inputs to a large exclusive OR circuit 281. Other inputs to the same exclusive OR circuit 281 come from the $y(n+1)$ register shown in detail on FIG. 12 and these values come via cable 122 in FIG. 17. Thus, the syndrome bit is continuously available on cable 212 at the bottom of FIG. 17.

READ ONLY MEMORY ADDRESS LOGIC UNIT

Figures 18, 18A:
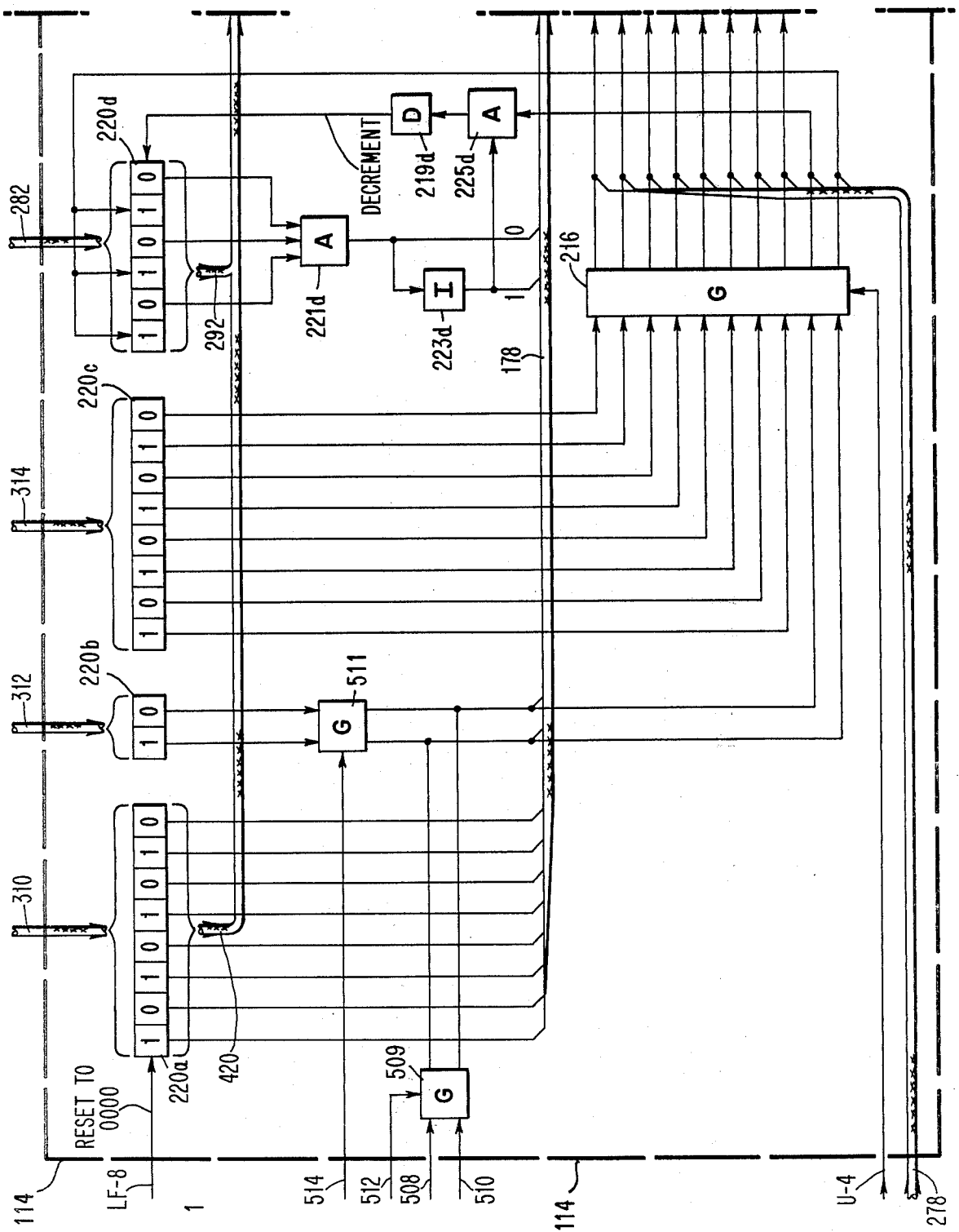
FIG. 18 comprises an organizational drawing for FIGS. 18A and B.
FIGS. 18A and B comprise a detailed drawing of the read only memory address logic and updating logic unit.
Figure 18B:
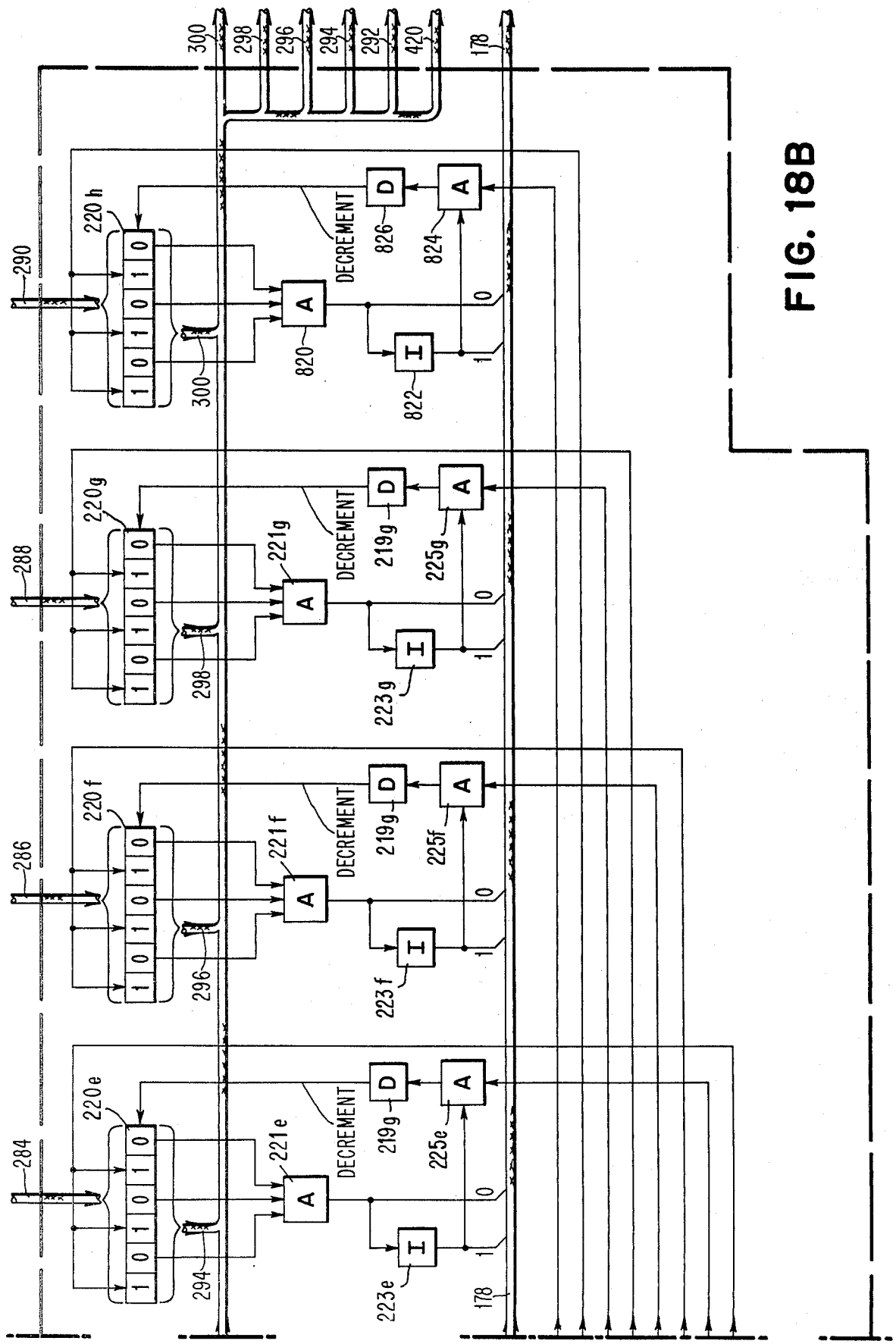

The read only memory address logic unit 114 is shown in detail on FIG. 18. Its purpose is to develop an address for the read only memory 110 and also to provide updating logic in order to update the burst indicators in the random access memory 108. In operation, the 8 right-hand fields of the memory data register 190 of the random access memory 108 are first gated to the eight registers 220a through h shown at the top of FIG. 18. When this is done, the read only memory address automatically appears on cable 178 which extends to the memory address register 226 of the read only memory 110 on FIG. 15. On FIG. 18, it will be noted that the left-hand register 220a which contains 4 bits goes into the cable 178 and also the next register 220b to the right which is a single bit goes into the same cable. Each of the 5 right-hand 3-bit registers 220d through h on FIG. 18 develops one bit each for the rest of the address of the read only memory 110. On FIG. 18, it will be noted that each one of these 5 right-hand registers 220d through h feeds an AND circuit 221d through g, and 820. Each one of these AND circuits has 3 inputs. These AND circuits can only have an output if the register which feeds it contains 3 "0's". If this is the case, the output bit going into cable 178 will be a zero. If the AND circuit is not satisfied, an inverter 223d through g, respectively, and 822, is supplied so that a "1" bit will be supplied when the three bit register contains anything but three zeros.

Updating is done in two different ways. One is to gate cable 278 to the bottom lines on FIG. 18. When this is done, it will be noted that each one of the right-hand bit registers will either be decremented or reset to all ones according to the bit pattern that comes in on cable 278. It will also be noted that each one of these five, three bit registers can only be decremented if it contains a number other than all zeros. The way in which this circuit works will be explained with reference to the right-hand three bit register 220h on FIG. 18. It will be noted that this register feeds the AND circuit 820 which can only have an output if the register contains all zeros. If the register contains something other than all zeros, the inverter 822 will have an output which will cause AND circuit 824 to be enabled. Thus, if the other input to AND circuit 824 is active, a pulse will be applied to the delay circuit 826 which will later have an output to decrement the three bit register 220h. The AND circuit 824 has corresponding AND circuits 225d through g associated with the other three bit registers. Similarly, delay circuits 219d through g are provided corresponding to the delay circuit 826.

The other way in which updating can be performed is to apply the U-4 pulse to gate 216 on FIG. 18. This causes a bit pattern to be applied to the bottom lines much the same as previously described. The only difference is the manner in which the syndrome bit comes into the circuit. Ordinarily, it would come from the single bit register 220b on FIG. 18 which is loaded by cable 312. This is only possible, however, if wire 514 is active to enable a gate 511. If wire 514 is not active, wire 512 will be active to enable a gate 509 which allows the parity bit to be supplied by wires 508 and 510 which come from the "tail store" which will be described later. The wires 512 and 514 come from FIG. 10C and it will be noted that wire 512 will be active if $n_i$ is greater or equal to L FRAME and less than L FRAME+M−1. If this is not the case, wire 514 will be active. In this manner, the parity bit can be obtained either from the single bit register 220c on FIG. 18 which is loaded by cable 312 from the random access memory or it is available on wires 508 and 510 which come from the tail store 218 detailed in FIG. 19, which is shown in diagrammatic form on FIG. 10D.

TAIL STORE

The tail store 218 is shown in detail in FIG. 19. It furnishes a way to store 32 individual bits. These are the parity check bits in the postamble which have to be stored separately. It is addressed by the value coming over cable 516 which comes from the address calculator and compare unit 116 on FIG. 10C. Data can be entered on cable 418. This data comes from the syndrome bit output of the syndrome bit logic unit 214 shown in detail on FIG. 17 and also in block diagram form on FIG. 10A. For example, in the look forward microprogram, the step LF-3 is used to gate the syndrome bit (cable 212) from the syndrome bit logic unit 214 to the input cable 418 of the tail store 218.

Data from an arithmetic unit 871, in the form of $n_i$−L FRAME+1 is provided on line 516 out of the address calculator and compare unit 116 shown in FIG. 21 to a decoder 517 in the tail store 218. Decoder 517 provides data on 32 lines indicated by numerals 519, 521 and 523 to a plurality of gates 525, 527, 529, 531, 533, 535 for passing the input data on lines 418. Registers 537, 539 and 541 are provided to hold the input data.

Data is continually available on the output wires 508 and 510. These wires extend to the read only memory address logic unit 114 on FIG. 18. As explained above in connection with the read only memory address logic unit 114, the value on wires 508 and 510 is sometimes used when updating the address logic.

ADDRESS CALCULATOR AND COMPARE UNIT

The address calculator and compare unit 116 is shown diagrammatically in the upper right corner of FIG. 10C and in detail on FIGS. 21A, B, C and D arranged as indicated at the top of FIG. 21A. The purpose of unit 116 is to prepare a deinterleaver address which appears in the register 873 of that name. Another purpose of this unit 116 is to produce what is called the "n position" value which is developed in the "HOLD" register 875. Another purpose is to develop values that appear on the lines 877, 879, 881, 883 and 885 coming out of the bottom of FIGS. 21C and 21D.

There are two general modes of operation depending on whether the decoder finds itself in the "tail" or not. If the decoder is not in the tail, the deinterleaver address 873 is merely the sum of the max preamble and the value loaded into the $n_i$ register 887 by means of cable 552. This cable 552 can be gated from either the n value or the n+1 value. To add the max preamble from line 889 to the $n_i$ value, only the pulses AC-10 and AC-11 are used. The clock that produces the control pulses used by the address calculator 116 includes a pulse generator 890 fed by line 882, a single shot 894, and pulse generators 896, 898 and 900. A group of pulses AC-1 through AC-9 are used when the decoder finds itself in the "tail". The pulses AC-10 and AC-11 are used only when the decoder is not in the tail and, as explained previously, are used only to add the max preamble to the $n_i$ value and place this value in the deinterleaver address 873. The way in which this control clock is started by means of a pulse either on wire 882 or wire 884 will be described below.

According to the move backward microprogram, it will be noted that the MB-5 pulse goes to the MB-6 pulse through a delay. This can be understood by referring to FIG. 10H where it will be noted that when the pulse generator 620 turns off, a pulse is produced which goes through delay unit 621 to turn on the next pulse generator 623 which first produces the MB-6 pulse. The pulse produced when pulse unit 620 turns off is provided via wire 888 to FIG. 10F where it extends through an OR circuit 891 where it extends to wire 884. Wire 884 extends to FIG. 10C and also to FIG. 21D where it is effective to turn on the pulse generator 900 which first produces the AC-10 pulse and then later the AC-11 pulse. The amount of delay between MB-5 and MB-6 is sufficient to allow the two pulses AC-10 and AC-11 to develop the deinterleaver address in the register 873 on FIG. 21B.

A similar situation exists in connection with the MF-12 pulse which goes to the MF-13 pulse through a similar delay unit 893. Referring to FIG. 10G, when pulse generator 596 turns "off", a pulse is produced which extends through the delay unit 893 to turn on the pulse generator 895 which produces the MF-13, MF-14 and MF-15 pulses. The same pulse which occurs when pulse generator 596 turns "off" extends via wire 886 to FIG. 10F where it passes through the OR circuit 891 to wire 884. Wire 884 extends to FIG. 10C and also to FIG. 21C and, as explained before, is used to produce pulses AC-10 and AC-11.

Reference should next be made to the look forward microprogram. In connection with the LF-2 pulse, it will be noticed that if the decoder finds itself in the "tail", the program will branch to LF-3. If the decoder is not in the "tail", the program will branch to LF-4. This branching is a result of the tests made by the LF-2 pulse when it is applied to gate 736 in FIG. 10C. If the decoder is in the "tail", the pulse will be produced on wire 498 which extends to FIG. 10F and passes through delay unit 210 before reaching single shot 560 in order to produce the LF-3 pulse. A pulse on wire 500 also extends to FIG. 10F where it passes through delay unit 206 in order to turn on the pulse generator 562. As will be explained shortly, the time required to produce the address calculation is longer if the decoder is in the "tail" than if the decoder is not in the "tail". Therefore, the delay unit 210 connected in series with wire 498 on FIG. 10F is of longer duration than the delay unit 206 connected in series with wire 500. Also, on FIG. 10F, a pulse on wire 498 will pass through an OR circuit 897 to wire 882 which extends to FIG. 10C and also 21C and is applied to the clock via pulse generator 890 to first produce the AC-1 pulse. On FIG. 10F, the pulse on wire 500 pulses through OR circuit 891 to wire 884 which extends to FIG. 10C and also to FIG. 21C in order to produce the AC-10 pulse and the AC-11 pulse.

Reference should be made to the move backward microprogram. In connection with MB-8 pulse, it will be noted that if the decoder is in the "tail", the program will branch to MB-9. If the decoder is not in the "tail", the program will branch to MB-12. Referring to FIG. 10H, it will be noted that a pulse on wire 490 will pass through delay unit 344 to start the pulse generator 622 in order to produce the MB-9 pulse. A pulse on wire 492 will pass through delay unit 342 to turn "on" single shot 624 to produce the MB-12 pulse. Here again, the delay circuit 344 in series with wire 490 is of longer duration than the delay unit 342 in series with wire 492. On FIG. 10F, the pulse on wire 490 passes through OR circuit 897 to wire 882 which, as explained previously, extends to FIG. 21C in order to start the clock via pulse generator 890 with the AC-1 pulse. Also in FIG. 10F, a pulse on wire 492 extends through OR circuit 891 to wire 884 which, as explained previously, extends to FIG. 21C in order to produce the AC-10 followed by the AC-11 pulse. It has been described briefly how the address calculator 116 gets started and how it cooperates with the other microprograms. The detailed operation of the address calculator will be described next.

Figure 21B:
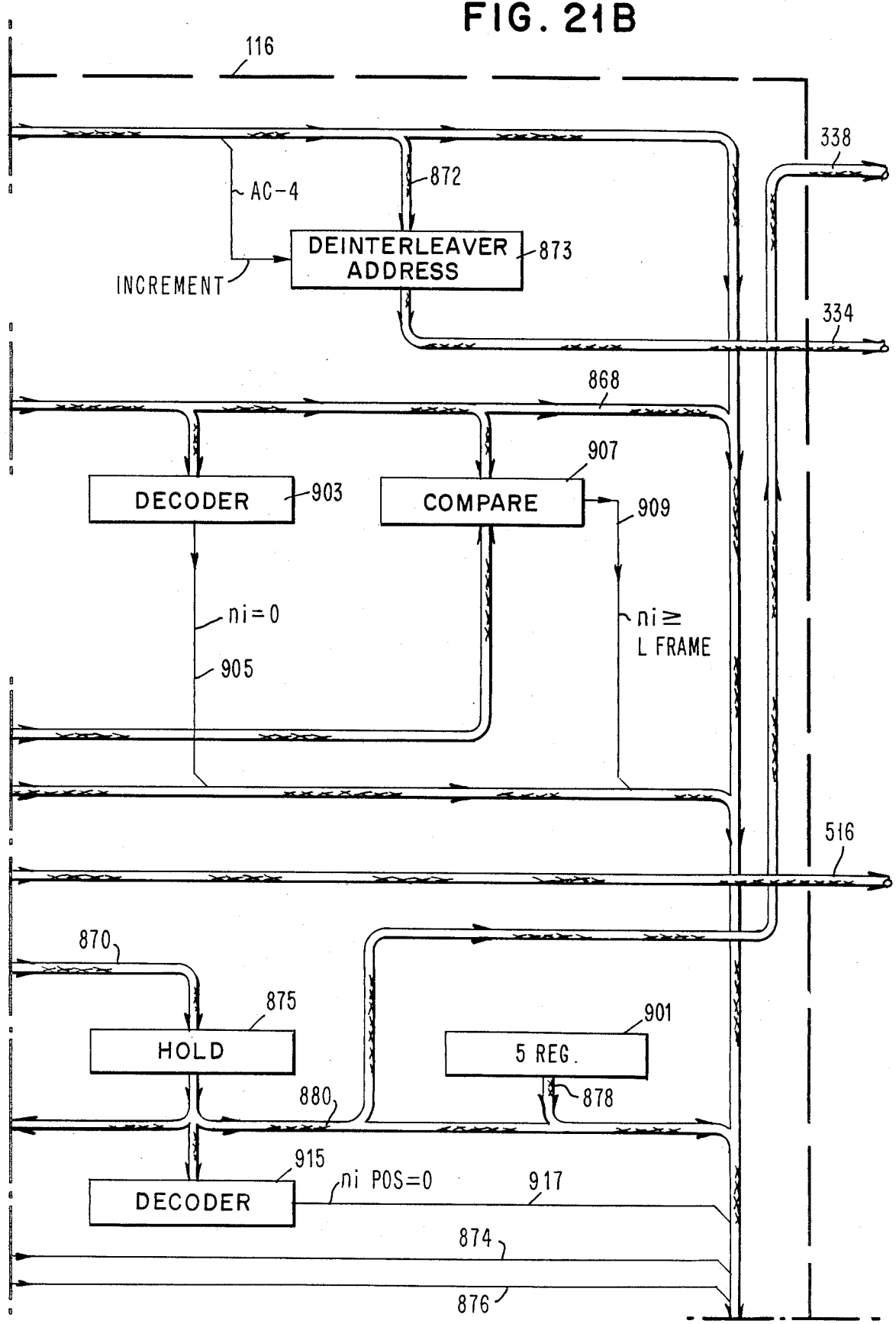
FIG. 21 comprises an organizational drawing for FIGS. 21A–D.
FIGS. 21A, B, C and D comprise a detailed drawing of the "address calculator and compare unit."

On FIG. 21D, the AC-1 pulse extends through OR circuit 832 to wire 838. Wire 838 extends to gate 866 in order to gate the value "L FRAME" to cable 318. Cable 318 is the input cable to the augend register 230 on FIG. 10B. Wire 838 on FIG. 21D also extends to gate 864 in FIG. 21C in order to gate the max preamble to cable 320. Cable 320 is the input cable to the addend register 234 on FIG. 10B. On FIG. 21B, the AC-1 pulse is applied to gate 842 in order to gate cable 868 to cable 870. Cable 868 comes from the $n_i$ register 887 on FIG. 21A and cable 870 goes to the hold register 875 on FIG. 21B.

The AC-2 pulse extends through OR circuit 838 to wire 840. On FIG. 21C, wire 840 extends to gate 844 in order to gate cable 322 to cable 872. Cable 322 comes from the sum register 236 on FIG. 10B and cable 872 is the input cable to the deinterleaver address register 873 on FIG. 21B. On FIG. 21C, when pulse generator 890 turns "off", a pulse is produced which extends through OR circuit 892 to turn "on" single shot 894 in order to produce the AC-3 pulse. The AC-3 pulse extends to FIG. 21A where it is applied to gate 902. If the value in the hold register 875 is greater than the value "L FRAME-1" from the arithmetic unit 871, a comparator 899 will provide a pulse on wire 874 via gate 902. If this is not the case, a pulse will appear on wire 876. These wires extend to FIG. 21D where a pulse on wire 876 is used to start the pulse generator 898 and a pulse on wire 874 is used to start the pulse generator 896.

The AC-4 pulse extends to FIG. 21B where it is used to increment the deinterleaver address register 873. On FIG. 21C, the AC-4 pulse is applied to gate 846 in order to gate cable 880 to cable 436. Cable 880 comes from the hold register 875 in FIG. 21B and cable 436 is the input cable to the minuend register 268 on FIG. 10B. Also, on FIG. 21C, the AC-4 pulse is applied to gate 848 in order to gate cable 878 to cable 434. Cable 878 comes from the "5" register 901 on FIG. 21B, and cable 434 is the input cable to the subtrahend register 270 on FIG. 10B.

On FIG. 21C, the AC-5 pulse is applied to gate 850 in order to gate cable 438 to cable 870. Cable 438 is the output cable of the subtractor 272 shown on FIG. 10B and cable 870 is the input cable to the hold register 875 on FIG. 21B. On FIG. 21C, the AC-6 pulse is applied to gate 852 in order to gate cable 880 to cable 318. Cable 880 comes from the hold register and cable 318 is the input cable to the augend register 230 on FIG. 10B. On FIG. 21D, the AC-6 pulse is applied to gate 854 in order to gate cable 878 to cable 320. Cable 878 comes from the "5" register 901 on FIG. 21B and cable 320 is the input cable to the addend register 234 on FIG. 10B.

On FIG. 21D, the AC-7 pulse is applied to gate 856 in order to gate cable 322 to cable 870. Cable 322 comes from the sum register 236 on FIG. 10B and cable 870 is the input cable to the hold register 875 on FIG. 21A.

On FIG. 21D, the AC-8 pulse is applied to gate 858 in order to gate cable 880 to cable 436. Cable 880 comes from the hold register 875 and cable 436 is the input cable to the minuend register 268 on FIG. 10B. On FIG. 21D, the AC-8 pulse is applied to gate 860 in order to gate the value "L FRAME" to cable 434. Cable 434 is the input cable to the subtrahend register 270 on FIG. 10B. On FIG. 21D, the AC-9 pulse is applied to gate 862 in order to gate cable 438 to cable 870. Cable 438 is the output cable of the subtractor 272 on FIG. 10B and cable 870 is the input cable to the hold register 875 on FIG. 21B. It should be noted that now the value "n position" is in the hold register 875.

On FIG. 21D, the AC-10 pulse extends through OR circuit 832 to wire 838. Wire 838 extends to gate 866 on FIG. 21C and is used to gate the value "L FRAME" to cable 318. Cable 318 is the input cable to the augend register 230 on FIG. 10B. On FIG. 21C, wire 838 also extends to gate 864 in order to gate the max preamble to cable 320. Cable 320 is the input cable to the addend register 234 on FIG. 10B.

On FIG. 21B, the AC-11 pulse extends through OR circuit 834 to wire 840. Wire 840 extends to gate 844 on 21C where it is used to gate cable 322 to cable 872. Cable 322 is the output cable of the sum register 236 on FIG. 10B and cable 872 is the input cable to the deinterleaver address register 873 on FIG. 21B.

A decoder 903 in FIG. 21B provides a signal on line 905 when $n_i = 0$ is detected on the line 868. A comparator 907 provides a signal on line 909 when $n_i \geq L$ FRAME is detected on the input lines. A comparator 911 provides a signal on line 913 when $n_i = 1$ FRAME$+M-1$. Also, a decoder 915, connected to the hold register 875, provides a signal on line 917 when $n_i = 0$. These lines 905, 909, 913 and 917 are outputted from the address calculator and compare unit 116 shown in FIG. 10C, and the operation of the signals on these lines is described in detail in the section on microprograms.

The action of the various microprograms will be described with respect to FIGS. 10A through 10H and the associated circuits will be traced.

The first microprogram is called the Initialize microprogram, this program being abbreviated by the letter "I" and to be described in detail in a later section. Referring to FIG. 10F, operations are started by a pulse applied to line 540 which turns on a single shot 542 in order to produce the I-1 pulse. This pulse is used for various initializing purposes which will be described. For example, the I-1 pulse is used to reset the random access memory 108 shown on FIG. 10A. There is no actual wire shown on the diagram going into the random access memory 108 for resetting purposes. This is because such resetting operations are well known and, therefore, the actual resetting circuits need not be shown. The same is true in the case of resetting all of the shift registers. This includes the y shift register 102, the x shift register 104 and the L shift register 112, all of which are shown in FIG. 10A and also shown in detail in subsequent figures. The n counter 128 at the top right-hand corner of FIG. 10D is initially set to all 1's. Again, the actual line used to accomplish the setting of n counter 128 is not shown on the diagram since such setting is well known in the art. The same is true of the n(max) counter 130 shown at the top of FIG. 10C. Counter 128 is initially set or reset to 8 left-hand 0's and 6 right-hand 1's. An $L(n-1)$ register 132 which is the rightmost register of the 1 shift register 112 shown in FIG. 10A and also in detail in FIG. 16 is set to the lowest possible value.

On FIG. 10F, when single shot 542 turns "off", a pulse is produced which extends through OR circuit 544 to turn "on" single shot 546 in order to produce the I-2 pulse. The I-2 pulse extends to FIG. 10C where it is applied to gate 724 in order to find out if a preamble counter 184 is greater than the maximum preamble value indicated by block 186. If the preamble counter 184 is greater than the maximum value, a comparator 188 provides a pulse on wire 504 via the gate 724. If this is not the case, a pulse will appear on wire 506. These wires extend to FIG. 10F where a pulse on wire 504 is used to turn "on" pulse generator 554 and a pulse on wire 506 is used to turn "on" pulse generator 548 which would produce the I-3 pulse to be described below.

Referring to FIG. 10E, the I-3 pulse is applied to gate 668 in order to gate cable 536 to cable 140. Cable 526 contains the right-hand six bits of the preamble counter 184 on FIG. 10C. Cable 140 extends to the memory address register 188 of the random access memory 108 on FIG. 10A. On FIG. 10F, the I-3 pulse extends through OR circuit 370 to wire 404. Wire 404 extends to FIG. 10E where it is applied to gate 652 in order to gate cable 524 to cable 336. Cable 524 carries all 14 bits of the preamble counter 184 on FIG. 10C and cable 336 is the cable extending to the memory address register 760 of the deinterleaver 30 shown in FIG. 10A and FIG. 11.

The I-4 pulse, on FIG. 10F, extends through OR circuit 352 to wire 386. Wire 386 extends to FIG. 10A where a pulse is used to read the deinterleaver 30. Also, on FIG. 10F, the I-4 pulse extends through OR circuit 362 to wire 396, and wire 396 extends to FIG. 10A where a pulse is used to read the random access memory 108.

The I-5 pulse extends to FIG. 10E where a pulse is applied to gate 670 in order to gate cables 168 through 176 to cables 282, 284, 286, 288 and 290, respectively. Cables 168 through 176 come from the memory data register (MDR) 190 of random access memory 108 and cables 282 through 290 go to the read only memory address logic 114 which is shown in diagrammatic form on FIG. 10B and which is also shown in detail on a separate sheet (FIG. 18).

The I-6 pulse extends to FIG. 10E where it is applied to gate 672 in order to gate cable 106 to cable 278. Cable 106 comes from the memory data register 764 of the deinterleaver 30 and cable 278 goes to the bottom input lines of the read only memory address logic block 114.

Some delay is necessary between the I-6 pulse and the I-7 pulse. This is necessary in order to permit the circuits of the read only memory address logic unit 114 to adjust themselves. It should be noted that on FIG. 10F, when pulse generator 548 turns "off", a pulse is produced which extends through the delay unit 550 in order to turn "on" the pulse generator 552. On FIG. 10F, the I-7 pulse extends through OR circuit 382 to wire 416. Wire 416 extends to FIG. 10E where it is applied to gate 662 in order to gate cables 292 through 300 which come from the read only memory address logic unit 114 to cables 150 through 158 which extend to the memory data register 190 of the random access memory 108 in both FIGS. 10A and 14.

The I-8 pulse, on FIG. 10F, extends through OR circuit 360 to wire 394. Wire 394 extends to FIG. 10A where a pulse on it is used to write the random access memory 108. The I-8 pulse also extends to FIG. 10C where it is used to increment the preamble counter 184.

As explained above with respect to FIG. 10F, a pulse on wire 504 is used to turn "on" pulse generator 554 which produces the I-9 pulse. On FIG. 10F, the I-9 pulse extends through OR circuit 370 to wire 404. Wire 404 extends to FIG. 10E where it is applied to gate 652 in order to gate cable 524 to cable 336. Cable 524 contains all 14 bits of the preamble counter 184 while cable 336 goes to the memory address register (MAR) 760 of the deinterleaver on FIGS. 10A and 11.

On FIG. 10F, the I-10 pulse extends through OR circuit 352 to wire 386. Wire 386 extends to FIG. 10A where a pulse on it is used to read the deinterleaver 30 via sixty-four gates 200 indicated also by bits 0 through 63. Each of the gates 200 feeds into the memory 202 of the deinterleaver 30.

On FIG. 10E, the I-11 pulse is applied to gate 674 in order to gate cable 106 to cable 120. Cable 106 comes from the memory data register 764 of the deinterleaver in FIGS. 10A and 11, while cable 120 goes to the y(n+1) register 766 of the y shift register 102 shown on FIGS. 10A and 12.

The Initialize microprogram I-1 through I-11 can be summarized as follows:

| INITIALIZE (I) |
|---|
| I-1 Reset RAM 108 |
|     Reset All shift registers |
|     Reset Preamble counter 184 to 00--00 |
|     Reset n counter 128 to 11--11 |
|     Reset n max. counter 130 to 00000000111111 |
|     Set $L_{n-1}$ register 132 to lowest possible value |
|     → I-2 |
| I-2 Is preamble counter 184 > max value? |
|     yes → I-9           Pulse on line 504 |
|     no → I-3            Pulse on wire 506 |
| I-3 Gate right-hand six bits of preamble counter 184 |
|     (cable 526) to |
|     MAR 188 of RAM 108 (cable 140) |
|     Gate all 14 bits of preamble counter 184 (cable 524) |
|     to MAR 760 of Deinterleaver 30 (cable 336) |
|     Note -- use OR Circuit 370 and wire 404 |
|     → I-4 |
| I-4 Read Deinterleaver 30 |
|     Note -- use OR Circuit 352 and wire 386 |
|     Read RAM 108 |
|     Note -- use OR Circuit 362 and wire 396 |
|     → I-5 |
| I-5 Gate output cables 168 thru 176 of MDR 190 of RAM 108 |
|     to input 282 thru 290 of ROM Address Logic 114 |
|     → I-6 |
| I-6 Gate MDR 764 of Deinterleaver 30 (cable 106) to |
|     bottom input lines of ROM Address Logic 114 |
|     (cable 278) (THRU DELAY) |
|     → I-7 |
| I-7 Gate output cables 292 thru 300 of ROM address |
|     logic 114 to input cables 150 thru 158 of RAM 108 |
|     Use OR circuit 382 and wire 416 |
|     → I-8 |
| I-8 Write RAM 108 |
|     Note -- use OR circuit 360 and wire 394 |
|     Increment Preamble counter 184 |
|     → I-9 |

The following steps are used to prepare the first look forward:

| |
|---|
| I-9 Gate all 14 bits of preamble counter 184 (cable 524) |
|     to MAR of Deinterleaver 30 (cable 336) |
|     Note -- use OR circuit 370 and wire 404 |
|     → I-10 |
| I-10 Read Deinterleaver 30 |
|     Note -- use OR circuit 352 and wire 386 |
|     → I-11 |
| I-11 Gate MDR 764 of Deinterleaver 30 (cable 106) to |
|     the y(n + 1) register 766 of the y shift register |
|     102 (cable 120) |
|     → LF-1 |

On FIG. 10F, when pulse generator 554 turns "off", a pulse is produced which extends through OR circuit 556 to turn "on" the single shot 558. In this manner, the microprogram branches to the Look Forward microprogram and the next pulse produced will be the LF-1 pulse.

THE "LOOK FORWARD" (LF) MICROPROGRAM

Referring to FIG. 10F, the LF-1 pulse extends through OR circuit 356 to wire 390. Wire 390 extends to FIG. 10E where a pulse on it is applied to gate 644 in order to gate cable 308 to cable 140. Cable 308 comes from the six low order bits of the n+1 register 204 shown on FIG. 10D and cable 140 goes to the memory address register 188 of the random access memory 108. Also, on FIG. 10F, the LF-1 pulse extends through OR circuit 364 to wire 398. Wire 398 extends to FIG. 10E where a pulse on it is applied to gate 648 in order to gate cable 520 to cable 522. Cable 520 carries the entire n+1 value from the n+1 register 204 in FIG. 10D and cable 522 is an input cable to the address calculator 116 as shown on FIG. 10C.

The LF-2 pulse extends to FIG. 10C where it is applied to gate 736 in order to test the compare portion of the address calculator unit 116. Several look forward, move forward, move backward pulses are similarly applied to gates 726-742 to gate the several outputs of the address calculator and compare unit 116, to be more specifically described below. If $n_i$ is greater than or equal to L FRAME, a pulse will appear on wire 498. If this is not the case, a pulse will appear on wire 500. These wires extend to FIG. 10F where a pulse on wire 500 will start the pulse generator 562 through a delay 206 and a pulse on wire 498 will start the pulse generator 560 through a delay 210. This will produce the LF-3 pulse which, on FIG. 10E, is applied to gate 676 in order to gate cable 212 to cable 418. Cable 212 is the output of the parity bit logic unit 214 on FIG. 10B and cable 418 is the input cable of the tail store 218 at FIG. 10D. The tail store 218 is shown in detail in FIG. 19.

The LF-4 pulse, on FIG. 10E, is applied to gate 678 in order to gate cable 212 to cable 146. Cable 212 is the output cable of the parity bit logic unit 214 on FIG. 10B and cable 146 is an input cable of the memory data register 190 of the random access memory 108.

On FIG. 10F, the LF-5 pulse extends through OR circuit 360 to wire 394. Wire 394 extends to FIG. 10A where a pulse on it is used to write the random access memory 108.

On FIG. 10F, when pulse generator 562 turns "off", a pulse extends through OR circuit 564 to FIG. 10G where it is used to start the pulse generator 566. This produces the LF-6 pulse which extends through OR circuit 362 to wire 396. Wire 396 extends to FIG. 10A where a pulse on it is used to read the random access memory 108.

On FIG. 10F, the LF-7 pulse extends through OR circuit 358 to wire 392. Wire 392 extends to FIG. 10E where it is applied to gate 646 in order to gate cables 162 through 176 which come from the memory data register 190 of the random access memory 108 to cables 310 through 290. These latter cables go to the read only memory address logic unit 114 shown in FIGS. 10B and 18.

The LF-8 pulse extends to FIG. 10B where it is applied to the read only memory address logic unit 114. This pulse is used to reset the left-hand register 220 of this unit 114 to all 0's.

On FIG. 10E, the LF-9 pulse is applied to gate 680 in order to gate cable 420 to cable 144. Cable 420 comes from the left-hand register 220 of the read only memory address logic unit 114 shown on FIG. 18 and cable 144 is the input cable of the memory data register 190 of the random access memory 108.

On FIG. 10F, the LF-10 pulse extends through OR circuit 360 to wire 394. Wire 394 extends to FIG. 10E where a pulse on it is used to write the random access memory 108.

On FIG. 10F, the LF-11 pulse extends through OR circuit 368 to wire 402. Wire 402 extends to FIG. 10A where a pulse on it is used to read the read only memory 110. The read only memory actively includes a memory address register (MAR) 226, the ROM 110 and a MDR 228, as shown in FIG. 15.

On FIG. 10E, the LF-12 pulse is applied to gate 682 in order to gate cable 182 to cable 318. Cable 182 provides the likelihood field of the memory data register 228 of the read only memory 110 and cable 318 is the input cable to the augend register 230 shown on FIG. 10B. Also, on FIG. 10E, the LF-12 pulse is applied to gate 684 in order to gate cable 324 to cable 320. Cable 324 is the $L_n$ stage out of register 232 of the L shift register 112 shown on FIGS. 10A and 16 and cable 320 provides the input to the addend register 234 shown on FIG. 10B.

On FIG. 10E, the LF-13 pulse is applied to gate 686 in order to gate cable 322 to cable 194. Cable 322 comes from the sum register 236 of the adder 238 on FIG. 10B and cable 194 is the input cable to the $L(n+1)$ state 240 of the L shift register 112 shown on FIGS. 10A and 16. On FIG. 10F, the LF-13 pulse extends through OR circuit 380 to wire 414. Wire 414 extends to FIG. 10D where it is used to set a "switch LF" flip-flop 242 to its "1" state. On FIG. 10G, it will be noted that when the pulse generator 566 turns "off", a pulse is produced which extends through OR circuit 568 to turn "on" single shot 570. In this manner, the microprogram branches to the Decoder Control Microprogram which will be described below. The Look Forward Microprogram is summarized in the following manner:

| LOOK FORWARD (LF) | |
|---|---|
| LF-1 | Gate six low order bits of n + 1 register 204 (cable 308) to MAR 188 of RAM 108 (cable 140)<br>Note -- use OR circuit 356 and wire 390<br>Gate n + 1 value (cable 520) from register 204 to address calculator 116 (cable 522)<br>Note -- use OR circuit 364 and wire 398<br>→ LF-2 |
| LF-2 | Is $n_i \geq$ L FRAME?<br>yes → LF-3 (THRU DELAY)  Pulse on line 498<br>no → LF-4 (THRU DELAY)  Pulse on line 500 |
| LF-3 | Gate syndrome bit (cable 212) from syndrome bit logic unit 214 to input cable of Tail Store 218 (cable 418) at address permanently connected.<br>→ LF-4 |
| LF-4 | Gate the syndrome bit output of the syndrome bit logic unit 214 (cable 212) to input cable 146 of the MDR 190 of RAM 108.<br>→ LF-5 |
| LF-5 | Write RAM 108<br>Note -- use OR circuit 360 and wire 394<br>→ LF-6 |
| LF-6 | Read RAM 108<br>Note -- use OR circuit 362 and wire 396<br>→ LF-7 |
| LF-7 | Gate cables 162 thru 176 of MDR 190 of RAM 108 to cables 310 thru 290 of ROM Address Logic Unit 114 to get ROM address.<br>Note -- use OR circuit 358 and wire 392<br>→ LF-8 |
| LF-8 | Reset left-hand register 220 of ROM Address Logic unit 114 to 00--00<br>→ LF-9 |
| LF-9 | Gate left-hand register 220 of ROM Address Logic |

| -continued | |
|---|---|
| LOOK FORWARD (LF) | |
| | unit 114 (cable 420) to input cable 144 of MDR 190 of RAM 108.<br>→ LF-10 |
| LF-10 | Write RAM 108<br>Note -- use OR circuit 360 and wire 394<br>→ LF-11 |
| LF-11 | Read ROM 110<br>Note -- use OR circuit 368 and wire 402<br>→ LF-12 |
| LF-12 | Gate "Likelihood" field of MDR 228 of ROM 110 (cable 182) to Augend register 230 of Adder 238 (cable 318)<br>Gate the $L_n$ state 232 of the L shift register 112 (cable 324) to the Addend register 234 of Adder 238 (cable 320)<br>→ LF-13 |
| LF-13 | Gate Sum register 236 of adder 238 (cable 322) to the $L(n + 1)$ stage 240 of the L shift register 112 (cable 194)<br>Set "SWITCH LF" F.F. 242 = 1<br>Note -- use OR circuit 380 and wire 414<br>→ DC-1 |

DECODER CONTROL (DC) MICROPROGRAM

The DC-1 pulse extends to FIG. 10D where it is applied to gate 754 in order to test the condition of the "switch LF" flip-flop 242. If the flip-flop 242 is in its "1" state, a pulse will appear on line 462. If it is in its "0" state, a pulse will appear on line 464. These lines extend to FIG. 10G where a pulse on wire 464 will extend through OR circuit 588 to turn "on" single shot 590. A pulse on wire 462 will turn "on" single shot 572.

The DC-2 pulse extends to FIG. 10D where it is applied to gate 744. If stage $L_{n+1}$ of the L shift register 112 is greater than or equal to the value of the T register, a pulse will appear on wire 444. If this is not the case, a pulse will appear on wire 446. A pulse on wire 446 extends to FIG. 10G where it extends through OR circuit 588 to turn "on" single shot 590. A pulse on wire 444 will extend to FIG. 10G and turn "on" pulse generator 574. This produces the DC-3 pulse.

On FIG. 10F, the DC-3 pulse extends through OR circuit 378 to wire 412. Wire 412 extends to FIG. 10E wherein it is applied to gate 660 in order to gate cable 224 to cable 318. Cable 224 comes from a T register 246 on FIG. 10B, and cable 318 is the input cable to the augend register 230 also on FIG. 10B. On FIG. 10E, wire 412 also extends to gate 666 where it is used to gate cable 518 to cable 320. Cable 518 is the output cable of a $\Delta$T register 248 shown on FIG. 10D and cable 320 is the input cable to the addend register 234 also on FIG. 10B. It should be noted that gates 660 and 666 on FIG. 10E could be combined into a single gate with two inputs and two outputs.

On FIG. 10F, the DC-4 pulse extends through OR circuit 376 to wire 410. Wire 410 extends to FIG. 10E where a pulse on it is applied to gate 658 in order to gate cable 322 to cable 222. Cable 322 is the output cable of the sum register 236 on FIG. 10B and cable 222 is the input cable to the T register 246.

The DC-5 pulse extends to FIG. 10D where it is applied to gate 746. If the $L_n$ stage 232 of the L shift register 112 is greater than or equal to the T register, a pulse will appear on wire 448 via gate 746. If this is not the case, a pulse will appear on wire 450. These wires extend to FIG. 10G where a pulse on wire 450 will extend through OR circuit 580 to start the pulse generator 582. A pulse on wire 448 will extend through OR circuit 576 to turn "on" single shot 578.

The DC-6 pulse extends to FIG. 10D where it is applied to gate 748. If the T register 246 shown in FIG. 10B is greater than the $L_{n+1}$ stage 240 of the L shift register 112, a pulse will appear on wire 452. If this is not the case, a pulse will appear on wire 454. These wires extend to FIG. 10G where a pulse on wire 454 is used to start the pulse generator 586. A pulse on wire 452 will extend through OR circuit 580 to start the pulse generator 582.

On FIG. 10F, the DC-7 pulse extends through OR circuit 374 to wire 408. Wire 408 extends to FIG. 10E where it is applied to gate 656 in order to gate cable 224 to cable 436. Cable 224 comes from the T register 246 and cable 436 is the input cable to a minuend register 268 shown in FIG. 10B. On FIG. 10E wire 408 also extends to gate 696 in order to gate cable 518 to cable 434. Cable 518 is the output cable of the ΔT register 248 on FIG. 10D and cable 434 is the input cable to a subtrahend register 270 on FIG. 10B. Here again it will be noted on FIG. 10E that wire 408 goes to both gates 656 and 696. Both the minuend register 268 and the subtrahend register 270 feed into a subtractor 272, the output of which is applied to a difference register 274.

On FIG. 10F, the DC-8 pulse extends through OR circuit 372 to wire 406. Wire 406 extends to FIG. 10E where it is applied to gate 654 in order to gate cable 438 to cable 222. Cable 438 is the output cable of the difference register 274 on FIG. 10B and cable 222 is the input cable to the T register 246 on FIG. 10B.

At this point, it should be noted on FIG. 10G that when pulse generator 582 turns "off", a pulse is produced to start pulse generator 584 which is the start of the Move Forward microprogram. The Move Forward microprogram will be described below while the present description will continue with the decoder control pulses.

It was explained previously how a pulse on wire 454 which extends to FIG. 10G is used to start the pulse generator 586 to produce the DC-9 pulse. On FIG. 10F, the DC-9 pulse extends through OR circuit 378 to wire 412. Wire 412 extends to FIG. 10E where it is applied to gates 660 and 666. This gating has been previously described in connection with the DC-3 pulse.

On FIG. 10F, the DC-10 pulse extends through OR circuit 376 to wire 410. Wire 410 extends to FIG. 10E where it is applied to gate 658 in order to gate cable 322 to cable 222. Cable 322 is the output cable of the sum register 236 on FIG. 10B and cable 222 is the input cable to the T register 246 also on FIG. 10B.

On FIG. 10G, when pulse generator 586 turns "off", a pulse is produced which extends through OR circuit 576 to turn "on" single shot 578 in order to again produce the DC-6 pulse. It was previously explained in connection with DC-1 pulse that a pulse on wire 464 will extend, on FIG. 10G, through OR circuit 588 to turn "on" single shot 590 in order to produce the DC-11 pulse. The DC-11 pulse exends to FIG. 10D where it is applied to gate 750. If the value $L_{n-1}$ is greater than or equal to the T value, a pulse will appear on wire 456 out of the gate 750. If this is not the case, a pulse will appear on wire 458. These wires extend to FIG. 10G, where a pulse on wire 456 is used to start the pulse generator 618 and a pulse on wire 458 is used to start the pulse generator 592 in order to produce the DC-12 pulse.

On FIG. 10F, the DC-12 pulse extends through OR circuit 374 to wire 408. Wire 408 extends to FIG. 10E where it is applied to gates 556 and 696. This gating has been previously described in connection with the DC-7 pulse.

On FIG. 10F, the DC-13 pulse extends through OR circuit 372 to wire 406. Wire 406 extends to FIG. 10E where it is applied to gate 654 in order to gate cable 438 to cable 222. Cable 438 provides the output of the subtractor 272 via the difference register 274 on FIG. 10B and cable 222 is the input cable to the T register 246.

On FIG. 10G, when pulse generator 592 turns "off", a pulse will extend through OR circuit 594 and also through OR circuit 556 to turn "on" pulse generator 558 in order to produce the LF-1 pulse. In this manner, the program branches to the Look Forward Microprogram which has been previously described.

The decoder control microprogram is summarized below.

| DECODER CONTROL MICROPROGRAM (FIG. 20) | | |
|---|---|---|
| DC-1 | Is "Switch LF" 242 = 1? | |
| | yes → DC-2 | Pulse on line 462 |
| | no → DC-11 | Pulse on line 464 |
| DC-2 | Is "$L_{n+1}$" > T? | |
| | yes → DC-3 | Pulse on line 444 |
| | no → DC-11 | Pulse on line 446 |
| DC-3 | Gate T (cable 224) from register 246 to Augend Register 230 (cable 318) | |
| | Gate ΔT (cable 518) from register 248 to Addend register 234 (cable 320) | |
| | Note -- use OR circuit 378 and wire 412 | |
| | → DC-4 | |
| DC-4 | Gate Sum from register 236 (cable 322) to T register 246 (cable 222) | |
| | Note -- use OR circuit 376 and wire 410 | |
| | → DC-5 | |
| DC-5 | Is $L_n ≧ T$? | |
| | yes → DC-6 | Pulse on line 448 |
| | no → DC-7 | Pulse on line 450 |
| DC-6 | Is $T > L_{n+1}$? | |
| | yes → DC-7 | Pulse on line 452 |
| | no → DC-9 | pulse on line 454 |
| DC-7 | Gate T from register 246 (cable 224) to Minuend register 268 (cable 436) | |
| | Gate ΔT (cable 518) from register 248 to Subtrahend register 270 (cable 434) | |
| | Note -- use OR circuit 374 and wire 408 | |
| | → DC-8 | |
| DC-8 | Gate Result of Subtraction from register 274 (cable 438) to T register 246 (cable 222) | |
| | Note -- use OR circuit 372 and wire 406 | |
| | → MF-0 | |
| DC-9 | Gate T (cable 222) to Augend register 230 (cable 318) | |
| | Gate ΔT (cable 518) to Addend register 234 (cable 320) | |
| | Note -- use OR circuit 378 and wire 412 | |
| | → DC-10 | |
| DC-10 | Gate Sum (cable 322) to T register 246 (cable 222) | |
| | Note -- use OR circuit 376 and wire 410 | |
| | → DC-6 | |
| DC-11 | Is $L_{n-1} ≧ T$? | |
| | yes → MB-0 | Pulse on line 456 |
| | no → DC-12 | Pulse on line 458 |
| DC-12 | Gate T (cable 222) to Minuend register 268 (cable 436) | |
| | Gate ΔT (cable 518) to Subtrahend register 270 (cable 434) | |
| | Note -- use OR circuit 374 and wire 408 | |
| | → DC-13 | |
| DC-13 | Gate result of subtraction from difference register 274 (cable 438) to T register 246 (cable 222) | |
| | Note -- use OR circuit 372 and wire 406 | |
| | LF-1 | |

THE MOVE FORWARD (MF) MICROPROGRAM

On FIG. 10F, the MF-0 pulse extends through OR circuit 354 to wire 388. Wire 388 extends to FIG. 10E where it is applied to gate 642 in order to gate cable 332 to cable 522. Cable 332 is the output of the n counter 128 on FIG. 10D and cable 522 is the input to the address calculator unit 116 on FIG. 10C.

The MF-1 pulse extends to FIG. 10C where it is applied to gate 726. If the $n_i$ is equal to L FRAME plus M-1, a pulse will appear on wire 472 via gate 726. If it is not equal, a pulse will appear on wire 470. Wire 472 extends to FIG. 10H and a signal on it is an indication that operations have come to an end and that no further forward move is possible. Wire 470 extends to FIG. 10G where a pulse on it is used to start the pulse generator 596.

The MF-2 pulse extends to FIG. 10D where it is used to increment the n counter 128.

On FIG. 10F, the MF-3 pulse extends through OR circuit 366 to wire 400. Wire 400 extends to FIG. 10E where it is applied to gate 650 in order to gate cable 330 to cable 140. Cable 330 carries the low order six bits of the n counter 128 from FIG. 10D and cable 140 is the input cable to the memory address register 188 of the random access memory 108.

The MF-4 pulse extends to FIG. 10E where it is applied to gate 688 in order to gate cable 138 to cable 142. The cable 138 comes from the x(n−M+1) stage register 788 of the x shift register 104 on FIGS. 10A and 13 and cable 142 is one of the input cables to the memory data register 190 of the random access memory 108 on FIG. 10A.

On FIG. 10F, the MF-5 pulse extends through OR circuit 360 to wire 394. Wire 394 extends to FIGS. 10A and 14 where a pulse on it is used to give a write command to the random access memory 108.

On FIG. 10F, the MF-6 pulse extends through OR circuit 362 to wire 396. Wire 396 extends to FIG. 10A where a pulse on it is used to give a read command to the random access memory 108.

On FIG. 10F, the MF-7 pulse extends through OR circuit 358 to wire 392. Wire 392 extends to FIG. 10E where it is applied to gate 646 in order to gate cables 162 through 176 which come from the memory data register 190 of the random access memory 108 to cables 310 through 290 which go to the read only memory address logic unit 114. On FIG. 10F, the MF-8 pulse extends through OR circuit 368 to wire 402. Wire 402 extends to FIG. 10A where a pulse on it is used to give a read command to the read only memory 110.

On FIG. 10E, the MF-9 pulse is applied to gate 690 in order to gate cable 180 to cable 198. Cable 180 comes from the permutation field of the memory data register 228 of the read only memory 110 on FIGS. 10A and 15 and cable 198 is the input cable to a permutation register 250 on FIG. 10B. Permutation register 250 has its outputs connected to four adders 252, 254, 256 and 258 together with respective lines 260, 262, 264 and 266 from cable 124.

The MF-10 pulse extends to FIG. 10A where it is applied to the y shift register 102 and also to the x shift register 104 in order to provide the number 1 right shift pulse to such registers.

The MF-11 pulse extends to FIG. 10A where it is applied to the y shift register 102 and to the x shift register 104 in order to provide the number 2 right shift pulse to such registers.

On FIG. 10E, the MF-12 pulse is applied to gate 692 in order to gate cable 208 to cable 134. Cable 208 carries the result of the permutation logic on FIG. 10B and cable 134 is the input cable to the x(n) stage 782 of the x shift register 104. On FIG. 10F, the MF-12 pulse extends through OR circuit 364 to wire 398. Wire 398 extends through FIG. 10E where it is applied to gate 648 in order to gate cable 520 to cable 522. Cable 520 carries the n+1 value from register 204 in FIG. 10D and cable 522 is the input cable to the address calculator unit 116 on FIG. 10C.

On FIG. 10F, the MF-13 pulse extends through OR circuit 350 to wire 384. Wire 384 extends to FIG. 10E where it is applied to gate 640 in order to gate cable 334 to cable 336. Cable 334 carries the deinterleaver address from the address calculator unit 116 on FIG. 10C and cable 336 is the input cable to the memory address register 760 of the deinterleaver 30 on FIG. 10A. On FIG. 10F, the MF-13 pulse extends through OR circuit 356 to wire 390. Wire 390 extends to FIG. 10E where it is applied to gate 644 in order to gate cable 308 to cable 140. Cable 308 carries the low order six bits of the n+1 value in register 204 on FIG. 10D and cable 140 is the input cable to the memory address register 188 of the random access memory 108.

On FIG. 10F, the MF-14 pulse extends through OR circuit 352 to wire 386. Wire 386 extends to FIG. 10A where a pulse on it is used to give a read command to the deinterleaver 30.

The MF-15 pulse extends to FIG. 10C where it is applied to gate 742. If $n_i$ is greater or equal to L FRAME, a pulse will appear via gate 742 on wire 501. If this is not the case, a pulse will appear on wire 502. These wires extend to FIG. 10G where a pulse on wire 502 will turn "on" single shot 600. A pulse on wire 501 will start the pulse generator 598, in order to produce the MF-16 pulse.

On FIG. 10E, the MF-16 pulse is applied to gate 694 in order to gate cable 106 to cable 340. Cable 106 is the output cable of the memory data register 764 of the deinterleaver, and cable 340 is the input cable to a parity bit adjustment register 276 on FIG. 10C. The output bits of register 276 are individually applied through a plurality of gates 280, 283, 285, 287 and 289 to an output parity register 315.

On FIG. 10F, the MF-16 pulse extends through OR circuit 530 to wire 532. Wire 532 extends to FIG. 10C where a pulse on it is used to reset the output parity register 315 to all 0's.

On FIG. 10F, the MF-17 pulse extends through OR circuit 424 to wire 426. Wire 426 extends to FIG. 10C where a pulse on it is applied to gate 756 in order to gate a decoder 316 on the n position register 326 to one of the gates between the parity bit adjustment register 276 and the right-hand bit position of the output parity register 315.

On FIG. 10F, the MF-18 pulse extends through OR circuit 428 to wire 430. Wire 430 extends to FIG. 10E where it is applied to gate 664 in order to gate cable 422 to cable 120. Cable 422 is the output cable for the output parity register 315 on FIG. 10C and cable 120 is the input cable to the y(n+1) stage 766 of the y shift register 102.

On FIG. 10E, the MF-19 pulse is applied to gate 698 in order to gate cable 106 to cable 120. Cable 106 comes from the memory data register 764 of the deinterleaver, and cable 120 is the input cable to the y(n=1) stage 766 of the y shift register 102.

On FIG. 10G, when single shot 600 turns "off", a pulse is transmitted through OR circuit 602 to start the pulse generator 604. This produces the MF-20 pulse which extends to FIG. 10A and is applied to the L shift register 112 in order to provide the number 1 shift right pulse. As shown in FIG. 16, the MF-20 pulse is applied to both of gates 328 and 338.

The MF-21 pulse extends to FIG. 10A where it is applied to the L shift register 112 in order to provide the number 2 shift right pulse to OR gate 342 and gate 344. The MF-22 pulse extends to FIG. 10C where it is applied to gate 728. If $n_i$ is equal to n(max), a pulse will appear via gate 728 on wire 474. If not, a pulse will appear on wire 476. Wire 476 extends to FIG. 10F where it passes through OR circuit 556 to start the pulse generator 558. Wire 474 extends to FIG. 10G where a pulse on it is used to turn "on" single shot 606 in order to provide the MF-23 pulse.

The MF-23 pulse extends to FIG. 10C where it is applied to gate 730. If $n_i$ is greater or equal to L FRAME, a pulse will appear on wire 478. If not, a pulse will appear on wire 480. These wires extend to FIG. 10G where a pulse on wire 480 will extend through OR circuit 610 to start the pulse generator 612. A pulse on wire 478 will turn "on" single shot 608 to provide the MF-24 pulse. The MF-24 pulse extends to FIG. 10C where it is applied to gate 732. If n position is equal to 0, a pulse will appear on wire 482. If not, a pulse will appear on wire 484. The wire 482 extends to FIG. 10G where a pulse on wire 482 will extend through OR circuit 610 to start the pulse generator 612 and a pulse on wire 484 will extend through OR circuit 556 (FIG. 10F) to start the pulse generator 558.

The move forward microprogram is summarized below.

MOVE FORWARD

The purpose is to move the decoder forward by one step. This means to shift all registers to right, update the RAM, take new values in the left most part of the x, y shift registers 104, 102 and calculate the parity check to prepare the next look forward.

| | | |
|---|---|---|
| MF-0 | Gate the n value (cable 332) to the address calculator 116 (cable 522) | |
| | This is accomplished via OR circuit 354 and wire 388 | |
| | → MF-1 | |
| MF-1 | Is $n_i$ = L FRAME + M-1? | |
| | no → MF-2 | Pulse on line 470 |
| | yes → END -- no further forward move is possible | Pulse on line 472 |
| MF-2 | Increment n counter 128 | |
| | → MF-3 | |
| MF-3 | Gate low order six bits of n counter 128 (cable 330) to MAR 188 of RAM 108 (cable 140) | |
| | This is accomplished via OR circuit 366 and wire 400 | |
| | → MF-4 | |
| MF-4 | Gate x(n − M + 1) stage 788 of x shift register 104 (cable 138) to input cable 142 of MDR 190 of RAM 108 (write last cell of the x shift register 104 into x part of RAM) | |
| | → MF-5 | |
| MF-5 | Write RAM 108 | |
| | This is accomplished via OR circuit 360 and wire 394 | |
| | → MF-6 | |
| MF-6 | Read RAM 108 to get address for the permutation value in ROM 110 | |
| | This is accomplished via OR circuit 362 and wire 396 | |
| | → MF-7 | |
| MF-7 | Gate cables 162 thru 176 of MDR 190 of RAM 108 to cables 310 thru 290 of ROM address logic unit 114 | |
| | This is accomplished via OR circuit 358 and wire 392 | |
| | → MF-8 | |
| MF-8 | Read ROM 110 to get the permutation value out of the ROM | |
| | This is accomplished via OR circuit 368 and wire 402 | |
| | → MF-9 | |
| MF-9 | Gate permutation field of MDR 228 of ROM 110 (cable 180) to permutation register (cable 198) 250 | |
| | → MF-10 | |
| MF-10 | Right shift #1 x and y shift registers 104 and 102 | |
| | → MF-11 | |
| MF-11 | Right shift #2 x and y shift registers 104 and 102 | |
| | → MF-12 | |
| MF-12 | Gate output of permutation logic (cable 208) to x(n) stage 782 of x shift register 104 (cable 134) | |

It is noted that this is first cell of the shift register which is empty after the right-hand shift. The purpose of this operation is to change the information part of y(n) according to permutation value. Note that the next steps up to MF-19 provide the y(n+1) cell 766 of the y shift register 102 with a new 5 bit value from the deinterleaver.

| | | |
|---|---|---|
| | Gate n + 1 register 204 (cable 520) to address calculator 116 (cable 522) | |
| | This is accomplished through the OR circuit 364 and wire 398 | |
| | → MF-13 (THRU DELAY) | |
| MF-13 | Gate deinterleaver address (cable 334) to MAR 760 of deinterleaver (cable 336) | |
| | This is accomplished via OR circuit 350 and wire 384 | |
| | Gate six low order bits of n + 1 register 204 (cable 308) to MAR 188 of RAM (cable 140) | |
| | This is accomplished via OR circuit 356 and wire 390 | |
| | → MF-14 | |
| MF-14 | Read deinterleaver | |
| | This is accomplished via OR circuit 352 and wire 386 | |
| | → MF-15 | |
| MF-15 | Test Address Calculator 116 | |
| | Is $n_i \geq$ L FRAME? | |
| | yes → MF-16 | Pulse on line 501 |
| | no → MF-19 | Pulse on line 502 |
| MF-16 | In this branch (16-18), the decoder has only to get the appropriate parity bit because in the tail of the frame the information bit part equals 0000. | |
| | Gate MDR 764 of deinterleaver (cable 106) to parity bit adjustment register 276 (cable 340) | |
| | Reset output parity register 315 to 00000 | |
| | This is accomplished via OR circuit 530 and wire 532 | |
| | → MF-17 | |
| MF-17 | Gate decoder on n position register 326 to set output parity bit in output parity register 315 | |
| | This is accomplished via OR circuit 424 and wire 426 | |
| | → MF-18 | |
| MF-18 | Gate output parity value register 315 (cable 422) to y(n + 1) stage 766 of y shift register 102 (cable 120) | |
| | This is accomplished via OR circuit 428 and wire 430 | |
| | → MF-20 | |
| MF-19 | Gate MDR 764 of deinterleaver (cable 106) to y(n + 1) stage 766 of y shift register 102 (cable 120) | |
| | → MF-20 | |
| MF-20 | Shift right #1 - L shift register 112 | |
| | → MF-21 | |
| MF-21 | Shift right #2 - L shift register 112 | |
| | → MF-22 | |
| MF-22 | Is $n_i$ = n(max)? | |
| | yes → MF-23 | Pulse on line 474 |
| | no → LF-1 | Pulse on line 476 |
| MF-23 | Is $n_i \geq$ L FRAME? | |
| | yes → MF-24 | Pulse on line 478 |
| | no → U-1 | Pulse on line 480 |
| MF-24 | Is n pos = 0? | |
| | yes → U-1 | Pulse on line 482 |
| | no → LF-1 | Pulse on line 484 |

As described above, the likelihook value is used to update a total likelihood value in the decoder control. The table address is calculated from the syndrome bit and the burst tracking and indicating bits, and such likelihood table address is used to derive the total new likelihood value of the node from the previously stored likelihood value. The newly derived likelihood value is compared with a threshold value to determine whether the decoder control should proceed forward or backwards on the subblock of data in the encoder replica. In this fashion, the likelihood of error of the nodes in the search tree are constantly updated. In operation, it can be generally stated that the decoder constantly examines the burst indicators to obtain the optimum updated likelihook value from the likelihood table and thereafter determining the most likely error pattern at this particular received subblock. The so determined error pattern is used to change the received subblock of data in accordance therewith. The update microprogram will now be described with reference to the FIGS. 10A-10H.

THE UPDATE (U) MICROPROGRAM

On FIG. 10F, the U-1 pulse extends through OR circuit 356 to wire 390. Wire 390 extends to FIG. 10E where it is applied to gate 644 in order to gate cable 308 to cable 140. Cable 308 contains the low order 6 bits of the n+1 value of register 204 on FIG. 10D and cable 140 is the input cable to the memory address register 188 of the random access memory 108.

On FIG. 10F, the U-2 pulse extends through OR circuit 362 to wire 396. Wire 396 extends to FIG. 10A where a pulse on it is used to give a read command to the random access memory 108.

On FIG. 10F, the U-3 pulse extends through OR circuit 358 to wire 392. Wire 392 extends to FIG. 10E where it is applied to gate 646 in order to gate cables 162 through 176 which come from the memory data register 190 of the random access memory 108 to cables 310 through 290 which go to the read only memory address logic unit 114 on FIG. 10B. The U-4 pulse extends to FIG. 10B where it is applied to the read only memory address logic unit 114. This unit 114 is shown in detail on FIG. 18 and, referring to FIG. 18, it will be seen that the U-4 pulse is applied to gate 216 in order to allow the address logic to adjust itself. Because of the time needed for these logic circuits to settle down, a delay unit 614 is used on FIG. 10G between the output of pulse generator 612 and the input of pulse generator 616. Therefore, when pulse generator 612 turns "off", a pulse will be applied to the delay unit 614 which in turn will apply a delayed pulse to pulse generator 616. In this manner, a delay will be produced between the U-4 pulses and the U-5 pulses.

On FIG. 10F, the U-5 pulse extends through OR circuit 382 to wire 416. Wire 416 extends to FIG. 10E where it is applied to gate 662 in order to gate cables 292 through 300 which come from the read only memory address logic unit 114 on FIG. 10B to cables 150 through 158 which go to the memory data register 190 of the random access memory 108 on FIG. 10A.

On FIG. 10F, the U-6 pulse extends through OR circuit 360 to wire 394. Wire 394 extends to FIG. 10A where a pulse on it is used to give the write command to the random access memory 108.

The U-7 pulse extends to FIG. 10C where a pulse on it is used to increment the n(max) counter 130.

The U-8 pulse extends to FIG. 10E where it is applied to gate 700 in order to gate cable 160 of the memory data register 190 of the random access memory 108 to the exit circuits.

A summary of the update microprogram is provided below.

| UPDATE MICROPROGRAM | |
|---|---|
| U-1 | Gate six low order bits of n + 1 register (cable 308) to MAR of RAM (cable 140) |
| | This is accomplished via OR circuit 356 and wire 390 |
| | → U-2 |
| U-2 | Read RAM |
| | This is accomplished via OR circuit 362 and wire 396 |
| | → U-3 |
| U-3 | Gate cables 162 thru 176 of MDR of RAM to cables 310 thru 290 of ROM address logic |
| | This is accomplished via OR circuit 358 and wire 392 |
| | → U-4 |
| U-4 | Apply pulse to gate 216 on ROM address logic unit 114 thru delay |
| | → U-5 |
| U-5 | Gate cables 292 thru 300 of ROM address logic unit 114 to cables 150 thru 158 of MDR 190 of RAM 108 |
| | This is accomplished via OR circuit 382 and wire 416 |
| | → U-6 |
| U-6 | Write RAM 108 |
| | This is accomplished via OR circuit 360 and wire 394 |
| | → U-7 |
| U-7 | Increment $n_{MAX}$ value of counter 130 |
| | → U-8 |
| U-8 | Gate cable 160 of MDR 190 of RAM 108 to EXIT |
| | → LF-1 |

THE MOVE BACKWARD (MB) MICROPROGRAM

On FIG. 10F, the MB-0 pulse extends through OR circuit 354 to wire 388. Wire 388 extends to FIG. 10E where it is applied to gate 642 in order to gate cable 332 to cable 522. Cable 332 carries the n value of n counter 128 from FIG. 10D. Cable 522 is the input cable to the address calculator 116 on FIG. 10C.

The MB-1 pulse extends to FIG. 10C where it is applied to gate 734. If $n_i$ equals 0, a pulse will appear on wire 486 via gate 734. If $n_i$ is not equal to 0, a pulse will appear on wire 488. Wire 486 extends to FIG. 10H, where it is used to set an alarm because, if $n_i$ is equal to 0, the decoder cannot move backwards. Wire 488 extends to FIG. 10G where a pulse on it is used to start the pulse generator 620.

The MB-2 pulse extends to FIG. 10D where it is used to decrement the n counter 128.

The MB-3 pulse extends to FIG. 10A where it is applied to the y shift register 102, the x shift register 104 and the L shift register 112. This pulse provides the shift left number 1 pulse to these three shift registers. In FIG. 16, the MB-3 pulse is applied to gates 329 and 331 which respectively pass the $L_n$ and $L_{(n-1)}$ data to respective registers 333 and 335. The outputs of registers 333 and 335 are connected via gates 337 and 339 to the registers 240 and 232 for move forward and move backward operations.

The MB-4 pulse extends to FIG. 10A where it is applied to the y shift register 102, the x shift register 104 and the L shift register 112. This pulse provides the shift left number 2 pulse for these three shift registers. On FIG. 10F, the MB-5 pulse extends through OR circuit 354 to wire 388. Wire 388 extends to FIG. 10E where it is applied to gate 642 in order to gate cable 332 to cable 522. Cable 332 comes from the n counter 128 on FIG. 10D and cable 522 is the input cable to the address calculator 116 on FIG. 10C. After the MB-5 pulse, the pulse generator 620 provides a signal on output line 888 to start a pulse generator 623 through a delay 621.

On FIG. 10F, the MB-6 pulse extends through OR circuit 350 to wire 384. Wire 384 extends to FIG. 10E where it is applied to gate 640 in order to gate cable 334 to cable 336. Cable 334 is the deinterleaver address which comes from the address calculator 116 on FIG. 10C and cable 336 is the input cable to the memory address register 760 of the deinterleaver 30.

On FIG. 10F, the MB-7 pulse extends through OR circuit 352 to wire 386. Wire 386 extends to FIG. 10A where it is used to give a read command to the deinterleaver 30.

The MB-8 pulse extends to FIG. 10C where it is applied to gate 738. If $n_i$ is greater or equal to L FRAME a pulse will appear on wire 490 via gate 738. If this is not true, a pulse will appear on wire 492 via gate 738. These wires extend to FIG. 10G where a pulse on wire 492 is used to turn "on" single shot 624 through a delay 342, and a pulse on wire 490 is used to start the pulse generator 622 through a delay 344.

On FIG. 10E, the MB-9 pulse is applied to gate 702 in order to gate cable 106 to cable 340. Cable 106 comes from the memory data register 764 of the deinterleaver, and cable 340 is the input cable to the parity bit adjustment register 276 on FIG. 10C. On FIG. 10F, the MB-9 pulse extends through OR circuit 530 to wire 532. Wire 532 extends to FIG. 10C where a pulse on it is used to reset the output parity register 315 to all 0's.

On FIG. 10F, the MB-10 pulse extends through OR circuit 424 to wire 426. Wire 426 extends to FIG. 10C, where a pulse on it is applied to gate 756 in order to gate the decoder on the n position register 326 to the gating circuits 280, 284, 286, 288 and 289 from the parity bit adjustment register 276 to the right-hand bit position of the output parity register 315.

On FIG. 10F, the MB-11 pulse extends through OR circuit 428 to wire 430. Wire 430 extends to FIG. 10E where it is applied to gate 664 in order to gate cable 422 to cable 120. Cable 422 is the output cable from the output parity register 315 on FIG. 10C and cable 120 is the input cable to the y(n) stage 768 of the y shift register 102 on FIG. 10A.

On FIG. 10E, the MB-12 pulse is applied to gate 704 in order to gate cable 106 to cable 120. Cable 106 comes from the memory data register 764 of the deinterleaver and cable 120 is the input cable to the y(n) stage 768 of the y shift register 102.

On FIG. 10F, the MB-13 pulse extends through OR circuit 356 to wire 390. Wire 390 extends to FIG. 10E where it is applied to gate 644 in order to gate cable 308 to cable 140. Cable 308 carries the low order six bits of the n+1 value from register 204 in FIG. 10D and cable 140 is the input cable to the memory address register 188 of the random access memory 108.

On FIG. 10F, the MB-14 pulse extends through OR circuit 362 to wire 396. Wire 396 extends to FIG. 10A where a pulse on it is used to give a read command to the random access memory 108.

On FIG. 10E, the MB-15 pulse is applied to gate 706 in order to gate cable 160 to cable 432. Cable 160 comes from the lefthand field of the memory data register 190 of the random access memory 108 and cable 432 is the nput cable to the x(n−M+1) stage in register 788 of the x shift register 104 also on FIG. 10A.

On FIG. 10F, the MB-16 pulse extends through OR circuit 366 to wire 400. Wire 400 extends to FIG. 10E where it is applied to gate 650 in order to gate cable 330 to cable 140. Cable 330 carries the low order six bits of the n value from counter 128 in FIG. 10D and cable 140 is the input cable to the memory address register 188 of the random access memory 108.

On FIG. 10F, the MB-17 pulse extends through OR circuit 362 to wire 396. Wire 396 extends to FIG. 10A where a signal on it will give a read command to the random access memory 108.

On FIG. 10F, the MB-18 pulse extends through OR circuit 358 to wire 392. Wire 392 extends to FIG. 10E where it is applied to gate 646 in order to gate cables 162 through 176 which come from the memory data register 190 of the random access memory 108 to cables 310 through 290 which go to the read only memory address logic unit 114 on FIG. 108.

On FIG. 10F, the MB-19 pulse extends through OR circuit 368 to wire 402. Wire 402 extends to FIG. 10A where a signal on it will give a read command to the read only memory 110.

On FIG. 10E, the MB-20 pulse is applied to gate 708 in order to gate cable 182 to cable 434. Cable 182 comes from the likelihood field of the memory data register 228 of the read only memory 110 on FIG. 10A and cable 434 is the input cable to the subtrahend register 270 on FIG. 10B. On FIG. 10E, the MB-20 pulse is applied to gate 722 in order to gate cable 324 to cable 436. Cable 324 comes from the $L_n$ stage 232 of the L shift register 112 on FIG. 10A and cable 436 is the input cable to the minuend register 268 on FIG. 10B.

On FIG. 10E, the MB-21 pulse is applied to gate 710 in order to gate cable 438 to cable 192. Cable 438 comes from the output of the subtractor 272 in register 274 on FIG. 10B and cable 192 is the input cable to the $L_{(n-1)}$ stage 132 of the L shift register 112 on FIG. 10A. It is noted that the $L_{(n-1)}$ register 132 also receives the $L_n$ data via gate 338, register 341 and gate 344 during the move forward MF-20, MF-21 microprogram. On FIG. 10D, the MB-21 pulse is used to reset the "switch LF" flip flop 242 to its "0" state. On FIG. 10F, the MB-21 pulse extends through OR circuit 364 to wire 398. Wire 398 extends to FIG. 10E where it is applied to gate 648 in order to gate cable 520 to cable 522. Cable 520 carries the n+1 value from register 204 in FIG. 10D and cable 522 is the input cable to the address calculator 116 on FIG. 10C.

The MB-22 pulse extends to FIG. 10C where it is applied to gate 740. If $n_i$ is greater or equal to L FRAME a pulse will appear on wire 494. If this is not true, a pulse will appear on wire 496. Wire 496 extends to FIG. 10H where a pulse on it will turn "on" single shot 632. Wire 494 extends to FIG. 10G where a pulse on it will turn "on" single shot 630.

On FIG. 10D, the MB-23 pulse is used to reset an extension maximum register 346 to all 0's. The extension maximum register 346 is compared by a comparator 348 with an extension value in register 349 to be described below.

The MB-24 pulse extends to FIG. 10D where it is used to set the extension maximum register 346 to all 1's.

On FIG. 10H, when single shot 632 turns "off", a pulse is transmitted through OR circuit 634 to turn "on" the pulse generator 636. Pulse generator 636 can also be started when single shot 630 at the bottom right of FIG. 10G turns "off" because it will also deliver a pulse through OR circuit 634 to start pulse generator 636.

On FIG. 10F, the MB-25 pulse extends through OR circuit 356 to wire 390. Wire 390 extends to FIG. 10E where it is applied to gate 644 in order to gate cable 308 to cable 104. Cable 308 carries the low order six bits of the n+1 value from register 204 in FIG. 10D and cable 140 is the input cable to the memory address register 188 of the random access memory 108.

On FIG. 10F, the MB-26 pulse extends through OR circuit 362 to wire 396. Wire 396 extends to FIG. 10A where a signal on it will give a read command to the random access memory 108.

On FIG. 10E, the MB-27 pulse is applied to gate 712 in order to gate cable 162 to cable 440. Cable 162 carries the extension value field of the memory data register 190 of the random access memory 108 and cable 440 is the input cable to the extension value register 349 on FIG. 10D.

On FIG. 10D, the MB-28 pulse is applied to gate 752. If the extension value is less than the extension maximum, a pulse will appear on wire 466 via gate 752. If it is not, a pulse will appear on wire 468. Wire 468 extends to FIG. 10G where a pulse on it will pass through OR circuit 568 to turn "on" single shot 570, thus branching to the decoder control clock described above with respect to the decoder control microprogram. A pulse on wire 466 will extend to FIG. 10H where it will be used to start the pulse generator 638. On FIG. 10D, the MB-29 pulse is used to increment the extension value register 349. On FIG. 10F, the MB-29 pulse extends through OR circuit 380 to wire 414. Wire 414 extends to FIG. 10D where a pulse on it is used to set the "switch LF" flip flop 242 to its "1" state.

On FIG. 10E, the MB-30 pulse is applied to gate 714 in order to gate cable 442 to cable 144. Cable 442 comes from the extension value register 349 on FIG. 10D and cable 144 in an input cable to the memory data register 190 of the random access memory 108 on FIG. 10A.

On FIG. 10F, the MB-31 pulse extends through OR circuit 360 to wire 394. Wire 394 extends to FIG. 10A where a pulse on it is used to give a write command to the random access memory 108.

On FIG. 10F, the MB-32 pulse extends through OR circuit 362 to wire 396. Wire 396 extends to FIG. 10A where a pulse on it will give a read command to the random access memory 108.

On FIG. 10F, the MB-33 pulse extends through OR circuit 358 to wire 392. Wire 392 extends to FIG. 10E where it is applied to gate 646 in order to gate cables 162 through 176 which come from the memory data register 190 of the random access memory 108 to cables 310 through 290 which go to the read only memory address logic unit 114.

On FIG. 10F, the MB-34 pulse extends through OR circuit 368 to wire 402. Wire 402 extends to FIG. 10A where a pulse on it is used to give the read command to the read only memory 110.

On FIG. 10E, the MB-35 pulse is applied to gate 718 in order to gate cable 324 to cable 320. Cable 182 comes from the likelihood field of the memory data register 228 of the read only memory 110 on FIG. 10A and cable 318 is the input to the augend register 230 on FIG. 10B. On FIG. 10E, the MB-35 pulse is applied to gate 718 in order to gate cable 324 to cable 320. Cable 324 comes from the $L_n$ stage 232 of the L shift register 112 on FIG. 10A and cable 320 is the input cable to the addend register 234 on FIG. 10B.

On FIG. 10E, the MB-36 pulse is applied to gate 720 in order to gate cable 322 to cable 194. Cable 322 comes from the sum register 236 of the adder 238 on FIG. 10B and cable 194 is the input cable to the $L_{(n+1)}$ stage 240 of the L shift register 112 on FIG. 10A.

On FIG. 10H it will be noted that, when pulse generator 638 turns "off", a pulse is produced which travels upwardly along line 641 to near the top left of FIG. 10G where it passes through OR circuit 568 to turn "on" single shot (s.s.) 570. In this manner, the microprogram is returned to the decoder control clock.

A summary of the move backward microprogram is described below.

| MOVE BACKWARD MICROPROGRAM | |
|---|---|
| MB-0 | Gate n counter 128 (cable 332) to address calculator 116 (cable 522)<br>Use OR circuit 354 and wire 388<br>→ MB-1 |
| MB-1 | Is $n_i = 0$? If "0", decoder can't move backwards<br>yes → set alarm      Pulse on line 486<br>no → MB-2      Pulse on line 488 |
| MB-2 | Decrement n by 1<br>(n + 1) automatically follows<br>→ MB-3 |
| MB-3 | Shift left #1 x, y and L registers 104, 102 and 112<br>→ MB-4 |
| MB-4 | Shift left #2 x, y and L registers 104, 102 and 112<br>→ MB-5 |
| MB-5 | Gate n counter 128 (cable 332) to address calculator 116 (cable 522)<br>Use OR circuit 354 and wire 388 (thru delay)<br>→ MB-6 |
| MB-6 | Gate deinterleaver address (cable 334) to MAR 760 of deinterleaver 30 (cable 336)<br>Use OR circuit 350 and wire 384<br>→ MB-7 |
| MB-7 | Read deinterleaver 30<br>Use OR circuit 352 and wire 386<br>→ MB-8 |
| MB-8 | Test address calculator 116<br>Is $n_i \geq L_{FRAME}$<br>yes → MB-9 (thru delay)    490<br>no → MB-12 (thru delay)    492 |
| MB-9 | In this branch, the decoder has only to get the appropriate parity bit because in the tail of the frame the information bit part equals 0000.<br>Gate MDR 764 of deinterleaver 30 (cable 106) to parity bit adjustment register (cable 340)<br>Reset output parity register 315 to 00000<br>Use OR circuit 530 and wire 532<br>→ MB-10 |
| MB-10 | Gate decoder on n position register 326 to set output parity bit in output parity register 315<br>Use OR circuit 424 and wire 426<br>→ MB-11 |
| MB-11 | Gate output parity value register 315 (cable 422) to y(n) stage 768 of y shift register 102 (cable 120)<br>Use OR circuit 428 and wire 430<br>→ MB-12 |
| MB-12 | Gate MDR 764 of deinterleaver (cable 106) to y(n) stage 768 of y shift register 102 (cable 120)<br>→ MB-13 |
| MB-13 | Gate low order six bits of n + 1 register 204 (cable 308) to MAR 188 of RAM 108 (cable 140)<br>Use OR circuit 356 and wire 390<br>→ MB-14 |
| MB-14 | Read RAM 108<br>Use OR circuit 362 and wire 396<br>→ MB-15 |
| MB-15 | Gate left-hand field (cable 160) of MDR 190 of RAM 108 to x(n − M + 1) stage 788 of x shift register 104 (cable 432)<br>→ MB-16 |
| MB-16 | Gate low order six bits of n counter 128 (cable 330) to MAR 188 of RAM 108 (cable 140)<br>Use OR circuit 366 and wire 400<br>→ MB-17 |
| MB-17 | Read RAM 108<br>Use OR circuit 362 and wire 396<br>→ MB-18 |
| MB-18 | Gate cables 162 thru 176 of MDR 190 of RAM 108 to cables 310 thru 290 of ROM address logic unit 114<br>Use OR circuit 358 and wire 392<br>→ MB-19 |
| MB-19 | Read ROM 110<br>Use OR circuit 368 and wire 402<br>→ MB-20 |
| MB-20 | Gate likelihood field of MDR 228 of ROM 110 (cable 182) to subtrahend register 270 (cable 434)<br>Gate $L_n$ stage 232 of L shift register 112 (cable 324) |

-continued

MOVE BACKWARD MICROPROGRAM

|  |  |  |
|---|---|---|
|  | to minuend register 268 (cable 436)<br>→ MB-21 |  |
| MB-21 | Gate result of subtraction 272 (cable 438) to $L_{(n-1)}$ stage 132 of L shift register 112 (cable 192)<br>Reset "switch LF" 242 = 0<br>Gate n + 1 (cable 520) to address calculator 116 (cable 522)<br>Use OR circuit 364 and wire 398<br>→ MB-22 |  |
| MB-22 | Test address calculator 116<br>Is $n_i \geq L_{FRAME}$<br>yes → MB-23<br>no → MB-24 | Pulse on line 494<br>Pulse on line 496 |
| MB-23 | Reset "Extension Maximum" register 346 to 0000<br>→ MB-24 |  |
| MB-24 | Set "Extension Maximum" register 346 to 1111<br>→ MB-25 |  |
| MB-25 | Gate six low order bits of n + 1 register 204 (cable 308) to MAR 188 of RAM 108 (cable 140)<br>Use OR circuit 356 and wire 390<br>→ MB-26 |  |
| MB-26 | Read RAM 108<br>Use OR circuit 362 and wire 396<br>→ MB-27 |  |
| MB-27 | Gate "Extension Value" (cable 162) of MDR 190 of RAM 108 to "Extension Value" register 349 (cable 440)<br>→ MB-28 |  |

It is noted that the comparator 348 is connected to both the "Extension Value" register 349 and the "Extension Maximum" register 346

|  |  |  |
|---|---|---|
| MB-28 | Is "Extension Value" less than "Extension Maximum"?<br>yes → MB-29<br>no → DC-1 | Pulse on line 466<br>Pulse on line 468 |
| MB-29 | Increment Extension Value<br>Set "Switch LF" F.F. 242 to "1"<br>Use OR circuit 380 and wire 414<br>→ MB-30 |  |
| MB-30 | Gate new extension value (cable 442) to input cable 144 of MDR 190 of RAM 108<br>→ MB-31 |  |
| MB-31 | Write RAM 108<br>Use OR circuit 360 and wire 394<br>→ MB-32 |  |
| MB-32 | Read RAM 108<br>Use OR circuit 362 and wire 396<br>→ MB-33 |  |
| MB-33 | Gate cables 162 thru 176 of MDR 190 of RAM 108 to cables 310 thru 290 of ROM address logic unit 114<br>Use OR circuit 358 and wire 392<br>→ MB-34 |  |
| MB-34 | Read ROM 110<br>Use OR circuit 368 and wire 402<br>→ MB-35 |  |
| MB-35 | Gate "Likelihood" field of MDR 228 of ROM 110 (cable 182) to Augend register 230 of adder 238 (cable 318)<br>Gate the $L_n$ stage 232 of the L shift register 112 (cable 324) to the Addend register 234 of adder 238 (cable 320)<br>→ MB-36 |  |
| MB-36 | Gate Sum register 236 of adder 238 (cable 322) to the $L_{(n+1)}$ stage 240 of the L shift register 112 (cable 194)<br>→ DC-1 |  |

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A sequential decoder and system for determining error patterns for making error correction on burst and random noise channels using convolutionally encoded data comprising:

de-interleaver means for time-demultiplexing the convolutionally encoded data from a data channel into a predetermined transformed order;

a decoded data buffer for storing received data which has been decoded by said de-interleaver;

a syndrome bit generator connected to the output of said de-interleaver means for calculating a syndrome bit from a combination of the presently received subblock together with a given number of previous sub-blocks received from said de-interleaver means and stored in said decoded data buffer, said syndrome bit indicating if the current assumption of the path through a convolutional tree is correct;

burst tracking means, connected to the output of said de-interleaver means, for tracking burst errors and deriving burst indicator bits which indicate the presence of burst errors in a channel, said burst tracking means also being connected to said decoded data buffer which stores previously decoded received data;

memory means for storing tables of error likelihood and error pattern values derived from known error statistics about the data channel, statistics of probability of random errors and burst errors, error severity within a burst, and average burst duration, said memory means being connected to and addressed by a calculating means for providing error likelihood and error pattern values to said decoded data buffer; and said calculating means connected to both said syndrome bit generator and said burst tracking means for using said syndrome bits and said burst indicator bits to calculate a table address in said tables of error likelihood and error pattern values, said table address providing a likelihood value and an error pattern which are used to update a total likelihood value and determine an error pattern which are used to change received subblock data.

2. A sequential decoder and system as recited in claim 1, wherein said means for tracking burst errors and for deriving burst error indicator bits comprises means for comparing decoded data bits stored in said decoded data buffer with received bits in the de-interleaver and deriving burst indicator bit values as a result of the comparison.

3. A sequential decoder and system as recited in claim 1, wherein said calculating means for using said syndrome bits and said burst indicator bits comprises means for selecting which table of error likelihood and error pattern values to use based on the combination of the generated syndrome bit and the derived burst indicator bits, and means for selecting a particular error pattern and likelihood value from the selected table.

4. A sequential decoder and system as recited in claim 1, wherein said memory means for storing tables of error likelihood and error pattern values includes, for a given combination of a syndrome bit and burst indicator bits, a table of error patterns organized in order of decreasing error likelihood values.

5. A sequential decoder and system as recited in claim 1, wherein said de-interleaver means includes a buffer for storing rows of received data after they are de-multiplexed, said buffer including a preamble section for storing the bits used for calculating initial values of the burst indicator bits.

6. A sequential decoder and system as recited in claim 1, wherein said de-interleaver includes storage means for a two dimensional array of bits wherein data can be written in column-by-column fashion and read out in row-by-row fashion.

7. A system for determining error patterns for making error correction on burst and random noise channels using convolutional codes with sequential decoding, comprising:

encoder means for encoding source data by convolutional encoding;

time interleaving means for multiplexing the encoded data from its received order into a predetermined transformed order;

data channel means for transmitting said time-interleaved data;

de-interleaver means for time-demultiplexing data from a data channel into a predetermined transformed order;

a decoded data buffer for storing received data which has been decoded by said de-interleaver, said decoded data buffer storing subblock data;

decoder means for sequentially decoding the received convolutionally encoded data from said de-interleaver into the source data form;

a syndrome bit generator, connected to said de-interleaver means and said decoded data buffer for calculating a syndrome bit from a combination of the presently received subblock together with a given number of previous subblocks, said syndrome bit indicating if the current assumption of the path through a convolutional tree is correct;

burst tracking means, connected to the output of said de-interleaver means, for tracking burst errors and deriving burst indicator bits which indicate the presence of a burst error in a channel; and calculating means, connected to said syndrome bit generator and said burst tracking means for using said syndrome bits and said burst indicator bits to provide an error likelihood value and determine an error pattern which are used to change the received subblock data.

8. A system as recited in claim 7, further comprising memory means for storing tables of error likelihood and error pattern values derived from known error statistics about the data channel, statistics of probability of random errors and burst errors, error severity within a burst, and average burst duration, said memory means being connected to and addressed by said calculating means for providing error likelihood and error pattern values to said decoded data buffer.

9. A system as recited in claim 8, wherein said calculating means for using said syndrome bits and said burst indicator bits comprises first means for selecting a table of error likelihood and error pattern values to use based on the combination of the generated syndrome bit and the derived burst indicator bits, and second means for selecting a particular error pattern and likelihood value from the selected table.

10. A system as recited in claim 7, wherein said burst tracking means for tracking burst errors and for deriving burst error indicator bits comprises means connected to said decoded data buffer for comparing decoded data bits with received bits in the de-interleaver and deriving burst indicator bit values as a result of the comparison.

11. A system as recited in claim 8, wherein said memory means for storing tables of error likelihood and error pattern values includes, for a given combination of a syndrome bit and burst indicator bits, a table of error patterns organized in order of decreasing error likelihood values.

12. A system as recited in claim 7, wherein said de-interleaver means includes a buffer for storing rows of received data after they are de-multiplexed, said buffer including a preamble section for storing the bits used for calculating initial values of the burst indicator bits.

13. A system as recited in claim 7, wherein said de-interleaver includes storage means for a two dimensional array of bits wherein data can be written in column-by-column fashion and read out in row-by-row fashion.

* * * * *